United States Patent
Katal et al.

(10) Patent No.: US 12,322,770 B2
(45) Date of Patent: Jun. 3, 2025

(54) PROCESSES AND SYSTEMS FOR PURIFYING INDEPENDENT STREAMS OF MANGANESE, NICKEL, AND COBALT FROM LITHIUM-ION BATTERY WASTE STREAMS

(71) Applicant: GREEN LI-ION PTE. LTD., Singapore (SG)

(72) Inventors: Reza Katal, Parkville (AU); Ebrahim Akhondi, Yarraville (AU); Mahdi Ghorbani Mousaabadi, Hughesdale (AU); Pavel Cherepanov, Armstrong Creek (AU)

(73) Assignee: GREEN LI-ION PTE. LTD., Singapore (SG)

( * ) Notice: Subject to any disclaimer, the term of this patent is extended or adjusted under 35 U.S.C. 154(b) by 0 days.

(21) Appl. No.: 18/640,391

(22) Filed: Apr. 19, 2024

(65) Prior Publication Data
US 2025/0070293 A1 Feb. 27, 2025

Related U.S. Application Data

(60) Provisional application No. 63/534,183, filed on Aug. 23, 2023.

(51) Int. Cl.
*H01M 10/54* (2006.01)
*C22B 3/00* (2006.01)
(Continued)

(52) U.S. Cl.
CPC ............... *H01M 10/54* (2013.01); *C22B 3/30* (2021.05); *C22B 3/44* (2013.01); *C22B 7/007* (2013.01); *C22B 23/0484* (2013.01); *C22B 47/00* (2013.01)

(58) Field of Classification Search
CPC . H01M 10/54; C22B 3/30; C22B 3/44; C22B 7/007; C22B 23/0484; C22B 47/00
See application file for complete search history.

(56) References Cited

U.S. PATENT DOCUMENTS

| 3,690,844 A | 9/1972 | Flint et al. |
|---|---|---|
| 3,852,044 A | 12/1974 | Neitzel et al. |

(Continued)

FOREIGN PATENT DOCUMENTS

| AU | 2018276326 B2 | 7/2021 |
|---|---|---|
| CA | 3085965 | 8/2019 |

(Continued)

OTHER PUBLICATIONS

International Search Report and Written Opinion from PCT Application No. PCT/SG2024/050258 dated Jul. 22, 2024.

(Continued)

*Primary Examiner* — Karie O'Neill Apicella
(74) *Attorney, Agent, or Firm* — Harness, Dickey & Pierce, P.L.C.

(57) ABSTRACT

Flexible processes and systems for recovering manganese (Mn), cobalt (Co), nickel (Ni) as a purified co-precipitated product or alternatively independent products, from a lithium-ion battery waste stream are provided. The process may include upstream leaching and impurity removal prior to separation in a metal recovery system that may include a manganese (Mn) recovery unit to generate a manganese (Mn)-containing product, a cobalt (Co) recovery unit to generate a cobalt (Co)-containing product or a nickel (Ni) recovery unit to generate a nickel (Ni)-containing product or alternatively may include a co-precipitator unit to form a co-precipitated product. A lithium (Li) recovery unit may further process a portion of the waste liquid stream to form a lithium (Li)-containing product.

27 Claims, 6 Drawing Sheets

(51) Int. Cl.
*C22B 3/30* (2006.01)
*C22B 3/44* (2006.01)
*C22B 7/00* (2006.01)
*C22B 47/00* (2006.01)

(56) References Cited

U.S. PATENT DOCUMENTS

| | | | |
|---|---|---|---|
| 4,723,962 | A | 2/1988 | Mehta |
| 5,160,631 | A | 11/1992 | Frost et al. |
| 9,834,827 | B2 | 12/2017 | Wang et al. |
| 10,522,884 | B2 | 12/2019 | Wang et al. |
| 10,741,890 | B2 | 8/2020 | Wang et al. |
| 11,127,992 | B2 | 9/2021 | Wang et al. |
| 11,430,997 | B2 | 8/2022 | Howe |
| 11,502,345 | B2 | 11/2022 | Wang et al. |
| 11,508,999 | B2 | 11/2022 | Morin et al. |
| 11,769,916 | B2 | 9/2023 | Wang et al. |
| 11,827,998 | B2 | 11/2023 | Wang et al. |
| 11,876,196 | B2 | 1/2024 | Katal |
| 2007/0098609 | A1 | 5/2007 | McConnell |
| 2007/0196725 | A1 | 8/2007 | Tedjar et al. |
| 2012/0328494 | A1 | 12/2012 | Dreisinger et al. |
| 2013/0302226 | A1 | 11/2013 | Wang et al. |
| 2013/0312254 | A1 | 11/2013 | Kim et al. |
| 2016/0115563 | A1 | 4/2016 | Kotiranta et al. |
| 2017/0077564 | A1 | 3/2017 | Wang et al. |
| 2018/0261894 | A1 | 9/2018 | Wang et al. |
| 2019/0123402 | A1 | 4/2019 | Wang et al. |
| 2021/0032721 | A1 | 2/2021 | Hanisch et al. |
| 2021/0032724 | A1 | 2/2021 | Maree et al. |
| 2021/0078013 | A1 | 3/2021 | Kochhar et al. |
| 2021/0123119 | A1 | 4/2021 | Oosterhof et al. |
| 2021/0324495 | A1 | 10/2021 | Rohde et al. |
| 2021/0344058 | A1 | 11/2021 | Liu et al. |
| 2021/0372001 | A1 | 12/2021 | Wang et al. |
| 2021/0384563 | A1 | 12/2021 | Gratz et al. |
| 2021/0391606 | A1 | 12/2021 | Wang et al. |
| 2022/0017991 | A1 | 1/2022 | Lee et al. |
| 2022/0131204 | A1 | 4/2022 | Wang et al. |
| 2022/0166079 | A1 | 5/2022 | Liu et al. |
| 2022/0205064 | A1 | 6/2022 | Szolga, Jr. et al. |
| 2022/0285750 | A1 | 9/2022 | Li et al. |
| 2022/0311068 | A1 | 9/2022 | Wang et al. |
| 2022/0325378 | A1 | 10/2022 | Wang et al. |
| 2022/0416325 | A1 | 12/2022 | Gratz et al. |
| 2023/0038978 | A1 | 2/2023 | Gratz et al. |
| 2023/0044374 | A1 | 2/2023 | Wang et al. |
| 2023/0059571 | A1 | 2/2023 | Arsenault et al. |
| 2023/0147371 | A1 | 5/2023 | Wang et al. |
| 2023/0198040 | A1 | 6/2023 | Wang et al. |
| 2023/0304128 | A1 | 9/2023 | Akhondi et al. |
| 2023/0332272 | A1 | 10/2023 | Katal et al. |
| 2024/0102127 | A1* | 3/2024 | Alemrajabi .......... C01G 53/006 |
| 2024/0120565 | A1 | 4/2024 | Katal |

FOREIGN PATENT DOCUMENTS

| | | |
|---|---|---|
| CA | 3109084 A1 | 2/2020 |
| CN | 101450815 A | 6/2009 |
| CN | 101847663 A | 9/2010 |
| CN | 102157726 A | 8/2011 |
| CN | 102892708 A | 1/2013 |
| CN | 104953200 A | 9/2015 |
| CN | 103280610 B | 11/2015 |
| CN | 105274332 A | 1/2016 |
| CN | 106505225 A | 3/2017 |
| CN | 107653378 A | 2/2018 |
| CN | 107871912 A | 4/2018 |
| CN | 107946687 A | 4/2018 |
| CN | 109075407 A | 12/2018 |
| CN | 110527836 A | 12/2019 |
| CN | 110563021 A | 12/2019 |
| CN | 111003736 A | 4/2020 |
| CN | 109402394 B | 6/2020 |
| CN | 111304441 A | 6/2020 |
| CN | 111471864 A | 7/2020 |
| CN | 111675203 A | 9/2020 |
| CN | 112126783 A | 12/2020 |
| CN | 112441572 A | 3/2021 |
| CN | 112701372 A | 4/2021 |
| CN | 113073194 A | 7/2021 |
| CN | 115058605 A | 9/2022 |
| EP | 2532759 A1 | 12/2012 |
| EP | 2450991 B1 | 7/2013 |
| EP | 2480696 B1 | 7/2018 |
| EP | 3381080 A1 | 10/2018 |
| GB | 2611158 A | 3/2023 |
| JP | 2011157604 A | 8/2011 |
| JP | 2011184764 A | 9/2011 |
| JP | 5161361 B1 | 3/2013 |
| JP | 2014156648 A | 8/2014 |
| JP | 2016003382 A | 1/2016 |
| JP | 2016060926 A | 4/2016 |
| KR | 20110062307 A | 6/2011 |
| KR | 20190009771 A | 1/2019 |
| KR | 102202646 B1 | 1/2021 |
| KR | 20210120669 A | 10/2021 |
| RU | 2604082 C2 | 12/2016 |
| TW | 202105823 A | 2/2021 |
| TW | 202107764 A | 2/2021 |
| TW | 202111131 A | 3/2021 |
| WO | WO-2012026061 A1 | 3/2012 |
| WO | WO-2013160754 A1 | 10/2013 |
| WO | WO-2017091562 A1 | 6/2017 |
| WO | WO-2018209164 A1 | 11/2018 |
| WO | 2018227237 A1 | 12/2018 |
| WO | WO-2018223193 A1 | 12/2018 |
| WO | WO-2019149698 A1 | 8/2019 |
| WO | WO-2019150403 A1 | 8/2019 |
| WO | WO-2020109045 A1 | 6/2020 |
| WO | WO-2020124130 A1 | 6/2020 |
| WO | WO-2020220559 A1 | 11/2020 |
| WO | 2021069822 A1 | 4/2021 |
| WO | WO-2021161316 A1 | 8/2021 |
| WO | WO-2021177537 A1 | 9/2021 |
| WO | WO-21252433 A1 | 12/2021 |
| WO | WO-2021242831 A2 | 12/2021 |
| WO | WO-21252433 A9 | 1/2022 |
| WO | WO-2022045973 A1 | 3/2022 |
| WO | WO-2022062675 A1 | 3/2022 |
| WO | WO-2022127117 A1 | 6/2022 |
| WO | WO-2022167662 A1 * | 8/2022 ............. C01G 51/00 |
| WO | WO-2022219221 A1 | 10/2022 |
| WO | WO-2022219222 A1 | 10/2022 |
| WO | WO-2022219223 A1 | 10/2022 |
| WO | WO-2022221285 A1 | 10/2022 |
| WO | WO-202272162 A1 | 12/2022 |
| WO | WO-2022258939 A1 | 12/2022 |
| WO | WO-2023010969 A1 | 2/2023 |
| WO | WO-2023015171 A1 | 2/2023 |
| WO | WO-2023024599 A1 | 3/2023 |
| WO | WO-2023034556 A1 | 3/2023 |
| WO | WO-2023036726 A1 | 3/2023 |
| WO | WO-2023136773 A1 | 7/2023 |
| WO | WO-2023163658 A2 | 8/2023 |

OTHER PUBLICATIONS

Pavon et al. (2022) Recovery of Al, Co, Cu, Fe, Mn, and Ni from Spent LIBs after Li Selective Separation by COOL-Process—Part 2: Solvent Extraction from Sulphate Leaching Solution, Oct. 1, 2022, Chemie IngenieurTechnik, 93, p. 1842.

Vittore et al. (2019) Edge-Oxidation of Graphites by Hydrogen Peroxide, Langmuir, 35, p. 2244.

Non-Final Office Action from U.S. Appl. No. 18/640,456 dated Jul. 12, 2024.

U.S. Appl. No. 18/112,676, filed Feb. 22, 2023.
U.S. Appl. No. 18/640,456, filed Apr. 19, 2024.
U.S. Appl. No. 18/813,419, filed Aug. 23, 2024.

International Search Report and Written Opinion from PCT Application No. PCT/SG2024/050259 dated Jul. 22, 2024.

(56) References Cited

OTHER PUBLICATIONS

International Search Report and Written Opinion for International Publication No. WO 2022/045973-A1 issued Oct. 11, 2021; 23 pages.
International Search Report from PCT Application No. PCT/SG2021/050496 dated Nov. 10, 2021.
Written Opinion from PCT Application No. PCT/SG2021/050496 dated Nov. 10, 2021.
Xu, J., et al., "A review of the processes and technologies for the recycling of lithium-ion secondary batteries," Journal of Power Sources, 177: 512-527 (2008).
Freitas, M.B.J.G. & Garcia, E.M., "Electrochemical recycling of cobalt from cathodes of spent lithium-ion batteries," Journal of Power Sources, 171: 953-959 (2007).
Castillo, S., et al., "Advances in the recovering of spent lithium battery compounds," Journal of Power Sources, 112: 247-254 (2002).
Contestabile, M., et al., "A laboratory-scale lithium battery recycling process," Journal of Power Sources, 83: 75-78 (1999).
Zou, H., et al., "A novel method to recycle mixed cathode materials for lithium ion batteries," Green Chem, 15: 1183-1191 (2013).
Gratz, E., et al., "A closed loop process for recycling spent lithium ion batteries," Journal of Power Sources, 262: 255-262 (2014).
Office Action from U.S. Appl. No. 18/112,818 dated Jun. 22, 2023.
Wang, H., et al., "Hydrometallurigcal processing of Li-Ion battery scrap from electric vehicles," European Metallurgical Conference, 2011, p. 1-26.
Office Action from Chinese Application No. 2021800522141 dated Aug. 28, 2023.
Office Action from Russian Application No. 2023106877 dated Sep. 12, 2023.
Search Report from Russian Application No. 2023106877 dated Sep. 11, 2023.
Bing Han, Rana Anwar Ul Haq, Marjatta Louhi-Kultanen, Lithium carbonate precipitation by homogeneous and heterogeneous reactive crystallization, 2020, Hydrometallurgy, vol. 195, (Year: 2020).
O. Sitando, P.L. Crouse, Processing of a Zimbabwean petalite to obtain lithium carbonate, 2012, International Journal of Mineral Processing, vols. 102-103 (Year: 2012).
Ulusoy Erol HB, Hestekin CN, Hestekin JA. Effects of Resin Chemistries on the Selective Removal of Industrially Relevant Metal ions Using Wafer-Enhanced Electrodeionization. 2021. Membranes. 11 (1):45. https://doi.org/10.3390/membranes11010045 (Year:2021).
Gao et al. Lithium Carbonate Recovery from Cathode Scrap of Spent Lithium-Ion Battery A Closed-Loop Process, Jan. 12, 2017, Environmental Science & Technology 51 (3), 1662-1669, (Year: 2017).
Chao Peng, Fupeng Liu, Zulin Wang, Benjamin p. Wilson, Mari Lundstrom, Selective extraction of lithium (Li) and preparation of battery grade lithium carbonate (Li2C03) from spent Li-ion batteries in nitrate system, Journal of Power Sources, vol. 415, 2019, pp. 179-188 (Year: 2019).
Ahwadmin, What is Deionized Water, and What is it Used For?, Oct. 21, 2021, American Home Water & Air (Year: 2021).
Sina Shakibania, Alireza Mahmoudi, Mohammad Mokmeli, Fereshteh Rashchi, The effect of the chloride ion on chemical degradation of Lix 984N extractant, 2020, Minerals Engineering (Year: 2020).
Search Report from Taiwan Application No. 112114238 dated Nov. 8, 2023.
Search Report and Office Action from Taiwan application No. 112106545 dated Oct. 16, 2023.
Office Action from Chinese Application No. 2021800522141 dated Dec. 4, 2023.
Examination Report from Australian Application No. 2021330014 dated Apr. 19, 2023.
Examination Report from Australian Application No. 2021330014 dated Nov. 22, 2023.
International Search Report from PCT Application No. PCT/SG2023/050108 dated Aug. 16, 2023.
Written Opinion from PCT Application No. PCT/SG2023/050108 dated Aug. 16, 2023.
International Search Report from PCT Application No. PCT/SG2023/050257 dated Aug. 2, 2023.
Written Opinion from PCT Application No. PCT/SG2023/050257 dated Aug. 2, 2023.
Ooi et al., (2017), "Recovery of lithium from salt-brine eluates by direct crystallization as lithium sulfate", Hydrometallurgy, 174, 123-130.
Rosales et al., (2014), "Novel process for the extraction of lithium from ?-spodumene by leaching with HF", Hydrometallurgy, 147-148.
Non-Final Office Action issued in U.S. Appl. No. 18/379,807 dated Dec. 5, 2023.
Office Action from Korean Application No. KR 10-2023-7010188 dated Jan. 17, 2024.
Larouche, F et al. (2020). Progress and Status of Hydrometallurgical and Direct Recycling of Li-Ion Batteries and Beyond. Materials 13:801.
Forte, F. et al. (2020). Lithium iron phosphate batteries recycling: An assessment of current status. Critical Reviews in Environmental Science and Technology, 1064:3389.
Yan et al. (2020). High-efficiency method for recycling lithium from spent LiFePO4 cathode. Nanotechnology Reviews, 9: 1586-1593.
Tasaki K. et al. (2003). Decomposition of LiPF6 and Stability of PF 5 in Li-Ion Battery Electrolytes: Density Functional Theory and Molecular Dynamics Studies. Journal of the Electrochemical Society 150.12, A1628.
Search Report and Written Opinion from Singapore Application No. 11202301039V dated Feb. 26, 2024.
Final Office Action from U.S. Appl. No. 18/112,676 dated Mar. 8, 2024.
Examination Report from Australian Application No. 2021330014 dated Feb. 23, 2024.
Examination Report from Australian Application No. 2023223959 dated Mar. 13, 2024.
Press et al. (2020). A Process for Recovering Metals From Recycled Rechargeable Batteries.
Extended European Search Report from European Application No. 21862212.4 dated May 3, 2024.
Office Action from corresponding U.S. Appl. No. 18/112,676, dated Oct. 24, 2023.
International Search Report and Written Opinion from PCT Application No. PCT/SG2022/050014 dated Mar. 28, 2022.
International Search Report and Written Opinion issued Dec. 20, 2024, for PCT Application No. PCT/SG2024/050542.
Examination Report issued Nov. 8, 2024, for Malaysian Application No. PI2023000788.
Substantive Examination Report issued Oct. 31, 2024, for Indonesian Application No. P00202302236.
Office Action from Japanese Application No. 2024-513842 dated Jan. 7, 2025.

\* cited by examiner

PROCESSES AND SYSTEMS FOR PURIFYING INDEPENDENT STREAMS OF MANGANESE, NICKEL, AND COBALT FROM LITHIUM-ION BATTERY WASTE STREAMS

CROSS-REFERENCE TO RELATED APPLICATIONS

This application claims the benefit of U.S. Provisional Application No. 63/534,183 filed on Aug. 23, 2023. The entire disclosure of the above application is incorporated herein by reference.

FIELD

The present disclosure relates to processes and systems for purifying and recycling lithium-ion battery waste streams, and more specifically to purify manganese, nickel, cobalt, and optionally lithium as either a co-precipitated product or as independent recycled streams from the lithium-ion battery waste streams.

BACKGROUND

This section provides background information related to the present disclosure which is not necessarily prior art.

Electrochemical cells, such as rechargeable secondary lithium-ion batteries, are widely used in a variety of applications including consumer products and vehicles. Due to the development of electric vehicles, as well as all portable electronics using lithium-ion batteries, there is a growing demand for lithium-ion batteries. However, at the end of a battery's life, spent batteries may be discarded to further generate a significant amount of lithium-ion battery waste. Lithium-ion batteries often contain valuable metals that go to waste. If the current pace of the generation of battery waste is not managed properly, it will continue to have a progressively greater negative impact on the environment and resources. Furthermore, many precious metals used in making lithium-ion batteries originate from limited natural resources. The recovery of select precious metals from lithium-ion batteries is one of the most important parts of the circular economy in the electrochemical energy storage sector to ensure better management of these limited natural resources.

Efforts are ongoing to recycle materials from spent lithium-ion batteries. In some instances, for recycling purposes spent lithium-ion batteries are dismantled, crushed, and/or shredded to form a lithium-ion battery waste stream known as black mass. The black mass typically includes all battery active materials, so may contain negative electrode/anodic active materials mixed with positive electrode/cathodic active materials, as well as electrolytic constituents. As such, the presence of multiple complex compounds in the black mass make recycling and recovery of the metals of greatest interest challenging.

As new generations of lithium-ion batteries are launched, a wide variety of cathode active materials may be recycled in black mass waste streams resulting in complex mixtures of different elements/compounds. Examples of current positive electroactive materials on the market include lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$, abbreviated NMC, for example, $LiMn_{0.33}Ni_{0.33}Co_{0.33}O_2$) lithium manganese oxide (LMO— $LiMn_2O_4$— about 21%), lithium nickel oxide (LNO— $LiNiO_2$— about 7%), and lithium iron phosphate (LFP —$LiFePO_4$— about 5%). Additionally, the black mass may include impurities from spent battery anodes and/or cathode, which may further complicate conventional recycling efforts. For example, such impurities may include carbon (e.g., graphite), iron, copper, fluorine, phosphorous, titanium, aluminum, and the like depending on the particular types of lithium-ion batteries.

It would be desirable to develop methods and systems that can purify waste streams from lithium-ion batteries, like black mass, by optimizing recovery of select metals of interest, such as nickel, cobalt, manganese, and/or lithium, while efficiently separating out various impurities. Moreover, it would be desirable to have the ability to generate independent streams of select metals of interest, such as manganese, nickel, and cobalt, from recycled black mass originating from lithium-ion batteries.

SUMMARY

This section provides a general summary of the disclosure, and is not a comprehensive disclosure of its full scope or all of its features.

In certain aspects, the present disclosure relates to a process for independently recovering manganese (Mn), cobalt (Co), and nickel (Ni) from a lithium-ion battery waste stream. In certain aspects, the process comprises separating manganese (Mn) from a waste liquid stream originating from the lithium-ion battery waste stream comprising manganese (Mn), nickel (Ni), and cobalt (Co). The separating of manganese (Mn) comprises: (i) introducing a first oxidant to the waste liquid stream to form solid manganese dioxide ($MnO_2$); (ii) reacting the waste liquid stream with ozone ($O_3$) to form solid manganese dioxide ($MnO_2$); or (iii) both (i) and (ii). The process also includes removing the solid manganese dioxide ($MnO_2$) from the waste liquid stream. The method further includes separating nickel (Ni) and cobalt (Co) from the waste liquid stream by: (iv) adding sulfuric acid ($H_2SO_4$) and a second oxidant to the waste liquid stream, followed by adjusting pH to greater than or equal to about 4, adding sodium hypochlorite (NaClO) to form cobalt oxyhydroxide (COOH), passing the waste liquid stream through a filter to form a retentate comprising cobalt oxyhydroxide (COOH) and a filtrate comprising nickel (Ni) and liquid; (v) recovering cobalt (Co) from the retentate by purifying the cobalt oxyhydroxide (COOH) in the retentate and adding sulfuric acid ($H_2SO_4$) and a third oxidant to the retentate followed by one or more of the following processes: (a) separating nickel (Ni) from cobalt (Co) by adjusting the pH of the retentate to be less than or equal to about 2.5 and passing the retentate into one or more chromatographic columns so that cobalt (Co) is retained within the one or more chromatographic columns, followed by a stripping process to recover cobalt (Co) from the one or more chromatographic columns; (b) removing liquid from the retentate to recover cobalt sulfate ($CoSO_4$); and/or (c) adjusting pH of the retentate to greater than or equal to about 9 to precipitate a cobalt hydroxide product comprising one or more of cobalt hydroxide ($Co(OH)_2$) or cobalt oxyhydroxide (COOH). The process further includes recovering nickel (Ni) from the filtrate by one of the following processes: (a) removing liquid from the filtrate to recover nickel sulfate ($NiSO_4$); and/or (b) adjusting pH of the filtrate to greater than or equal to about 9 to precipitate nickel hydroxide ($Ni(OH)_2$).

In one aspect, the waste liquid stream further comprises lithium (Li) and the filtrate is a first filtrate, and the retentate is a first retentate, wherein prior to (iv) adding sulfuric acid ($H_2SO_4$) and a second oxidant to the waste liquid stream, co-precipitating nickel (Ni) and cobalt (Co) by increasing pH of the waste liquid stream to greater than or equal to about 9 to precipitate nickel hydroxide ($Ni(OH)_2$) and cobalt hydroxide ($Co(OH)_2$), passing the waste liquid stream through a second filter to generate a second retentate comprising nickel hydroxide ($Ni(OH)_2$) and cobalt hydroxide/oxyhydroxide that is processed during (iv) and a second filtrate comprising lithium (Li).

In one aspect, the first oxidant is selected from the group consisting of: potassium permanganate ($KMnO_4$), sodium permanganate ($NaMnO_4$), and combinations thereof.

In one further aspect, the first oxidant comprises sodium permanganate ($NaMnO_4$) and is selected to be less than or equal to about 95% of a stoichiometric amount in a reaction between the sodium permanganate ($NaMnO_4$) and manganese sulfate ($MnSO_4$).

In one aspect, the second oxidant comprises hydrogen peroxide ($H_2O_2$).

In one aspect, the separating of manganese (Mn) comprises (iii) both (i) the introducing the first oxidant to the waste liquid stream to form a first amount of manganese dioxide ($MnO_2$) and (ii) the reacting the waste liquid stream with ozone ($O_3$) to form a second amount of manganese dioxide ($MnO_2$).

In one further aspect, about 95% of manganese is removed from the waste liquid stream during (i) and about 5% of manganese is removed from the waste liquid stream during (ii).

In one aspect, the filter is a first filter and the separating of manganese (Mn) further comprises passing the waste liquid stream through a second filter to separate and recover manganese dioxide ($MnO_2$).

In one aspect, (i) the introducing the first oxidant to the waste liquid stream further comprises adjusting a pH of the waste liquid stream to greater than or equal to about 1.5 to less than or equal to about 3.

In one aspect, the (iv) adding sulfuric acid ($H_2SO_4$) and the second oxidant to the waste liquid stream, followed by adjusting pH to greater than or equal to about 4, further comprises adding sodium hydroxide (NaOH) to the waste liquid stream followed by the adding the sodium hypochlorite (NaClO) and stirring for greater than or equal to about 1 hour, where the waste liquid stream has a temperature of greater than or equal to about 50° C. to less than or equal to about 60° C.

In one further aspect, after the passing through the filter to form the retentate, washing the retentate with water at a temperature of greater than or equal to about 50° C. to less than or equal to about 75° C. to remove residual nickel (Ni) from the cobalt oxyhydroxide (COOH).

In one further aspect, after the passing through the filter to form the retentate, washing the retentate with a sulfuric acid wash having a sulfuric acid concentration of about 100 g/L in water for greater than or equal to about 30 minutes to remove any residual nickel (Ni) from the cobalt oxyhydroxide (COOH).

In one aspect, the separating manganese (Mn) from the waste liquid stream results in a first product stream comprising manganese (Mn) at a purity level of greater than or equal to about 98%, the (vi) recovering cobalt (Co) from the retentate results in a second product stream comprising cobalt (Co) at a purity level of greater than or equal to about 98%, and the (vii) recovering nickel (Ni) from the filtrate results in a third product stream comprising nickel (Ni) at a purity level of greater than or equal to about 99%.

In certain other aspects, the present disclosure relates to a process for independently recovering manganese (Mn), cobalt (Co), and nickel (Ni) from a lithium-ion battery waste stream. The process may optionally comprise, purifying a waste liquid stream originating from the lithium-ion battery waste stream, wherein the waste liquid stream comprises sulfuric acid ($H_2SO_4$), manganese (Mn), cobalt (Co), and nickel (Ni) to remove fluorine (F), phosphorus (P), and one or more impurity metals selected from the group consisting of: copper (Cu), iron (Fe), zinc (Zn), aluminum (Al), and titanium (Ti). The purifying includes: (i) removing copper (Cu), iron (Fe), and zinc (Zn) from the waste liquid stream by a solvent extraction process; (ii) adding a source of calcium oxide and a first oxidant to the waste liquid stream to remove fluorine (F) by precipitating calcium fluoride ($CaF_2$); and (iii) adjusting pH of the waste liquid stream to greater than or equal to about 3 to less than or equal to about 5 for a first duration and further adjusting pH of the waste liquid stream to greater than or equal to about 4.8 to less than or equal to about 7.2 to remove one or more impurity compounds comprising an element selected from the group consisting of: copper (Cu), iron (Fe), zinc (Zn), aluminum (Al), and titanium (Ti), phosphorus (P), lead (Pb), and combinations thereof. The process includes separating manganese (Mn) from the waste liquid stream by: (iv) introducing a second oxidant to the waste liquid stream to form solid manganese dioxide ($MnO_2$); (v) reacting the waste liquid stream with ozone ($O_3$) to form solid manganese dioxide ($MnO_2$); or (vi) both (iv) and (v). The process thus removes the solid manganese dioxide ($MnO_2$) from the waste liquid stream. The process further includes separating nickel (Ni) and cobalt (Co) from the waste liquid stream by: (vii) adding sulfuric acid ($H_2SO_4$) and a third oxidant to the waste liquid stream, followed by adjusting pH to greater than or equal to about 4, adding sodium hypochlorite (NaClO) to form cobalt oxyhydroxide (COOH), passing the waste liquid stream through a filter to form a retentate comprising cobalt oxyhydroxide (COOH) and a filtrate comprising nickel (Ni) and liquid; (viii) recovering cobalt (Co) from the retentate by purifying the cobalt oxyhydroxide (COOH) in the retentate and adding sulfuric acid ($H_2SO_4$) and a fourth oxidant to the retentate followed by one or more of the following processes: (a) separating nickel (Ni) from cobalt (Co) by adjusting the pH of the retentate to be less than or equal to about 2.5 and passing the retentate into one or more chromatographic columns so that cobalt (Co) is retained within the one or more chromatographic columns, followed by a stripping process to recover cobalt (Co) from the one or more chromatographic columns; (b) removing liquid from the retentate to recover cobalt sulfate ($CoSO_4$); and/or (c) adjusting pH of the retentate to greater than or equal to about 9 to precipitate a cobalt hydroxide product comprising one or more of cobalt hydroxide ($Co(OH)_2$) or cobalt oxyhydroxide (COOH). The method may further include (xi) recovering nickel (Ni) from the filtrate by one of the following processes: (a) removing liquid from the filtrate to recover nickel sulfate ($NiSO_4$); and/or (b) adjusting pH of the filtrate to greater than or equal to about 9 to precipitate nickel hydroxide ($Ni(OH)_2$).

In one aspect, the second oxidant is selected from the group consisting of: potassium permanganate ($KMnO_4$), sodium permanganate ($NaMnO_4$), and combinations thereof.

In one further aspect, the second oxidant comprises potassium permanganate ($KMnO_4$) and is selected to be less than or equal to about 95% of a stoichiometric amount in a reaction between the potassium permanganate ($KMnO_4$) and manganese sulfate ($MnSO_4$).

In one aspect, the first oxidant, the third oxidant, and the fourth oxidant are independently selected from the group consisting of: hydrogen peroxide ($H_2O_2$), ozone ($O_3$), sodium hypochlorite (NaClO), and combinations thereof.

In one aspect, the first oxidant, the third oxidant, and the fourth oxidant each comprises hydrogen peroxide ($H_2O_2$).

In one aspect, during the introducing the second oxidant to the waste liquid stream, a pH of the waste liquid stream is adjusted to be greater than or equal to about 1.5 to less than or equal to about 3.

In one aspect, the filter is a first filter and the separating manganese (Mn) from the waste liquid stream further comprises passing the waste liquid stream through a second filter to separate and recover the solid manganese dioxide ($MnO_2$).

In one aspect, the waste liquid stream further comprises lithium (Li) and the filter is a first filter, the filtrate is a first filtrate, and the retentate is a first retentate, wherein prior to (vii) adding sulfuric acid ($H_2SO_4$) and a second oxidant to the waste liquid stream, co-precipitating nickel (Ni) and cobalt (Co) by increasing pH of the waste liquid stream to greater than or equal to about 9 to precipitate nickel hydroxide ($Ni(OH)_2$) and cobalt hydroxide ($Co(OH)_2$), passing the waste liquid stream through a second filter to generate a second retentate comprising nickel hydroxide ($Ni(OH)_2$) and cobalt hydroxide ($Co(OH)_2$) that is processed during (vii) and a second filtrate comprising lithium (Li).

In one further aspect, the co-precipitating nickel (Ni) and cobalt (Co) occurs in an inert atmosphere.

In one further aspect, further comprising recovering lithium (Li) by further processing the filtrate to form at least one compound comprising lithium (Li) by concentrating lithium (Li) and adding sodium carbonate ($Na_2CO_3$) to precipitate lithium carbonate ($Li_2CO_3$).

In one further aspect, the concentrating lithium (Li) comprises evaporating water and the adding sodium carbonate ($Na_2CO_3$) further comprises adding an inorganic base to increase a pH of the first filtrate to greater than or equal to about 12, wherein the filtrate has a temperature of greater than or equal to about 70° C. to less than or equal to about 95° C. to form lithium carbonate ($Li_2CO_3$).

In one aspect, the (vii) adding sulfuric acid ($H_2SO_4$) and the third oxidant to the waste liquid stream, followed by the adjusting pH to greater than or equal to about 4, further comprises adding sodium hydroxide (NaOH) followed by adding the sodium hypochlorite (NaClO) and stirring for greater than or equal to about 1 hour where the retentate has a temperature of greater than or equal to about 50° C. to less than or equal to about 60° C.

In one further aspect, after the passing the waste liquid stream through the filter to form the retentate comprising cobalt oxyhydroxide (COOH), washing the retentate with water to remove residual nickel (Ni) at a temperature of greater than or equal to about 50° C. to less than or equal to about 75° C.

In one further aspect, after the passing the waste liquid stream through the filter to form the retentate comprising cobalt oxyhydroxide (COOH), washing the retentate with a sulfuric acid wash for greater than or equal to about 30 minutes to remove any residual nickel (Ni).

In one aspect, the solvent extraction process further comprises first mixing the waste liquid stream with a first extractant and a first organic phase to remove copper (Cu) and then mixing the waste liquid stream with a second extractant and a second organic phase to remove at least iron (Fe) and zinc (Zn).

In one further aspect, the first extractant comprises 2-hydroxy-5-nonylbenzaldehyde oxime, the second extractant comprises bis-(2-ethylhexyl)phosphoric acid and the first organic phase and the second organic phase are independently selected from the group consisting of: kerosene, sulfonated kerosene, hexane, and combinations thereof.

In one further aspect, the process further comprises reducing a pH of the waste liquid stream to less than or equal to about 2, adding the first extractant and the first organic phase at an aqueous to organic ratio of about 1 to 1, where a concentration of the first extractant is greater than 0 volume % to less than or equal to about 20 volume %.

In one aspect, the process further comprises adding the second extractant and the second organic phase at an aqueous to organic ratio of about 2 to 1, where the second extractant is present at greater than 0.1 volume % to less than or equal to about 15 volume % and the second organic phase is present at greater than or equal to about 85 volume % to less than or equal to about 99.9 volume %.

In one aspect, the separating manganese (Mn) from the waste liquid stream results in a first product stream comprising manganese (Mn) at a purity level of greater than or equal to about 98%, the recovering cobalt (Co) from the retentate results in a second product stream comprising cobalt (Co) at a purity level of greater than or equal to about 98%, and the recovering nickel (Ni) from the filtrate results in a third product stream comprising nickel (Ni) at a purity level of greater than or equal to about 99%.

In one aspect, a separation efficiency for each of copper (Cu), iron (Fe), and zinc (Zn) is respectively greater than or equal to about 98% and a separation efficiency for fluorine is greater than or equal to about 99%.

In certain aspects, the present disclosure also relates to a system for independently recovering manganese (Mn), cobalt (Co), and nickel (Ni) from a lithium-ion battery waste stream. The system may include a manganese (Mn) recovery unit that receives a waste liquid stream originating from the lithium-ion battery waste stream comprising manganese (Mn), nickel (Ni), and cobalt (Co), the manganese (Mn) recovery unit comprising at least one first reactor, a source of a first oxidant selected from the group consisting of: potassium permanganate ($KMnO_4$), sodium permanganate ($NaMnO_4$), and combinations thereof, a source of ozone ($O_3$), a first filter downstream of the at least one first reactor, wherein the at least one first reactor has a plurality of inlets receiving the first oxidant, the ozone ($O_3$), and the waste liquid stream, a first agitator, and a first outlet through which the waste liquid stream exits to enter the first filter for separation into a first filtrate and a first retentate comprising manganese dioxide ($MnO_2$). The system may also include a separation unit having a separation reactor, a second filter downstream of the separation reactor, a source of a first base, a source of a first acid, a source of a second oxidant, and a source of sodium hypochlorite (NaClO). The separation reactor has a plurality of third inlets receiving the first base, the first acid, the second oxidant, the sodium hypochlorite (NaClO), and the first retentate, a third agitator, and a third outlet through which the first retentate exits to enter the second filter for separation into a second filtrate and a second retentate comprising cobalt oxyhydroxide (COOH). The system also includes a cobalt (Co) recovery unit downstream of the separation unit that receives the second retentate comprising cobalt oxyhydroxide (COOH). The cobalt (Co) recovery unit comprises: a source of at least a second acid, a source of a third oxidant, at least a fourth reactor having a plurality of fourth inlets receiving the second acid, the third oxidant, and the third retentate, a fourth agitator, and a fourth outlet through which the third retentate exits. The system also comprises one or more cobalt (Co) processing units downstream from the at least a fourth reactor selected from: one or more chromatographic columns for separating nickel (Ni) from cobalt (Co); a first evaporator or crystallizer to form cobalt sulfate ($CoSO_4$); and/or a first precipitator to form cobalt hydroxide/oxyhydroxide ($Co(OH)_2$). The system also comprises a nickel (Ni) recovery unit downstream of the separation unit that receives the second filtrate. The nickel (Ni) recovery unit comprises one or more of: a second evaporator/crystallizer to form nickel sulfate ($NiSO_4$); and/or a second precipitator to form nickel hydroxide ($Ni(OH)_2$). The system further includes a fluid conduit system for establishing fluid communication between the manganese (Mn) recovery unit, the separation unit, the cobalt (Co) recovery unit, and the nickel (Ni) recovery unit. The system also includes at least one pump for circulating fluids within the fluid conduit system.

In one aspect, the waste stream further comprises lithium (Li) and the system further comprises a coprecipitation unit disposed between the manganese (Mn) recovery unit and the separation unit that receives the first filtrate from the manganese (Mn) recovery unit, the coprecipitation unit having a coprecipitation reactor, a third filter downstream of the coprecipitation reactor, a source of a second base. The coprecipitation reactor has a plurality of second inlets receiving the second base and the first filtrate, a second agitator, and a second outlet through which the first filtrate exits to enter the third filter for separation into a third filtrate comprising (Li) and a third retentate comprising nickel hydroxide ($Ni(OH)_2$) and cobalt hydroxide ($Co(OH)_2$). The separation unit receives and processes the third retentate.

In one further aspect, the system further comprises a lithium recovery unit that receives the third filtrate from the coprecipitation unit and comprises a sixth reactor to precipitate at least one compound comprising lithium (Li), a fourth filter downstream of the sixth reactor, a source of sodium carbonate ($Na_2CO_3$), the sixth reactor having a plurality of sixth inlets receiving the third filtrate and the sodium carbonate ($Na_2CO_3$), a sixth agitator, a sixth outlet through which the third filtrate exits to enter the fourth filter for separation into a fourth retentate comprising the at least one compound comprising lithium (Li) and a waste stream.

In one further aspect, the lithium recovery unit further comprises at least one evaporator to remove water from the third filtrate.

In one further aspect, the lithium recovery unit further comprises a source of sodium hydroxide (NaOH) and one of the plurality of sixth inlets of the sixth reactor receives the sodium hydroxide (NaOH).

In one further aspect, the lithium recovery unit further comprises a thermal shock unit and an electrode ionization unit upstream of the sixth reactor.

In one further aspect, the system further comprises a leaching reactor unit upstream of a manganese (Mn) recovery unit, the leaching reactor unit comprising a seventh reactor to form a leachate stream, a source of sulfuric acid ($H_2SO_4$), a source of hydrogen peroxide ($H_2O_2$), and a source of deionized water ($H_2O$), and a fifth filter downstream of the seventh reactor, the seventh reactor having a plurality of seventh inlets that receive a lithium-ion battery waste black mass, sulfuric acid ($H_2SO_4$), hydrogen peroxide ($H_2O_2$), and deionized water ($H_2O$), a sixth agitator, and a sixth outlet through which a leachate stream exits to enter the fifth filter for separation into the waste liquid stream and a fifth retentate comprising graphite.

In one further aspect, the system comprises an impurity removal unit upstream of a manganese (Mn) recovery unit, the impurity removal unit comprising a solvent extraction vessel, and an eighth reactor, a source of hydrogen peroxide ($H_2O_2$), a source of calcium oxide (CaO), a source of third base, and a sixth filter downstream of the eighth reactor, the eighth reactor having a plurality of eighth inlets that receive the waste liquid stream, hydrogen peroxide ($H_2O_2$), calcium oxide, and an eighth outlet through which the waste liquid stream exits the eighth reactor to enter the sixth filter for separation into a purified waste liquid stream and a sixth retentate comprising a plurality of precipitated compounds comprising fluorine (F), phosphorus (P), copper (Cu), aluminum (Al), iron (Fe), and titanium (Ti).

In one aspect, the one or more chromatographic columns for separating nickel (Ni) from cobalt (Co) comprise a stationary phase comprising a functional group of bis-picolylamine.

In certain aspects, the present disclosure further relates to a process for recovering manganese (Mn), cobalt (Co), and nickel (Ni) from a lithium-ion battery waste stream. The process may comprise processing a waste liquid stream comprising manganese (Mn), nickel (Ni), and cobalt (Co) originating from the lithium-ion battery waste stream in a system having a first metal recovery unit and a second metal recovery unit by either recovering a co-precipitated product comprising manganese (Mn), nickel (Ni), and cobalt (Co) in the first metal recovery unit or recovering a first product comprising manganese (Mn), a second product comprising nickel (Ni), and a third product comprising (Co) in the second metal recovery unit. The (a) recovering the co-precipitated product in the first metal recovery unit comprises separating the manganese (Mn), nickel (Ni), and cobalt (Co) from the waste liquid stream by conducting a co-precipitation process in a reactor by increasing pH to greater than or equal to about 10 to form a precipitated solid and separating the precipitated solid from the waste liquid stream to recover the co-precipitated product comprising manganese (Mn), nickel (Ni), and cobalt (Co). Alternatively, the process may comprise (b) the recovering the first product comprising manganese (Mn), the second product comprising nickel (Ni), and the third product comprising (Co) in the second metal recovery unit comprises separating manganese (Mn) from the waste liquid stream to form the first product comprising manganese (Mn). This process may comprise (i) introducing a first oxidant to the waste liquid stream to form solid manganese dioxide ($MnO_2$); (ii) reacting the waste liquid stream with ozone ($O_3$) to form solid manganese dioxide ($MnO_2$); or (iii) both (i) and (ii). The method may further comprise separating the solid manganese dioxide ($MnO_2$) from the waste liquid stream to recover the first product comprising manganese (Mn). The method also comprises separating nickel (Ni) and cobalt (Co) from the waste liquid stream by: (iv) adding sulfuric acid ($H_2SO_4$) and a second oxidant to treat the waste liquid stream, followed by adjusting pH to greater than or equal to about 4, adding sodium hypochlorite (NaClO) to form cobalt oxyhydroxide (COOH), passing the waste liquid stream through a first filter to form a first retentate comprising cobalt oxyhydroxide (COOH) and a first filtrate comprising nickel (Ni) and liquid; (v) recovering cobalt (Co) from the first retentate by purifying the cobalt oxyhydroxide (COOH) in the first retentate and adding sulfuric acid ($H_2SO_4$) and a third oxidant to the first retentate, followed by adjusting pH to greater than or equal to about 4, then by adding NaClO and finally passing the first retentate through a second filter to form a second retentate comprising cobalt oxyhydroxide (COOH); and (vi) recovering cobalt (Co) from the second retentate by purifying the cobalt oxyhydroxide (COOH) in the second retentate by adding sulfuric acid ($H_2SO_4$) and a fourth oxidant to the second retentate to form cobalt sulfate ($CoSO_4$), followed by one or more of the following processes to form the third product comprising (Co): (a) removing liquid from the second retentate to recover cobalt sulfate ($CoSO_4$); and/or (b) adjusting pH of the second retentate to greater than or equal to about 9 to precipitate a cobalt hydroxide product comprising one or more of cobalt hydroxide ($Co(OH)_2$) or cobalt oxyhydroxide (COOH). The process also comprises recovering nickel (Ni) from the first filtrate as the second product comprising nickel (Ni) by one of the following processes: (a) removing liquid from the first filtrate to recover nickel sulfate ($NiSO_4$); and (b) adjusting the pH of the first filtrate to be greater than or equal to about 9 to precipitate nickel hydroxide ($Ni(OH)_2$).

In one aspect, the recovering nickel (Ni) as the second product comprising nickel (Ni) by the (b) adjusting the pH of the first filtrate to be greater than or equal to about 9 to precipitate nickel hydroxide ($Ni(OH)_2$) further comprises adding sulfuric acid ($H_2SO_4$) and a fifth oxidant to treat the nickel hydroxide ($Ni(OH)_2$) to form nickel sulfate ($NiSO_4$), followed by removing liquid to recover nickel sulfate ($NiSO_4$).

In one aspect, the waste liquid stream further comprises lithium (Li) and prior to the (iv) adding sulfuric acid ($H_2SO_4$) and the second oxidant to the waste liquid stream, co-precipitating nickel (Ni) and cobalt (Co) by increasing pH of the waste liquid stream to greater than or equal to about 9 to precipitate nickel hydroxide ($Ni(OH)_2$) and cobalt hydroxide ($Co(OH)_2$), passing the waste liquid stream through a third filter to generate a third retentate that is processed during (iv) comprising nickel hydroxide ($Ni(OH)_2$) and cobalt hydroxide ($Co(OH)_2$) and a third filtrate comprising lithium (Li).

In one aspect, the first oxidant is selected from the group consisting of: potassium permanganate ($KMnO_4$), sodium permanganate ($NaMnO_4$), and combinations thereof.

In one further aspect, the first oxidant comprises potassium permanganate ($KMnO_4$) and is selected to be less than or equal to about 95% of a stoichiometric amount in a reaction between the potassium permanganate ($KMnO_4$) and manganese sulfate ($MnSO_4$).

In one aspect, the second oxidant comprises hydrogen peroxide ($H_2O_2$).

In one aspect, the separating of manganese (Mn) comprises (iii) both (i) the introducing the first oxidant to the waste liquid stream to form a first amount of manganese dioxide ($MnO_2$) and (ii) the reacting the waste liquid stream with ozone ($O_3$) to form a second amount of manganese dioxide ($MnO_2$).

In one further aspect, about 95% of manganese is removed from the waste liquid stream during (i) and about 5% of manganese is removed from the waste liquid stream during (ii).

In one aspect, the separating of manganese (Mn) further comprises passing the waste liquid stream through a third filter to separate and recover manganese dioxide ($MnO_2$).

In one aspect, (i) the introducing the first oxidant to the waste liquid stream further comprises adjusting a pH of the waste liquid stream to greater than or equal to about 1.5 to less than or equal to about 3.

In one aspect, the (iv) adding sulfuric acid ($H_2SO_4$) and the second oxidant to the waste liquid stream, followed by adjusting pH to greater than or equal to about 4, further comprises adding sodium hydroxide (NaOH) to the waste liquid stream followed by the adding the sodium hypochlorite (NaClO) and stirring for greater than or equal to about 1 hour, where the waste liquid stream has a temperature of greater than or equal to about 50° C. to less than or equal to about 60° C.

In one aspect, after the passing the first retentate through the second filter to form the second retentate, washing the second retentate with water at a temperature of greater than or equal to about 50° C. to less than or equal to about 75° C. to remove residual nickel (Ni) from the cobalt oxyhydroxide (COOH).

In one aspect, after the passing the first retentate through the second filter to form the second retentate, washing the second retentate with a sulfuric acid wash about 30 minutes to remove any residual nickel (Ni) from the cobalt oxyhydroxide (COOH).

In one aspect, the separating manganese (Mn) from the waste liquid stream results in the first product comprising manganese (Mn) at a purity level of greater than or equal to about 98%, the (v) recovering cobalt (Co) from the second retentate results in the second product comprising cobalt (Co) at a purity level of greater than or equal to about 98%, and the (vii) recovering nickel (Ni) from the second filtrate results in the third product comprising nickel (Ni) at a purity level of greater than or equal to about 99%.

In certain aspects, the present disclosure also relates to a process for recovering manganese (Mn), cobalt (Co), and nickel (Ni) from a lithium-ion battery waste stream. The process optionally comprises purifying a waste liquid stream originating from the lithium-ion battery waste stream, wherein the waste liquid stream comprises sulfuric acid ($H_2SO_4$), manganese (Mn), cobalt (Co), and nickel (Ni) to remove fluorine (F), phosphorus (P), and one or more impurity metals selected from the group consisting of: copper (Cu), iron (Fe), zinc (Zn), aluminum (Al), and titanium (Ti). The purifying includes (i) removing copper (Cu), iron (Fe), and zinc (Zn) from the waste liquid stream by a solvent extraction process; (ii) adding a source of calcium oxide and a first oxidant to the waste liquid stream to remove fluorine (F) by precipitating calcium fluoride ($CaF_2$); and (iii) adjusting pH of the waste liquid stream to greater than or equal to about 3 to less than or equal to about 5 for a first duration and further adjusting pH of the waste liquid stream to greater than or equal to about 4.8 to less than or equal to about 7.2 to remove one or more impurity compounds comprising an element selected from the group consisting of: copper (Cu), iron (Fe), zinc (Zn), aluminum (Al), and titanium (Ti), phosphorus (P), and lead (Pb), and combinations thereof. The process also includes processing the waste liquid stream in either a first metal recovery unit or a second metal recovery unit by either recovering a co-precipitated product comprising manganese (Mn), nickel (Ni), and cobalt (Co) in the first metal recovery unit or recovering a first product comprising manganese (Mn), a second product comprising nickel (Ni), and a third product comprising (Co) in the second metal recovery unit. The recovering the co-precipitated product in the first metal recovery unit comprises separating the manganese (Mn), nickel (Ni), and cobalt (Co) from the waste liquid stream by conducting a co-precipitation process in a reactor by increasing pH to greater than or equal to about 10 to form a precipitated solid and separating the precipitated solid from the waste liquid stream to recover the co-precipitated product comprising manganese (Mn), nickel (Ni), and cobalt (Co). The recovering the first product comprising manganese (Mn), the second product comprising nickel (Ni), and the third product comprising (Co) in the second metal recovery unit comprises separating manganese (Mn) from the waste liquid stream to form the first product comprising manganese (Mn) by a process comprising (iv) introducing a second oxidant to the waste liquid stream to form solid manganese dioxide ($MnO_2$); (v) reacting the waste liquid stream with ozone ($O_3$) to form solid manganese dioxide ($MnO_2$); or (vi) both (iv) and (v). The process may thus include removing the solid manganese dioxide ($MnO_2$) from the waste liquid stream. The process may also include separating nickel (Ni) and cobalt (Co) from the waste liquid stream by: (vii) adding sulfuric acid ($H_2SO_4$) and a third oxidant to the waste liquid stream, followed by adjusting pH to greater than or equal to about 4, adding sodium hypochlorite (NaClO) to form cobalt oxyhydroxide (COOH), passing the waste liquid stream through a first filter to form a first retentate comprising cobalt oxyhydroxide (COOH) and a first filtrate comprising nickel (Ni) and liquid and (viii) recovering cobalt (Co) from the first retentate by purifying the cobalt oxyhydroxide (COOH) in the first retentate and adding sulfuric acid ($H_2SO_4$) and a fourth oxidant to the first retentate followed by adjusting pH to greater than or equal to about 4, passing the first retentate through a second filter to form a second retentate comprising cobalt oxyhydroxide (COOH) and a second filtrate; and (ix) recovering cobalt (Co) from the second retentate by purifying the cobalt oxyhydroxide (CoOOH) in the second retentate by adding sulfuric acid ($H_2SO_4$) and a fifth oxidant to the second retentate to form cobalt sulfate ($CoSO_4$), followed by one or more of the following processes to form the third product comprising (Co). The processes may include (a) removing liquid from the second retentate to recover cobalt sulfate ($CoSO_4$); and/or (b) adjusting pH of the second retentate to greater than or equal to about 9 to precipitate a cobalt hydroxide product comprising one or more of cobalt hydroxide ($Co(OH)_2$) or cobalt oxyhydroxide (COOH). The process may also comprise recovering nickel (Ni) from the second filtrate as the second product comprising nickel (Ni) by one of the following processes: (a) removing liquid from the second filtrate to recover nickel sulfate ($NiSO_4$); and/or (b) adjusting pH of the second filtrate to greater than or equal to about 9 to precipitate nickel hydroxide ($Ni(OH)_2$).

In one aspect, the second oxidant is selected from the group consisting of: potassium permanganate ($KMnO_4$), sodium permanganate ($NaMnO_4$), and combinations thereof.

In one aspect, the second oxidant comprises potassium permanganate ($KMnO_4$) and is selected to be less than or equal to about 95% of a stoichiometric amount in a reaction between the potassium permanganate ($KMnO_4$) and manganese sulfate ($MnSO_4$).

In one aspect, the first oxidant, the third oxidant, the fourth oxidant, and the fifth oxidant are independently selected from the group consisting of: hydrogen peroxide ($H_2O_2$), ozone ($O_3$), sodium hypochlorite (NaClO), and combinations thereof.

In one aspect, the first oxidant, the third oxidant, the fourth oxidant, and the fifth oxidant each comprises hydrogen peroxide ($H_2O_2$).

In one aspect, during the introducing the second oxidant to the waste liquid stream, a pH of the waste liquid stream is adjusted to be greater than or equal to about 1.5 to less than or equal to about 3.

In one aspect, the removing the solid manganese dioxide ($MnO_2$) from the waste liquid stream further comprises passing the waste liquid stream through a third filter to separate and recover the solid manganese dioxide ($MnO_2$).

In one aspect, the waste liquid stream further comprises lithium (Li), wherein prior to (vii) adding sulfuric acid ($H_2SO_4$) and a second oxidant to the waste liquid stream, co-precipitating nickel (Ni) and cobalt (Co) by increasing pH of the waste liquid stream to greater than or equal to about 9 to precipitate nickel hydroxide ($Ni(OH)_2$) and cobalt hydroxide ($Co(OH)_2$), passing the waste liquid stream through a third filter to generate a third retentate comprising nickel hydroxide ($Ni(OH)_2$) and cobalt hydroxide ($Co(OH)_2$) that is processed during (vii) and a third filtrate comprising lithium (Li).

In one further aspect, the co-precipitating nickel (Ni) and cobalt (Co) occurs in an inert atmosphere.

In one further aspect, the process further comprises recovering lithium (Li) by further processing the third filtrate to form at least one compound comprising lithium (Li) by concentrating lithium (Li) and adding sodium carbonate ($Na_2CO_3$) to precipitate lithium carbonate ($Li_2CO_3$).

In one further aspect, the concentrating lithium (Li) comprises evaporating water and the adding sodium carbonate ($Na_2CO_3$) further comprises adding an inorganic base to increase a pH of the third filtrate to greater than or equal to about 12, wherein the third filtrate has a temperature of greater than or equal to about 70° C. to less than or equal to about 95° C. to precipitate lithium carbonate ($Li_2CO_3$).

In one aspect, the (vii) adding sulfuric acid ($H_2SO_4$) and the third oxidant to the waste liquid stream, followed by the adjusting pH to greater than or equal to about 4, further comprises adding sodium hydroxide (NaOH) followed by adding the sodium hypochlorite (NaClO) and stirring for greater than or equal to about 1 hour where the waste liquid stream has a temperature of greater than or equal to about 50° C. to less than or equal to about 60° C.

In one further aspect, after the passing the waste liquid stream through the first filter to form the first retentate comprising cobalt oxyhydroxide (COOH), washing the first retentate with water to remove residual nickel (Ni) at a temperature of greater than or equal to about 50° C. to less than or equal to about 75° C.

In one further aspect, after the passing the first retentate through the second filter to form the second retentate comprising cobalt oxyhydroxide (COOH), washing the second retentate with a sulfuric acid wash for greater than or equal to about 30 minutes to remove any residual nickel (Ni).

In one further aspect, the solvent extraction process further comprises first mixing the waste liquid stream with a first extractant and a first organic phase to remove copper (Cu) and then mixing the waste liquid stream with a second extractant and a second organic phase to remove at least iron (Fe) and zinc (Zn).

In one further aspect, the first extractant comprises 2-hydroxy-5-nonylbenzaldehyde oxime, the second extractant comprises bis-(2-ethylhexyl)phosphoric acid and the first organic phase and the second organic phase are independently selected from the group consisting of: kerosene, sulfonated kerosene, hexane, and combinations thereof.

In one further aspect, the process further comprises reducing a pH of the waste liquid stream to less than or equal to about 2, adding the first extractant and the first organic phase at an aqueous to organic ratio of about 1 to 1, where a concentration of the first extractant is greater than 0 volume % to less than or equal to about 20 volume %.

In one further aspect, the process further comprises adding the second extractant and the second organic phase at an aqueous to organic ratio of about 2 to 1, where the second extractant is present at greater than 0.1 volume % to less than or equal to about 15 volume % and the second organic phase is present at greater than or equal to about 85 volume % to less than or equal to about 99.9 volume %.

In one aspect, the separating manganese (Mn) from the waste liquid stream results in the first product comprising manganese (Mn) at a purity level of greater than or equal to about 98%, the recovering cobalt (Co) from the second retentate results in the second product comprising cobalt (Co) at a purity level of greater than or equal to about 98%, and the recovering nickel (Ni) from the second filtrate results in the third product comprising nickel (Ni) at a purity level of greater than or equal to about 99%.

In one aspect, a separation efficiency for each of copper (Cu), iron (Fe), and zinc (Zn) is respectively greater than or equal to about 98% and a separation efficiency for fluorine is greater than or equal to about 99%.

In one aspect, the purifying the lithium-ion battery waste liquid stream further comprises after the (iii) adjusting pH of the waste liquid stream to greater than or equal to about 3 to less than or equal to about 5, the purifying further comprises adjusting the pH to be less than or equal to about 2.5 and conducting a deep impurity removal process to remove additional amounts of one or more of: copper (Cu), iron (Fe), zinc (Zn), aluminum (Al) from the waste liquid stream by solvent extraction.

In one aspect, the purifying the lithium-ion battery waste liquid stream further comprises prior to the (i) removing copper (Cu), iron (Fe), and zinc (Zn) from the waste liquid stream by the solvent extraction process, removing an initial amount of aluminum (Al) by increasing a pH of the waste liquid stream to precipitate an aluminum compound and separating the aluminum compound from the waste liquid stream.

In one aspect, the waste liquid stream further comprises carbon-based compounds and the purifying the lithium-ion battery waste liquid stream further comprises prior to the (i) removing copper (Cu), iron (Fe), and zinc (Zn) from the waste liquid stream by the solvent extraction process, removing the carbon-based compounds by adding sulfuric acid ($H_2SO_4$) and a sixth oxidant to the waste liquid stream, followed by passing the waste liquid stream through a third filter to remove the carbon-based compounds from the waste liquid stream by forming a third filtrate that comprises the waste liquid stream and a third retentate comprising the carbon-based compounds.

In certain aspects, the present disclosure additionally relates to a system for recovering manganese (Mn), cobalt (Co), and nickel (Ni) from a lithium-ion battery waste stream. The system may comprise a first metal recovery unit configured to recover a co-precipitated product comprising manganese (Mn), nickel (Ni), and cobalt (Co) from a waste liquid stream originating from the lithium-ion battery waste stream comprising manganese (Mn), nickel (Ni), and cobalt (Co) or a second metal recovery unit configured to recover a first product comprising manganese (Mn) in a manganese (Mn) recovery unit, a second product comprising nickel (Ni) in a nickel (Ni) recovery unit, and a third product comprising cobalt (Co) in a cobalt (Co) recovery unit. The first metal recovery unit includes a co-precipitation reactor that comprises: a plurality of co-precipitation reactor inlets that receive the waste liquid stream, a chelating agent, and sodium hydroxide (NaOH); a co-precipitation reactor agitator; and at least one co-precipitation reactor outlet. The co-precipitation reactor is in thermal communication with a heat source and is configured to generate a co-precipitated product comprising manganese (Mn), nickel (Ni), and cobalt (Co). The second metal recovery unit includes a manganese (Mn) recovery unit comprising at least one first reactor, a source of a first oxidant selected from the group consisting of: potassium permanganate ($KMnO_4$), sodium permanganate ($NaMnO_4$), and combinations thereof, a source of ozone ($O_3$), a first filter downstream of the at least one first reactor. The at least one first reactor has a plurality of first inlets receiving the first oxidant, the ozone ($O_3$), and the waste liquid stream, a first agitator, and a first outlet through which the waste liquid stream exits to enter the first filter for separation into a first filtrate and a first retentate comprising manganese dioxide ($MnO_2$). The manganese (Mn) recovery unity also includes a separation unit that receives the first filtrate. The separation unit has a separation reactor, a second filter downstream of the separation reactor, a source of a first base, a source of a first acid, a source of a second oxidant, and a source of sodium hypochlorite (NaClO). The separation reactor has a plurality of second inlets receiving the first base, the first acid, the second oxidant, the sodium hypochlorite (NaClO), and the first filtrate, a second agitator, and a second outlet through which the first filtrate exits to enter a second filter for separation into a second filtrate and a second retentate comprising cobalt oxyhydroxide (COOH). A cobalt (Co) recovery unit is disposed downstream of the separation unit that receives the second retentate comprising cobalt oxyhydroxide (COOH). The cobalt (Co) recovery unit comprises a source of at least a second acid, a source of a third oxidant, at least a third reactor having a plurality of third inlets receiving the second acid, the third oxidant, and the second retentate, a third agitator, and a third outlet through which the second retentate exits. There are one or more cobalt (Co) processing units downstream from the at least a third reactor selected from: one or more chromatographic columns for separating nickel (Ni) from cobalt (Co); a first evaporator or crystallizer to form cobalt sulfate ($CoSO_4$); and/or a first precipitator to form a cobalt hydroxide product comprising one or more of cobalt hydroxide ($Co(OH)_2$) or cobalt oxyhydroxide (COOH). Further, a nickel (Ni) recovery unit is disposed downstream of the separation unit that receives the second filtrate, the nickel (Ni) recovery unit comprising one or more of: a second evaporator/crystallizer to form nickel sulfate ($NiSO_4$); a precipitator reactor to form nickel hydroxide ($Ni(OH)_2$); and/or at least a fourth reactor to form nickel sulfate ($NiSO_4$) having a plurality of fourth inlets receiving $Ni(OH)_2$, a third acid, and a fourth oxidant, a fourth agitator, and a fourth outlet through which a stream comprising nickel sulfate ($NiSO_4$) exits. The first and second metal recovery units also includes a fluid conduit system for establishing fluid communication between various components and at least one pump for circulating fluids within the fluid conduit system.

In one aspect, the waste liquid stream further comprises lithium (Li) and the second metal recovery unit further comprises a nickel (Ni) and cobalt (Co) coprecipitation unit disposed between the manganese (Mn) recovery unit and the separation unit, wherein the nickel (Ni) and cobalt (Co) coprecipitation unit receives the first filtrate from the manganese (Mn) recovery unit and has a nickel (Ni) and cobalt (Co) coprecipitation reactor, a nickel (Ni) and cobalt (Co) coprecipitation filter downstream of the nickel (Ni) and cobalt (Co) coprecipitation reactor, a source of a second base, wherein the nickel (Ni) and cobalt (Co) coprecipitation reactor has a plurality of coprecipitation inlets receiving the second base and the first filtrate, a coprecipitation reactor agitator, and a coprecipitation outlet through which the first filtrate exits to enter the coprecipitation reactor filter for separation into a coprecipitation retentate comprising nickel hydroxide (Ni(OH)$_2$) and cobalt hydroxide (Co(OH)$_2$) and a coprecipitation filtrate comprising lithium (Li), wherein the coprecipitation retentate is fed to the separation unit by entering the separation reactor via one of the plurality of second inlets.

In one aspect, the method further comprises a lithium recovery unit that receives the coprecipitation filtrate from the coprecipitation unit and comprises a fifth reactor to precipitate at least one compound comprising lithium (Li), a third filter downstream of the fifth reactor, a source of sodium carbonate (Na$_2$CO$_3$) and/or sodium phosphate (Na$_3$PO$_4$), the fifth reactor having a plurality of fifth inlets receiving the coprecipitation filtrate and the sodium carbonate (Na$_2$CO$_3$) and/or sodium phosphate (Na$_3$PO$_4$), a fifth agitator, a fifth outlet through which the coprecipitation filtrate exits to enter the third filter for separation into a lithium retentate comprising the at least one compound comprising lithium (Li) and a waste stream.

In one aspect, the lithium recovery unit further comprises at least one evaporator to remove water from the coprecipitation filtrate.

In one aspect, the lithium recovery unit further comprises a source of sodium hydroxide (NaOH) and one of the plurality of fifth inlets of the fifth reactor receives the sodium hydroxide (NaOH).

In one further aspect, the lithium recovery unit further comprises a thermal shock unit and an electrode ionization unit upstream of the fifth reactor.

In one aspect, the system further comprises a leaching reactor unit upstream of both the first metal recovery unit and the second metal recovery unit. The leaching reactor unit comprises a leaching reactor to form a leachate stream, a source of sulfuric acid (H$_2$SO$_4$), a source of hydrogen peroxide (H$_2$O$_2$), and a source of deionized water (H$_2$O), and a leaching filter downstream of the leaching reactor. The leaching reactor has a plurality of leaching reactor inlets that receive a waste stream, sulfuric acid (H$_2$SO$_4$), hydrogen peroxide (H$_2$O$_2$), and deionized water (H$_2$O), a leaching reactor agitator, and a leaching reactor outlet through which a leachate stream exits to enter the leaching filter for separation into the waste liquid stream and a leaching retentate comprising graphite.

In one further aspect, the system further comprises an aluminum impurity removal unit upstream of the leaching reactor comprising a mixing tank and an aluminum removal reactor downstream of the mixing tank having two inlets that respectively receive a lithium-ion battery black mass and water (H$_2$O) that are mixed to form the liquid waste stream, the aluminum removal reactor including a source of a third base and an aluminum removal filter downstream of the aluminum removal reactor. The aluminum removal reactor has a plurality of aluminum removal reactor inlets that receive the liquid waste stream from the mixing tank and the third base, an aluminum removal reactor agitator, and an aluminum removal reactor outlet through which the liquid waste stream exits to enter the aluminum removal filter for separation into the waste liquid stream and aluminum impurity retentate comprising at least a portion of the aluminum impurities present in the liquid waste stream.

In one aspect, the system further comprises one or more impurity removal units upstream of both the first metal recovery unit and the second metal recovery unit, the one or more impurity removal units for removing one or more of: fluorine (F), phosphorus (P), and one or more impurity metals selected from the group consisting of: copper (Cu), iron (Fe), zinc (Zn), aluminum (Al), and titanium (Ti), from the waste liquid stream, the one or more impurity removal units comprising: a solvent extraction vessel configured to remove one or more impurities comprising an element selected from the group consisting of: copper (Cu), iron (Fe), and zinc (Zn), and combinations thereof, the solvent extraction vessel configured to receive the waste liquid stream and at least one first extractant and a first solvent; a sixth reactor configured to remove one or more solid impurities comprising an element an element selected from the group consisting of: fluorine (F), phosphorus (P), copper (Cu), iron (Fe), zinc (Zn), aluminum (Al), and titanium (Ti), and combinations thereof from the waste liquid stream, the sixth reactor having a plurality of sixth inlets receiving the waste liquid stream, and one or more of: hydrogen peroxide (H$_2$O$_2$), sodium hydroxide (NaOH), and a source of calcium oxide, a sixth agitator, a sixth outlet through which the liquid waste stream exits to enter a sixth filter, where a sixth retentate comprises the one or more solid impurities and a sixth filtrate comprises the waste liquid stream; and/or a deep impurity removal unit configured to further remove one or more impurities comprising an element selected from the group consisting of: copper (Cu), iron (Fe), zinc (Zn), aluminum (Al), and combinations thereof, the deep impurity removal unit configured to receive the waste liquid stream and at least one second extractant and a second solvent.

In one aspect, the one or more chromatographic columns for separating nickel (Ni) from cobalt (Co) comprise a stationary phase comprising a functional group of bis-picolylamine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
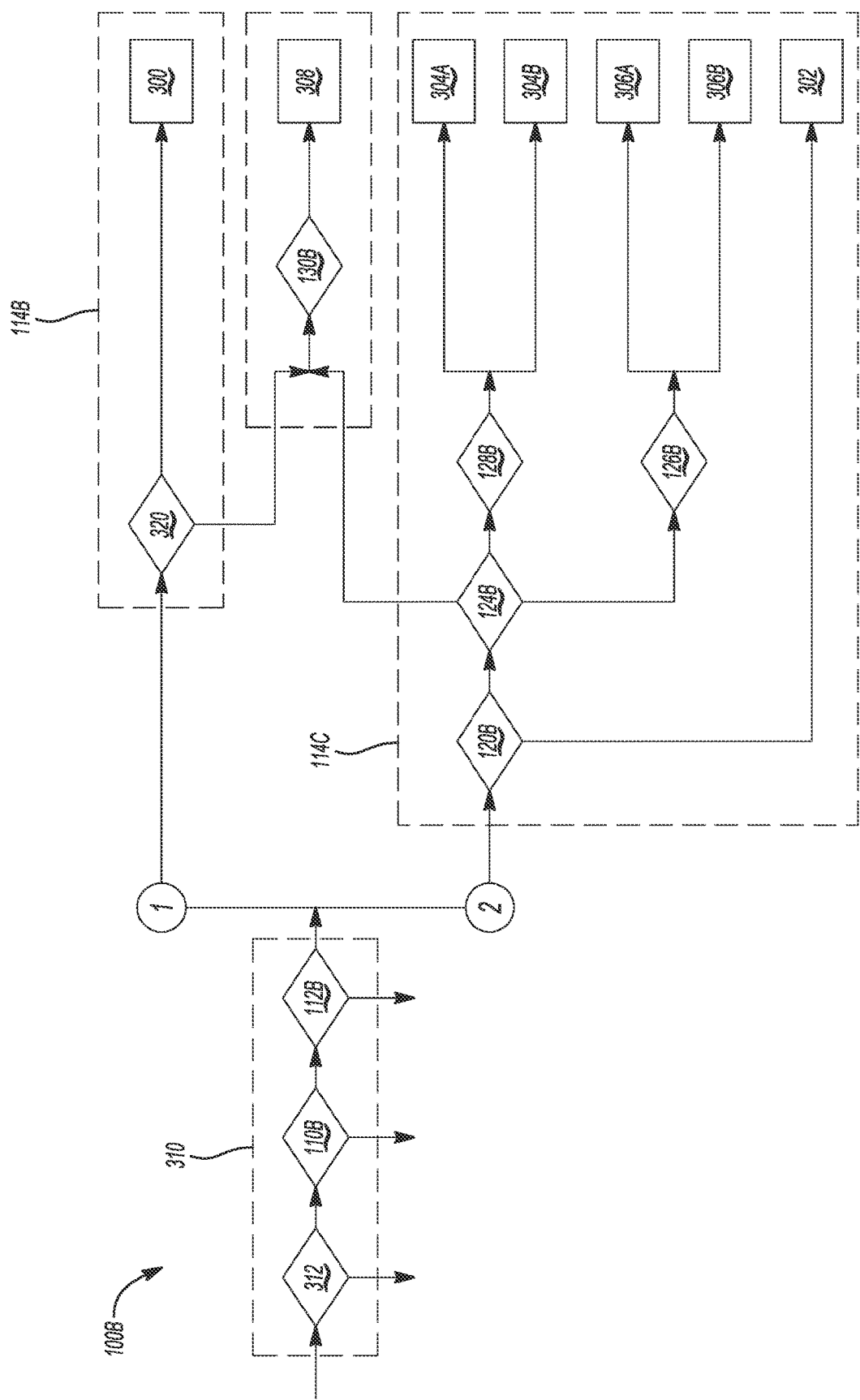

FIG. 4 shows a schematic of an alternative variation of a system according to certain aspects of the present disclosure for purifying a lithium-ion battery waste stream, where the system has an impurity removal unit, a first metal recovery unit for recovering a co-precipitated product comprising manganese (Mn), nickel (Ni), and cobalt (Co) and a second metal recovery unit for recovering a first product comprising manganese (Mn), a second product comprising nickel (Ni), and a third product comprising (Co), and a lithium recovery unit.

Figure 5:
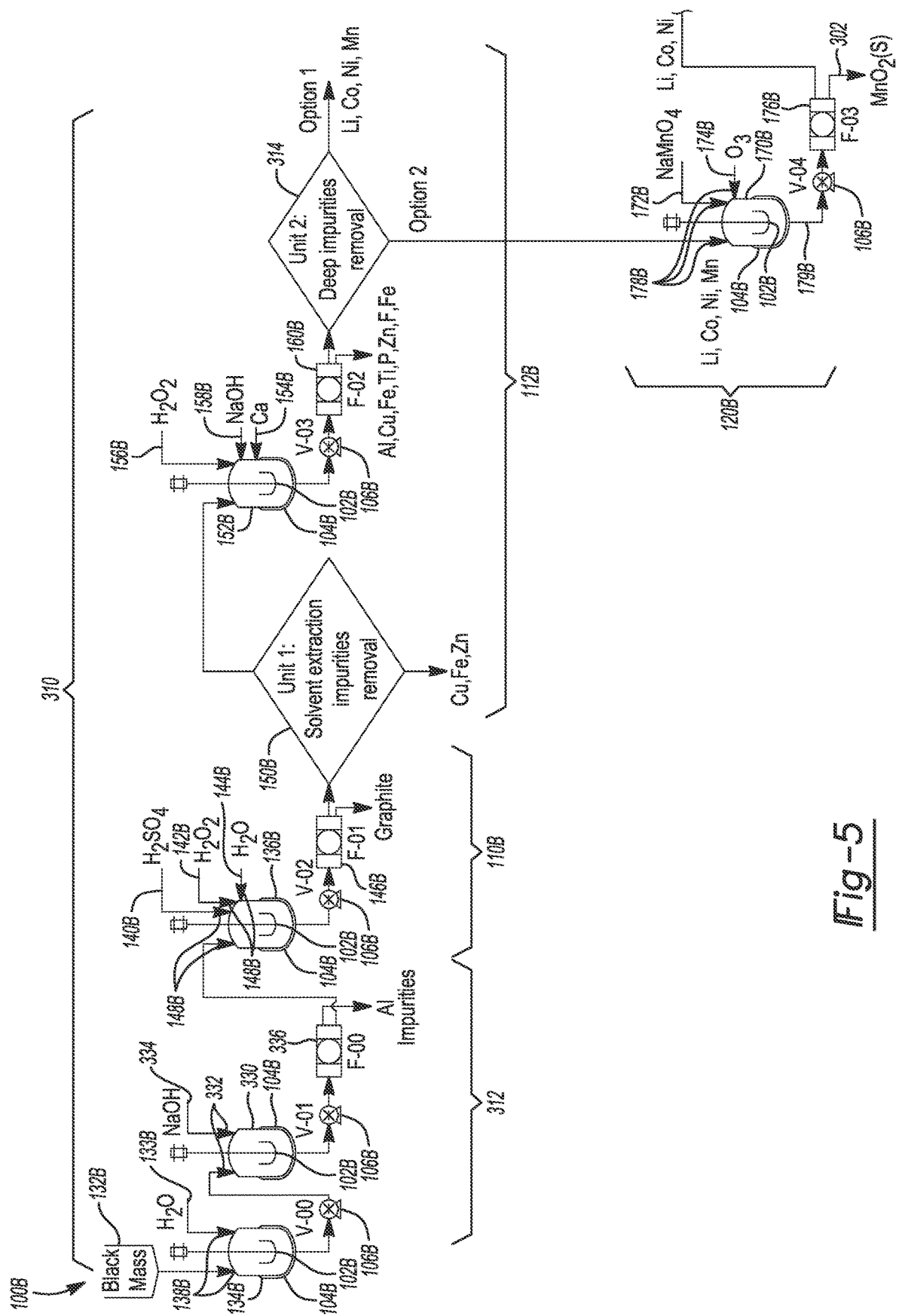

FIG. 5 shows a first portion of a process flow diagram of an example of an alternative variation of a system for purifying a lithium-ion battery waste stream, where the system has an impurity removal unit, a first metal recovery unit for recovering a co-precipitated product comprising manganese (Mn), nickel (Ni), and cobalt (Co) and a second metal recovery unit for recovering a first product comprising manganese (Mn), a second product comprising nickel (Ni), and a third product comprising (Co), and a lithium recovery unit, according to one example embodiment of the present disclosure.

Figure 6:
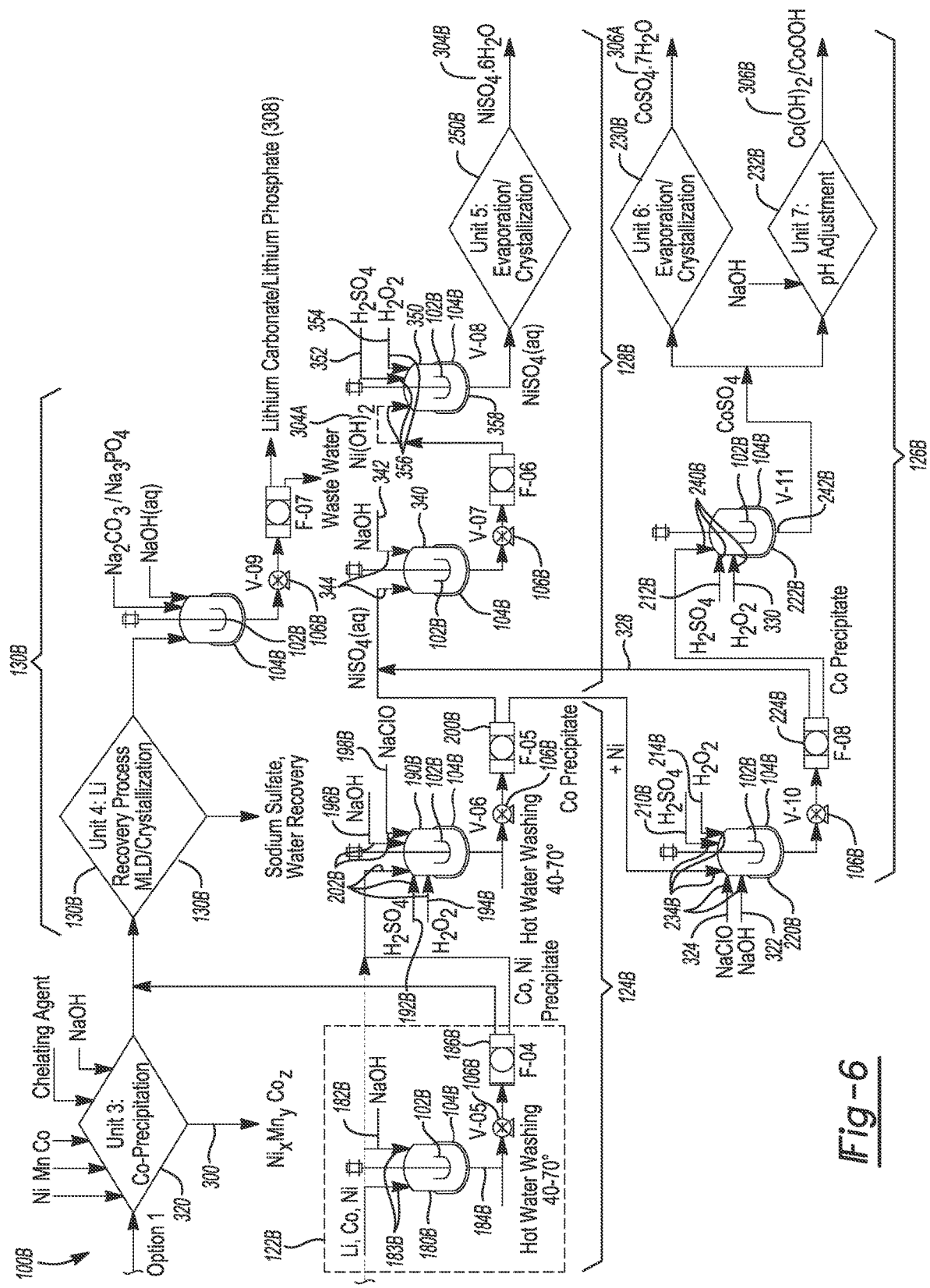

FIG. 6 shows a second portion of a process flow diagram of the example of an alternative variation of the system for purifying the lithium-ion battery waste stream in FIG. 5, where the system has the impurity removal unit, the first metal recovery unit for recovering a co-precipitated product comprising manganese (Mn), nickel (Ni), and cobalt (Co) and the second metal recovery unit for recovering the first product comprising manganese (Mn), the second product comprising nickel (Ni), and the third product comprising (Co), and the lithium recovery unit.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be taken, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. Thus, ranges are, unless specified otherwise, inclusive of endpoints and include disclosure of all distinct values and further divided ranges within the entire range. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Unless otherwise indicated, compositional amounts are on a mass basis. Further, if an amount is expressed as a weight, it may be used interchangeably with mass, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

In the figures, the direction of an arrow, as indicated by the arrowhead, generally demonstrates the flow of material or information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit," for example, when used in the context of a computing device or module, etc. The term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module and/or controller may include one or more interface circuits. In some examples, the interface circuits may include wired or wireless interfaces that are connected to a local area network (LAN), the Internet, a wide area network (WAN), or combinations thereof. The functionality of any given module and/or controller of the present disclosure may be distributed among multiple modules and/or controllers that are connected via interface circuits. For example, multiple modules and/or controllers may allow load balancing. In a further example, a server (also known as remote, or cloud) module and/or controller may accomplish some functionality on behalf of a client module and/or controller.

The term code, as used above, may include software, firmware, and/or microcode, and may refer to programs, routines, functions, classes, data structures, and/or objects. The term shared processor circuit encompasses a single processor circuit that executes some or all code from multiple modules and/or controllers. The term group processor circuit encompasses a processor circuit that, in combination with additional processor circuits, executes some or all code from one or more modules and/or controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules and/or controllers. The term group memory circuit encompasses a memory circuit that, in combination with additional memories, stores some or all code from one or more modules and/or controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python@.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

As noted above, lithium-ion battery waste streams are formed from lithium-ion batteries after they are dismantled, crushed, and/or shredded. Such a waste stream may be a material known as black mass that is intended for recycling. The black mass may collectively include portions of one or more spent lithium-ion batteries, including portions from different types (e.g., having different active materials) of lithium-ion batteries. The black mass typically includes all active materials, so may contain anodic or negative active materials and electrolytic constituents mixed with cathodic active materials. In some examples, spent lithium-ion batteries may include positive electrodes/cathodes made from lithium cobalt oxide (LCO), lithium manganese oxide (LMO), lithium nickel manganese cobalt oxides (NMC), lithium iron phosphate (LFP), lithium nickel cobalt aluminum oxide (NCA), lithium titanate (LTO), and the like. See for example, Table 1 showing a list of common commercial battery active material combinations. The spent lithium-ion batteries may include negative electrodes/anodes made from graphite, lithium titanate oxide ($Li_2TiO_3$— LTO), lithium metal, and the like.

TABLE 1

| Type | Cathode | Anode |
| --- | --- | --- |
| Lithium Cobalt Oxide (LCO or Li-cobalt) | $LiCoO_2$ cathode (~60% Co) | Graphite |
| Lithium Manganese Oxide (LMO or Li-manganese) | $LiMn_2O_4$ | Graphite |
| Lithium Nickel Manganese Cobalt Oxide (NMC) | $LiNiMnCoO_2$ | Graphite |
| Lithium Iron Phosphate (LFP or Li-phosphate) | $LiFePO_4$ | Graphite |
| Lithium Nickel Cobalt Aluminum Oxide (NCA or Li-aluminum) | $LiNiCoAlO_2$ (~9% Co) | Graphite |
| Lithium Titanate (LTO or Li-titanate) | NMC | $Li_2TiO_3$ |

Further, the black mass may include fluorine, such as lithium hexafluorophosphate ($LiPF_6$). As a result, the black mass may comprise metals of interest to be recovered (e.g., precious metals), such as nickel (Ni), manganese (Mn), cobalt (Co), lithium (Li) and the like, as well as impurities, such as iron (Fe), copper (Cu), fluorine (F), phosphorous (P), titanium (Ti), aluminum (Al), and the like. It should be appreciated that the black mass composition may be subject to variations between batches depending on the types of lithium-ion batteries. As one example, a batch of black mass may include the components shown in Table 2 below.

TABLE 2

| Component | Weight, kg | Weight, lb. | Weight % |
| --- | --- | --- | --- |
| Carbon (Graphite) | 105 | 231.5 | 21 |
| Copper | 15 | 33 | 3 |
| $Li_2TiO_3$ | 25 | 55.1 | 5 |
| LiNiCoAl | 75 | 165.3 | 15 |
| LiNiCoMn | 265 | 584.2 | 53 |
| $LiPF_6$ | 15 | 33 | 3 |
| Total | 500 | 1,102.1 | 100% |

As lithium-ion batteries evolve, new active materials may include more complex materials with alternative stoichiometries or multiple metals (e.g., lithium nickel manganese cobalt oxide $Li(Ni_xMn_yCo_z)O_2$, where $0 \leq x \leq 1$, $0 \leq y \leq 1$, $0 \leq z \leq 1$, and $x+y+z=1$, abbreviated NMC, for example, $LiNi_{0.33}Mn_{0.33}Co_{0.33}O_2$ (or NMC 1:1:1) as a positive electrode material). Conventional recycling processes generally have focused on recovering cobalt and lithium from lithium cobalt oxide cathodes. However, spent lithium-ion batteries now often include many other types of cathode materials having valuable metals, such as nickel and manganese, which are desirable to recover. Further, the black mass typically contains many types of impurities. This is especially true when the black mass is derived from a collection of different types of lithium-ion batteries. Such impurities may adversely affect the purity of otherwise valuable metals recovered from recycling.

In various aspects, the systems and processes disclosed herein enable the recycling of spent lithium-ion batteries by removing impurities contained in black mass and recovering various precious metals of interest. By way of example, the methods and systems of the present disclosure provide the ability to process a lithium-ion battery waste stream to separate impurities comprising elements selected from the group consisting of: fluorine (F), phosphate (P), copper (Cu), aluminum (Al), iron (Fe), carbon (C) (e.g., in the form of graphite), titanium (Ti), zinc (Zn), and combinations thereof from one or more recovered metals selected from the group consisting of: nickel (Ni), manganese (Mn), cobalt (Co), and lithium (Li).

Moreover, the present disclosure provides systems and processes for preparing independent or separate streams of manganese (Mn), cobalt (Co), nickel (Ni), and optionally lithium (Li) from lithium-ion battery waste. The systems according to certain alternative variations of the present disclosure may provide flexibility in either preparing independent product streams comprising manganese (Mn), cobalt (Co), or nickel (Ni) or may be configured to create a co-precipitated product, for example, comprising manganese (Mn), nickel (Ni), and cobalt (Co) combined together. For example, in one variation, a product stream comprising manganese (Mn) is first formed by separating (e.g., reacting or precipitating) $MnO_4^-/O_3$ as solid manganese dioxide ($MnO_2$) from a waste liquid solution originating from the lithium-ion battery waste. Separation of cobalt (Co) and nickel (Ni) has been reported to be more difficult and with a low separation rate, because these two metals have very similar physical and chemical properties, especially once they are used in a battery. Thus, it remains quite difficult to separate metals needed to be highly pure (e.g., in some embodiments to greater than or equal to about 99%) and to reuse such product streams in another cathode material for a lithium-ion battery application. Current technologies fail to provide acceptable performance for cobalt and nickel separation due to both high capital equipment and operational expenditure costs, low purity levels achieved, time-consuming processes, lack of durability, and certain processes that are not suitable for application on a large commercial production scale. Here, the present disclosure contemplates a new process which selectively precipitates and removes cobalt (Co), for example, by using sodium hypochlorite (NaClO), inter alia, to form a cobalt-containing stream with high purity levels. Further, a separated stream comprising nickel (Ni), where a cobalt concentration in the solution after this process may be less than or equal to about 50 ppm, can then be processed to recover nickel at high purity levels. For example, nickel (Ni) in the purified stream may be greater than or equal to about 99%, optionally greater than or equal to about 99.5%, and in certain variations, optionally greater than or equal to about 99.9% by mass.

In certain aspects, where the lithium-ion battery waste stream initially includes impurities comprising elements selected from the group consisting of: fluorine (F), phosphorus (P), copper (Cu), aluminum (Al), iron (Fe), carbon (C) (e.g., in the form of graphite), titanium (Ti), zinc (Zn), and combinations thereof, these impurities may be removed to a separation efficiency individually or cumulatively (inclusive of all elements to be removed) of greater than or equal to about may be greater than or equal to about 75%, optionally greater than or equal to about 80%, optionally greater than or equal to about 85%, optionally greater than or equal to about 90%, optionally greater than or equal to about 95%, optionally greater than or equal to about 97%, optionally greater than or equal to about 98%, and in certain variations, optionally greater than or equal to about 99% by mass or any of the values specified below. The separation efficiency may be calculated by comparing an initial amount of a given element present in a stream before processing and a final amount of a given element present in a product after processing or separations. In certain aspects, a separation efficiency (f) for a given component can be expressed by $$\eta = 100 \times \left(\frac{x_i - x_f}{x_i}\right),$$

where $x_i$ is the initial amount (either mass or volume quantity) of a component and $x_f$ is the final amount of the component after the separation process has been completed. In certain variations, an efficiency of separation using the inventive systems may be greater than or equal to about 75%, optionally greater than or equal to about 80%, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, and in certain variations, optionally greater than or equal to about 99% for a select impurity or component (or alternatively for a cumulative total amount of all impurities), as will be described in more detail below.

In certain variations, a separation efficiency for each of copper (Cu), aluminum (Al), titanium (Ti), and iron (Fe) is respectively greater than or equal to about 95%, optionally greater than or equal to about 97%, optionally greater than or equal to about 98%, optionally greater than or equal to about 99%, optionally greater than or equal to about 99.5%, optionally greater than or equal to about 99.8%, and in certain aspects, optionally greater than or equal to about 99.9%.

In certain variations, a separation efficiency for fluorine is greater than or equal to about 85%, optionally greater than or equal to about 90%, optionally greater than or equal to about 95%, optionally greater than or equal to about 97%, optionally greater than or equal to about 98%, and in certain aspects, optionally greater than or equal to about 99%.

In a further aspect, a separation efficiency for each of copper (Cu), aluminum (Al), titanium (Ti), and iron (Fe) is respectively greater than or equal to about 95% and a separation efficiency for fluorine may be greater than or equal to about 85%.

In a further aspect, a separation efficiency for each of copper (Cu), aluminum (Al), titanium (Ti), and iron (Fe) is greater than or equal to about 99.5% up to about 100% and a separation efficiency for fluorine is greater than or equal to about 99%.

In other aspects, the processes of the present disclosure may generate two or more recovered products (comprising nickel (Ni), cobalt (Co), and manganese (Mn)), for example, three or four independent products, including a first product comprising manganese (Mn), a second product comprising cobalt (Co), a third product comprising nickel (Ni), and an optional fourth product comprising lithium (Li), where each respective product has a purity level of greater than or equal to about 95% for the select metal (e.g., one of manganese (Mn), cobalt (Co), nickel (Ni), or lithium (Li)) and comprise less than or equal to about 5% by mass of a total cumulative amount of impurities comprising aluminum (Al), copper (Cu), iron (Fe), phosphorus (P), titanium (Ti) and fluorine (F). For example, a purity level of each of the independently recovered products (comprising nickel (Ni), cobalt (Co), manganese (Mn), or lithium (Li)) may be greater than or equal to about 95% by mass to less than or equal to about 99.5% by mass and comprise greater than or equal to about 0.5% by mass to less than or equal to about 5% by mass of a total cumulative amount of impurities comprising aluminum (Al), copper (Cu), iron (Fe), phosphorus (P), titanium (Ti) and fluorine (F). In one variation, a purity level of each of the independently recovered products (comprising nickel (Ni), cobalt (Co), manganese (Mn), or lithium (Li)) may be greater than or equal to about 96%, optionally greater than or equal to about 97%, optionally greater than or equal to about 98%, and in certain variations, optionally greater than or equal to about 99% for one or more of the target metals to be recovered (manganese (Mn), cobalt (Co), nickel (Ni), and/or lithium (Li)). By way of example, a recovered manganese (Mn) product may comprise greater than or equal to about 95% to about 99% by mass of manganese (Mn) (e.g., one or more manganese compounds) and cumulative impurities at less than or equal to about 5% down to 1% by mass. In one variation, one, two, three, or more recovered product streams respectively have a purity level of greater than or equal to about 98% by mass, optionally greater than or equal to about 99% by mass for a target metal (e.g., manganese (Mn), cobalt (Co), nickel (Ni), and/or lithium (Li)) and comprise less than or equal to about 2% by mass of a total cumulative amount of impurities comprising aluminum (Al), copper (Cu), iron (Fe), phosphorus (P), titanium (Ti) and fluorine (F).

This may be achieved by processing the lithium-ion battery waste stream as feed material in various stages of a system for batch processing, where the contents undergo successive reactions with various reagents to selectively remove the components of interest, such as manganese (Mn), cobalt (Co), nickel (Ni), and lithium (Li) when present, for example nickel-manganese-cobalt oxides (NMC), lithium carbonate ($Li_2CO_3$), and the like. The various stages or units are arranged consecutively providing intermediate processed streams for the next stage units. Such stages may include, for example, a leaching stage or unit, an impurity removal stage or unit, a metal recovery stage, including a separate manganese (Mn) recovery unit, cobalt (Co) recovery unit, nickel (Ni) recovery unit, and/or a lithium recovery stage or unit, as further explained below.

Figure 1:
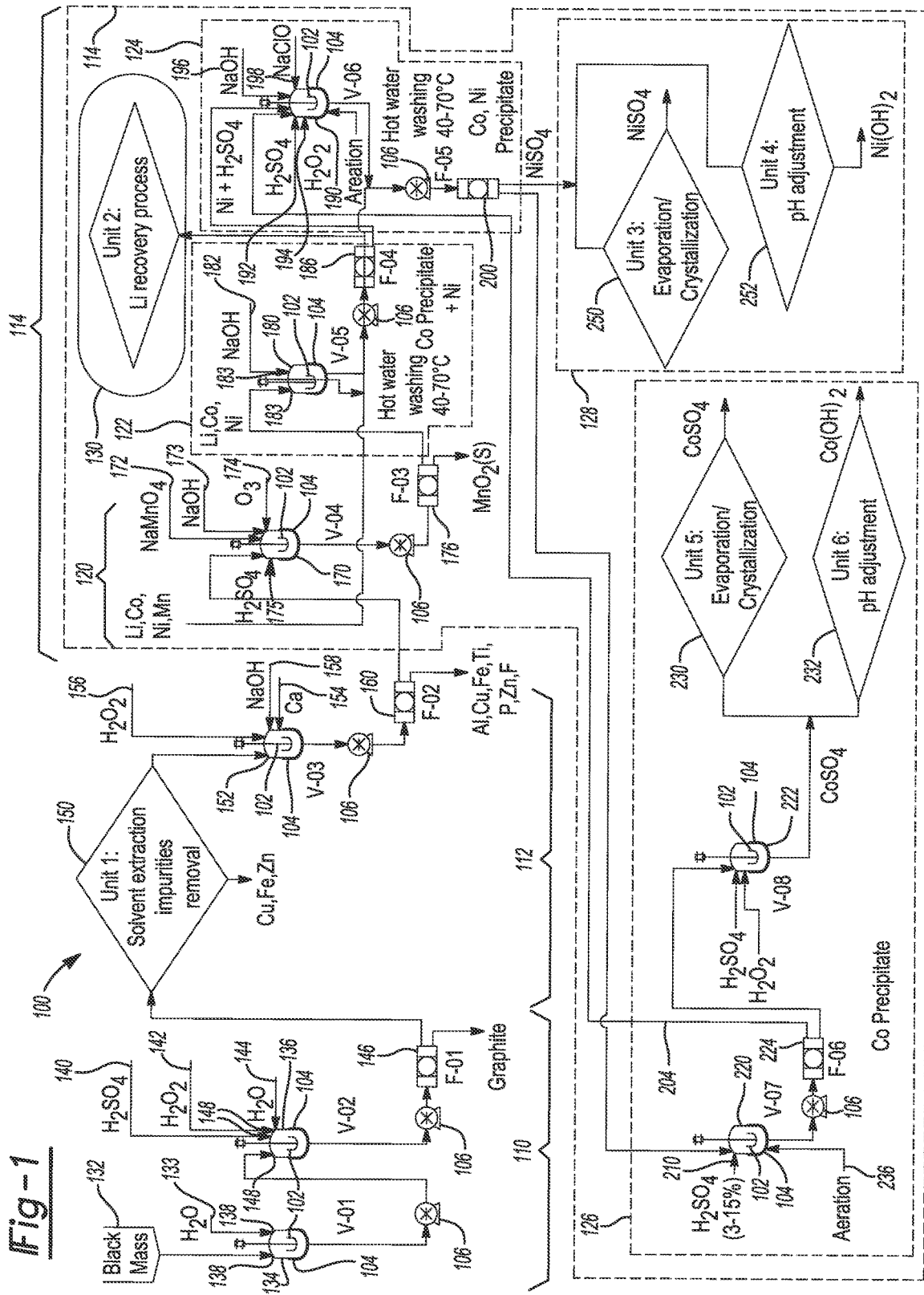
FIG. 1 is a process flow diagram of a system for separating purified streams of manganese (Mn), cobalt (Co), nickel (Ni), and/or lithium (Li) from spent lithium-ion battery waste, including various stages for removing impurities and recovering the manganese (Mn), cobalt (Co), nickel (Ni), and/or lithium (Li), according to one example embodiment of the present disclosure.
Figure 2:
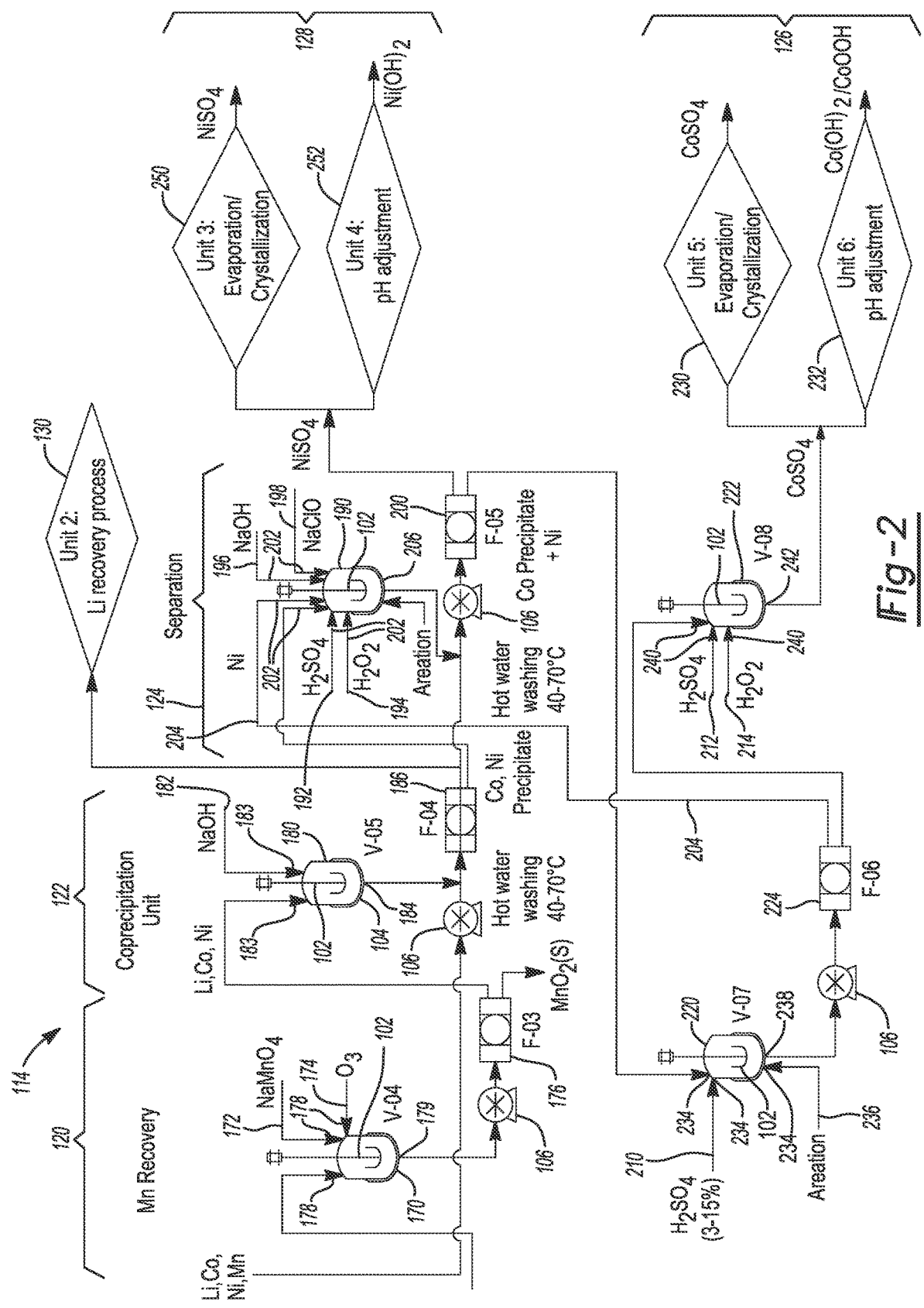
FIG. 2 is a detailed view of a process flow diagram for a metal recovery unit or stage of FIG. 1 where a first product comprising manganese (Mn), a second product comprising cobalt (Co), and a third product comprising nickel (Ni) are formed.

In certain aspects, the present disclosure contemplates a process for recovering metals from a lithium-ion battery waste stream. An optional first leaching step may be conducted on a lithium-ion battery waste stream, for example, comprising a black mass that is subjected to a leaching process, or the waste stream may be received pre-processed, as will be described further below. For example, a system for removing impurities and independently recovering various precious metals from one or more spent lithium-ion batteries according to one example embodiment of the present disclosure is illustrated in FIGS. 1 and 2 and indicated generally by the reference number 100. The system includes a leaching unit or stage 110, an impurity removal unit or stage 112, and a metal recovery unit or stage 114. FIG. 2 shows a more detailed view of metal recovery unit or stage 114 that includes a manganese (Mn) recovery unit 120, an optional coprecipitation unit 122, a separation unit 124, a cobalt (Co) recovery unit 126, a nickel (Ni) recovery unit 128, and a lithium (Li) recovery unit 130. As shown, a process may be conducted in system 100 that includes various consecutively arranged stages including the leaching unit or stage 110, the impurity removal unit or stage 112, and the metal recovery system or stage 114.

In the respective units or stages 110, 112, 114, contents are collected and processed in various reactors or vessels (by way of example, first and second reactors 134, 136, an impurity removal reactor 152, and the like, as will be described in further detail below). Each reactor may be a jacketed, agitated tank that is internally coated with a corrosion-resistant lining to withstand hot acidic conditions that may occur in the system 100. For example, each reactor may include an agitator 102 for stirring contents, and a jacket 104 surrounding its respective reactor to circulate a heating/cooling medium (e.g., steam, etc.) for maintaining a desired temperature. For instance, one reactor may include a suitable agitator extending into an interior portion of the reactor, and a thermal jacket surrounding an exterior portion of the reactor for circulating a heating/cooling medium to maintain and/or adjust the temperature of contents in the rector at and/or to a desired level. In various embodiments, the thermal jacket may include, for example, a pipe (e.g., a metallic pipe) coiled around the reactor. The thermal jacket may extend a defined distance (e.g., length) from a bottom of the reactor. The circumference of the pipe and/or the distance the jacket extends up the reactor may depend on, for example, the amount of energy required to change and/or maintain the temperature with the heating/cooling medium.

The system 100 may further have pipes or other conduits, valves, and a plurality of pumps 106 that move the liquid streams between reactors or vessels. Thus, any one of the pumps disclosed herein may include any suitable type of pump. In some examples, the pumps 106 may be centrifugal pumps as shown in FIG. 1, positive-displacement pumps, axial-flow pumps, or the like.

The process in the system 100 begins at the leaching stage 110, which may include a black mass source 132, a water source 133, and one or more reactors. In the example of FIG. 1, there are two distinct reactors 134, 136, which are also identified as V-01 and V-02. The first reactor 134 has two inlets 138 that respectively receive the black mass from the black mass source 132 and water from a water source 133, where they are combined to form a waste liquid stream that includes the black mass in water. Various components, including the waste liquid stream comprising the black mass, are fed into the second reactor 136 (e.g., a leaching reactor—V-02) via inlets 148. The method may include generating the lithium-ion battery waste liquid stream by subjecting the black mass to a leaching process that comprises mixing an inorganic acid from an inorganic acid source 140 with the waste liquid stream having the black mass to form an acidic admixture; then mixing an oxidant from a source of an oxidant 142 with the acidic admixture; and adding water (e.g., deionized water) from a source of water 144 to the acidic admixture. After this process, the waste liquid stream becomes a leachate stream generated in the leaching second reactor 136 that may then pass through a first filter 146 (also identified as F-01) to generate a filtrate waste liquid stream comprising one or more metal sulfates and a first retentate comprising graphite. In various embodiments, any one of the filters disclosed herein may include any suitable type of filter. For example, the filters may be pressure (or press) filters, hydraulic filters, gravity filters, etc. Notably, while not shown, the leaching stage 110 may instead only include a single reactor or tank, which may instead be used to mix the black mass and form the leachate in one reactor/vessel.

Thus, during the leaching stage 110, an inorganic acid from the source or container 140 is fed into the leaching second reactor 136 during a first phase. The inorganic acid may be sulfuric acid ($H_2SO_4$) as shown in FIG. 1 or another suitable inorganic acid. In certain aspects, sulfuric acid ($H_2SO_4$) is a particularly suitable lixiviant. In one variation, the sulfuric acid ($H_2SO_4$) has a concentration of greater than or equal to about 96% to less than or equal to about 98%. While hydrochloric acid (HCl) may be avoided because chlorine can cause contamination in electrochemical cells if the recycled material contains high levels of chlorine, in certain alternative variations, the inorganic acid may optionally be hydrochloric acid (HCl) subject to adjustments to quantities of the reagents, as appreciated by those of skill in the art. In some examples, the inorganic acid may contain about 4M sulfuric acid ($H_2SO_4$). During this time, the agitator 102 may be activated to stir the acid solution in the leaching second reactor 136 and may provide continual agitation of the contents. The mixing may occur for at least about 2 hours. In one aspect, the mixing of the inorganic acid and the mixing of the oxidant are conducted at a temperature of less than or equal to about 100° C., optionally less than or equal to about 95° C., and in certain aspects, less than or equal to about 90° C. In certain aspects, a temperature of the leachate in the second leaching reactor 136 may be maintained to be greater than or equal to about 50° C. to less than or equal to about 80° C.

The oxidant 142 may be hydrogen peroxide ($H_2O_2$), ozone ($O_3$), sodium hypochlorite (NaClO), or combinations thereof. In certain variations, the oxidant is hydrogen peroxide ($H_2O_2$). Notably, because the addition of black mass and dilution with sulfuric acid are exothermic processes, the temperature may be monitored to ensure that it does not exceed the boiling point of water, for example, by introducing cool water or via heat exchangers. During the first phase, the waste liquid stream comprising black mass from the upstream first reactor 134 may be gradually added to the agitated acid solution in the leaching second reactor 136.

In one variation, the inorganic acid comprises sulfuric acid ($H_2SO_4$), the oxidant comprises hydrogen peroxide ($H_2O_2$), and a pH of the acidic admixture in the leaching second reactor 136 is less than or equal to about 2.5. The hydrogen peroxide ($H_2O_2$) may be added at a concentration of greater than or equal to about 4 by volume to less than or equal to about 20% by volume of total liquid contents, optionally greater than or equal to about 4% by volume to less than or equal to about 15% by volume, and optionally greater than or equal to about 6% by volume to less than or equal to about 15% by volume. In one further variation, the mixing of the inorganic acid comprises adding black mass to the sulfuric acid ($H_2SO_4$) having a molarity of greater than or equal to about 2M to less than or equal to about 4M, the mixing the oxidant adds about 30% by mass hydrogen peroxide ($H_2O_2$) to the acidic admixture so that the acidic mixture has a solid/liquid ratio of about 100 g/L to about 150 g/L, followed by mixing in the leaching second reactor 136 for greater than or equal to about 2 hours, and then the adding of the water from the water source 144 dilutes the sulfuric acid ($H_2SO_4$) to a molarity of about 2M, followed by mixing for greater than or equal to about 30 minutes.

After the waste liquid stream comprising black mass is introduced into the leaching second reactor 136, the acid solution begins reacting with metals in the black mass so that the metals react and form their respective sulfates. In some examples, fluorine (F) in the black mass may be converted to hydrogen fluoride (HF). Some of the HF may stay in the solution contained in the leaching second reactor 136, while the remainder may be released as a gas and vented to a scrubber (not shown).

During the first phase, an oxidant may be fed to the leaching second reactor 136 from the oxidant source or container 142. The oxidant may be hydrogen peroxide ($H_2O_2$) as shown in FIG. 1 or another suitable oxidant. In some examples, the oxidant may be 30% hydrogen peroxide ($H_2O_2$). The oxidant may be fed into the second reactor 136 before, the same time as, or after the inorganic acid and/or the waste liquid stream comprising black mass from the first reactor 134 are added. The mixture of the acid solution, the oxidant, and the black mass may be agitated for a defined period of time (e.g., 1 hour, 2 hours, 3 hours, etc.).

In some examples, it may be desired for a temperature of the liquid in the leaching second reactor 136 to remain at a defined level, as noted above, desirably below 100° C. For example, the defined temperature level may range from about 60° C. (140° F.) to about 80° C. (176° F.). In some embodiments, the minimum required temperature level may be about 60° C. (140° F.), and a desired temperature level may be about 80° C. (176° F.). In some cases, however, the temperature of the liquid may increase above the desired level and/or fall below the minimum required temperature level. For example, as noted above, heat from the reaction between the acid solution and the metals in the black mass may increase the temperature of the liquid in the leaching second reactor 136 to above the desired temperature (e.g., 80° C.). In other examples, the liquid temperature may not rise to the required level (e.g., 60° C.). In such examples, the liquid temperature may be controlled through different manners. For example, the liquid temperature may be reduced by adjusting the rate of black mass addition to the acid solution. In other cases, the liquid temperature may be reduced or increased by circulating a heating/cooling medium (e.g., steam, etc.) through the jacket 104 surrounding the leaching second reactor 136.

Once the agitation period is complete, demineralized water from the source or container 144 is added to the leaching second reactor 136 in a second phase. For example, deionized (DI) water may be added to dilute the sulfuric acid. For instance, adding the water may reduce molarity of the liquid in the leaching second reactor 136. Additionally, the water may cool the contents in the leaching second reactor 136 so that the temperature does not exceed 90-100° C., because as noted above, the addition of the black mass and dilution of the sulfuric acid are exothermic processes. In some examples, the temperature may be cooled to about 60° C. (140° F.). After the demineralized water is added, the mixture in the leaching second reactor 136 is agitated for a defined period of time (e.g., about 30 minutes, etc.). At this point, the pH of the solution may be acidic, for example, greater than or equal to about 0.1 to less than or equal to about 1. In certain variation, the pH may be about 0.1. The leachate stream may comprise a variety of metal sulfates, for example, manganese sulfate ($MnSO_4$), cobalt sulfate ($CoSO_4$), nickel sulfate ($NiSO_4$), and the like.

Next, the vessel contents in the leaching second reactor 136 are pumped via pump 106 through the first filter 146, which may be a pneumatic filter. After passing the leachate stream through the first filter 146, a filtrate waste liquid stream comprising one or more metal sulfates is pumped to impurity removal unit 112 for further processing, while a first retentate comprising solids, such as carbon (graphite) particles are formed and removed from the system 100. In some examples, the first filter 146 and any additional filters described herein may be a pressure filter, a hydraulic filter, a gravity filter or another suitable type of filter. In this manner, the graphite is removed from the leachate waste liquid stream. The remaining contents (e.g., a first filtrate) of the waste liquid stream thus pass through the first filter 146 are fed to impurity removal unit or stage 112. In some examples, nearly all carbon (graphite) particles in the vessel contents may be captured in the filter 146 as retentate. Such carbon (graphite) particles may be passed or conveyed to a container and further processed (e.g., dried). After filtration, the first reactor 134 and the leaching second reactor 136 may be washed with an internal spray ball to remove acid residue and to send all leaching reaction products to the downstream impurity removal unit 112.

Additionally, acid residue in the filter cake/retentate may be neutralized by rinsing the residue to reduce operator exposure during cake collection. In some examples, a separate water stream may be lined up with the pump(s) 106 and a dilute caustic may be added upstream of the first filter 146 to remove residual filtrate, which may be sent to wastewater treatment. At the end of the leaching stage 110, graphite cake (e.g., in the container on the first filter 146, etc.) may be collected for disposal.

In the impurity removal unit or stage 112, removal of various impurities occurs in multiple stages. For example, multiple solvent-extraction stages may be followed by impurity precipitation as shown in FIG. 1. Generally, impurity removal in the impurity removal unit or stage 112 may occur concurrently and multifacetedly in a collective batch process, and with individual steps to remove specific impurities performed sequentially. In the impurity removal stage 112, impurities (e.g., certain metals or other elements, like fluorine (F) and phosphorus (P)) in the leachate or waste liquid stream produced from leaching stage 110 may be removed, for example, separated via solvent extraction, converted to their hydroxide or other forms and precipitated, and the like. In some embodiments, there may be a minimal compromission of precious metals concentration of not more than 5% while removing impurities. Notably, in certain alternative aspects, the impurity removal unit or stage 112 is not limited to the variation shown and described in the context of FIG. 1. Other variations of impurity removal are contemplated, including those described in the context of co-owned U.S. patent application Ser. No. 18/112,676 filed on Feb. 22, 2023 entitled "Processes and Systems for Purifying and Recycling Lithium-Ion Battery Waste Streams" to Akhondi, et al., the relevant portions of which are incorporated herein by reference.

The methods of the present disclosure may include purifying the lithium-ion battery waste liquid stream by first introducing it to a solvent extraction unit 150 that may include one or more vessels or tanks (not shown in detail). This solvent extraction unit 150 may serve to remove one or more of copper (Cu), iron (Fe), zinc (Zn), and combinations thereof. The use of a process involving the solvent extraction unit 150 is particularly suitable where the black mass is relatively rich in copper (Cu), for example, having greater than or equal to about 3% by weight of copper. First, a pH of the waste liquid stream may be adjusted to be less than or equal to about 2, for example, in a range of greater than or equal to about 1.7 to less than or equal to about 2. The waste liquid stream containing copper (Cu) to be removed can be contacted (e.g., mixed) with an extractant and an organic phase in a vessel or reactor of the solvent extraction unit 150. In such a process, the extractant can form a complex with the target impurity, here copper (Cu) and optionally iron (Fe) and transfer the complex from the liquid aqueous phase in the waste stream to the organic phase. In this manner, the extractant/organic phase forms a raffinate that may be further separated by gravity or centrifugation separation processes, which although not shown may be part of the solvent extraction unit 150 as appreciated by those of skill in the art. In certain variations, the solvent-extraction process for removing copper (Cu) may also concurrently and advantageously remove impurities comprising iron (Fe) when the waste liquid stream is mixed with extractant and organic phase.

In certain variations, for example where the black mass is rich in copper, in the first phase or stage of the solvent extraction process, a first suitable extractant for removing copper and optionally iron comprises an oxime such as 5-nonyl-salicylaldoxime also known as 2-hydroxy-5-nonyl-benzaldehyde oxime (NSAO, commercially available as ACORGA™ P50 oxime solvent extraction reagent). A suitable organic phase for use in the solvent-extraction of copper may be a liquid hydrocarbon, such as kerosene or hexane, by way of example. In certain variations, the kerosene may be a sulfonated kerosene. An aqueous-organic ratio (A/O ratio) may be set 1 to 1. In one variation, a pH may be about 1 to maximize copper (Cu) extraction while minimizing precious metals co-extraction. A concentration of the first extractant (e.g., 5-nonyl-salicylaldoxime) may be greater than 0 to less than or equal to about 20 volume % of the total organic phase volume. After the copper is transferred to the organic phase, it is removed and the solvent extraction process proceeds to the second phase or stage.

For the removal of iron (Fe), zinc (Zn), and other deep impurities, a suitable second extractant comprises bis-(2-ethylhexyl)phosphoric acid, also known as di-(2-ethylhexyl) phosphoric acid (DEHPA or HDEHP) that is then added to the stream that remains after the first phase or stage. A suitable organic phase for use in the solvent-extraction of the impurity metals may be a liquid hydrocarbon, such as kerosene or hexane. In certain variations, the kerosene may be a sulfonated kerosene. An aqueous-organic ratio (A/O ratio) may be set 2 to 1. In one variation, a pH may be greater than or equal to about 2 to less than or equal to about 2.5. A concentration of the second extractant (e.g., bis-(2-ethylhexyl)phosphoric acid) may be greater than or equal to 0 to less than or equal to about 15 volume %, for example, in one variation, about 10 volume % and in another variation about 15 volume % of the total organic phase volume, while the hydrocarbon (e.g., kerosene) may be present at greater than or equal to 85 to less than or equal to about 100 volume %, for example, about 90 volume % or alternatively about 85 volume % of the total organic phase volume. The duration of the zinc (Zn), iron (Fe), and deep impurities removal solvent-extraction process may be about 20 minutes, by way of example.

Thus, each extractant and organic phase/hydrocarbon may be mixed with the process stream solution in the solvent extraction tank/reactor of the solvent extraction unit 150, so that a cumulative level of all metal impurities (e.g., a total amount of copper (Cu), iron (Fe), and zinc (Zn)) of interest decreases to less than or equal to about 20 ppm. For example, the solution entering the solvent extraction unit 150 may have impurity levels of 100 to 200 ppm, which may then be reduced to less than or equal to about 20 ppm in the purified waste liquid stream exiting the solvent extraction tank in the solvent extraction unit 150.

In certain variations, solvent extraction may be conducted in a tank or reactor in the solvent extraction unit 150 with three separate stages, which appears to provide an efficacy that far exceeds the separation of a single stage column/reactor. While additional stages may be used, it appears that a fourth or greater stage solvent extraction results in only a negligible increase in copper (Cu) and/or iron (Fe) extraction efficiency.

After conducting the solvent-extraction process, in certain variations, greater than or equal to about 98%, optionally greater than or equal to about 99%, optionally greater than or equal to about 99.5%, and optionally greater than or equal to about 99.9% of the initial copper (Cu) present in the waste liquid stream, greater than or equal to about 98%, optionally greater than or equal to about 99%, optionally greater than or equal to about 99.5%, and optionally greater than or equal to about 99.9% of the initial iron (Fe) present in the waste liquid stream may be removed from the waste liquid stream, and greater than or equal to about 98% optionally greater than or equal to about 99%, optionally greater than or equal to about 99.5%, and optionally greater than or equal to about 99.9% of the initial zinc (Zn) present in the waste liquid stream may be removed from the waste liquid stream.

Downstream of the solvent extraction unit 150, the impurity removal unit or stage 112 further includes impurity removal reactor 152 for removing fluorine (F), phosphorus (P), and one or more impurity metals selected from the group consisting of: aluminum (Al), titanium (Ti), iron (Fe) (if remaining), copper (Cu) (if remaining), and zinc (Zn) (if remaining). Initially, the contents from the solvent extraction unit 150 are provided to the impurity removal reactor 152, which is also identified as V-03 in FIG. 1. The purifying may include fluorine (F) removal in the impurity removal reactor 152. Fluorine may be used in various components of the lithium-ion battery, including in electrolytes, by way of non-limiting example. The fluorine removal process may further include adding a source of calcium 154, for example, calcium oxide, and optionally an oxidant from a source of oxidant 156 to generate calcium fluoride ($CaF_2$) that precipitates out of the liquid waste stream. The oxidant from the source of oxidant 156 and lime component (source of calcium oxide) from the source of calcium 154 are fed into the impurity removal reactor 152 to initiate the removal of further impurities such as fluorides from the waste liquid stream.

Conventional lithium battery recycling processes have not provided for fluoride removal. However, failure to remove fluoride/hydrofluoric acid (HF) may result in the capacity attenuation of batteries, such as batteries incorporating NMC, produced from recycled and recovered metals. For example, HF may decrease the $Li^+$ concentration available, forming LiF instead of precipitating $Li^+$ out as useful resource, as shown below.

$$Li^+ + HF \rightarrow LiF + H^+$$

To alleviate this problem, HF that is not removed from the system may be removed via the added calcium (e.g., calcium oxide (CaO)). For example, the mixture of CaO and HF generates calcium fluoride ($CaF_2$) and water, as shown below.

$$CaO + 2HF \rightarrow CaF_2 + H_2O$$

The source of calcium 154 may be selected from the group consisting of: lime or calcium oxide (CaO), calcium hydroxide ($Ca(OH)_2$), and combinations thereof and the oxidant may be selected from the group consisting of: hydrogen peroxide ($H_2O_2$), ozone ($O_3$), sodium hypochlorite (NaClO), and combinations thereof. In certain aspects, the oxidant is hydrogen peroxide ($H_2O_2$). While not shown, as appreciated by those of skill in the art, the source of calcium 154 may be an upstream slake tank, where a solid material comprising calcium is combined with water to form a liquid reagent that comprises calcium (Ca). In certain variations, solid phase calcium oxide (CaO) or solid phase calcium hydroxide ($Ca(OH)_2$) may be mixed or reacted (e.g., slaked) with water in a reactor or tank to form a liquid phase source of calcium hydroxide ($Ca(OH)_2$) that may then be introduced to and/or mixed with the waste liquid stream in the impurity removal reactor 152 to remove fluorine (F). In certain variations, a pH during the fluoride (F) removal may be greater than or equal to about 1 to less than or equal to about 2. A temperature during the fluorine (F) removal may be about 40° C. in certain variations.

In certain aspects, the oxidant is hydrogen peroxide ($H_2O_2$).

While not shown, an alternative fluorine removal process may be a selective adsorption process where the liquid stream may be processed in one or more columns (e.g., chromatographic columns or packed-bed columns/reactors) with a resin process using a stationary phase of a polymeric adsorbent with high selectivity for fluorine to remove fluorine upstream of the impurity removal reactor 152. By way of non-limiting example, a suitable fluorine removal process is described in PCT International Application PCT/SG2022/050014 entitled "PROCESS FOR RECYCLING LITHIUM IRON PHOSPHATE BATTERIES," the relevant portions of which are incorporated herein by reference. Removal of fluorine is advantageous because if it remains in the recycled active material at significant concentrations, it can form detrimental impurity compounds (e.g., as hydrogen fluoride (HF)), which can cause capacity attenuation and degradation of the recycled cathode electroactive materials in a battery.

In certain aspects, after removal of fluoride, the liquid waste stream may be adjusted to have a pH of greater than or equal to about 4.5 to less than or equal to about 5, for example, by adding an inorganic base, like sodium hydroxide (NaOH) from a source of a base 158. The transition in the pH will assist with removal of remaining impurities downstream, including one or more of aluminum (Al), iron (Fe), copper (Cu), zinc (Zn) (should any of iron (Fe), copper (Cu), or zinc (Zn) remain after the solvent extraction unit 150), titanium (Ti), aluminum (Al), phosphorus (P), and combinations thereof. A temperature in the impurity removal reactor 152 during this process may be about 60° C. and mixing may be conducted for about 60 minutes in certain variations.

Thus, the purifying of the remaining impurities includes increasing pH of the liquid waste stream to generate one or more metal precipitate compounds comprising a metal selected from the group consisting of: aluminum (Al), titanium (Ti), copper (Cu), iron (Fe), zinc (Zn), and combinations thereof. Such metal precipitate compounds may comprise hydroxides, oxides, phosphates, and/or hydrates of these compounds. More specifically, in certain variations, one or more metal hydroxide precipitate compounds are generated selected from the group consisting of: aluminum hydroxide ($Al(OH)_3$), titanium hydroxide ($Ti(OH)_4$), copper hydroxide ($Cu(OH)_2$), iron phosphate ($FePO_4$), iron hydroxide(s) (either $Fe(OH)_3$ and/or $Fe(OH)_2$), zinc hydroxide ($Zn(OH)_2$), and combinations thereof. In certain variations, the inorganic base (e.g., NaOH) may be added until a pH of the admixture is optionally greater than or equal to about 10.2, optionally greater than or equal to about 10.3, optionally greater than or equal to about 10.4, and in certain aspects, optionally greater than or equal to about 10.5. In certain further variations, the inorganic base may be added until the pH of the admixture is greater than or equal to about 10.5 to less than or equal to about 11.5, optionally greater than or equal to about 10.5 to less than or equal to about 11, which may depend on the stoichiometry of the metals in the final product to be formed.

The addition of sulfuric acid upstream during leaching of the metals facilitates the presence of sulfate ions ($SO_4^{2-}$). An oxidant, like $H_2O_2$ may be added into the impurity removal reactor 152 from the source of oxidant 156 (or have been added upstream in leaching second reactor 136). The oxidant can oxidize certain metals, such as ferrous $Fe^{2+}$ ions to ferric $Fe^{3+}$ ions, so that iron will exist in the liquid waste stream as $Fe_2(SO_4)_3$. Thus, during the impurity removal process in the impurity removal reactor 152, iron and phosphorus can be precipitated as iron phosphate ($FePO_4$). Likewise, the oxidant (e.g., $H_2O_2$) modifies the oxidative states of titanium (II) and aluminum (III) metals respectively, and therefore, titanium and aluminum hydroxides may be precipitated out (e.g., as $Ti(OH)_2$ or $Ti(OH)_4$ and $Al(OH)_3$).

The second inorganic base, like NaOH, from the source of base 158 that is used to adjust the pH, may also further facilitate precipitation of any excess copper (Cu) and iron (Fe) during this impurity removal process so that residual copper (Cu) and iron (Fe) are removed as impurities.

After processing in the impurity removal reactor 152, the liquid waste stream exits reactor 152 and enters through a second filter 160 (e.g., a pressure filter, a hydraulic filter, a gravity filter, etc.) to generate a purified filtrate liquid stream (e.g., the waste liquid stream for further processing downstream) and a second retentate comprising the one or more metal precipitate compounds, for example, precipitated hydroxides, oxides and/or phosphates of aluminum (Al), titanium (Ti), iron (Fe), copper (Cu), and zinc (Zn), and calcium fluoride ($CaF_2$) that can be further processed in the system as will be described below. In some embodiments, nearly all impurities (e.g., metallic hydroxides) that precipitated in the reactor 152 are captured in the filter 160. Thus, the vessel contents in the reactor 152 are pumped via another pump 106 (e.g., a centrifugal pump, etc.) through the second filter 160. The purified filtrate stream now enters the metal recovery system or stage 114, which is best seen in FIG. 2.

The metal recovery system 114 includes the manganese (Mn) recovery unit 120, the optional coprecipitation unit 122 for co-precipitating oxides of nickel (Ni) and cobalt (Co), the separation unit 124, followed by the cobalt (Co) recovery unit 126, the nickel (Ni) recovery unit 128, and the lithium (Li) recovery unit 130. In the manganese (Mn) recovery unit 120, manganese (Mn) is separated from the waste liquid stream received from the upstream impurity removal unit or stage 112. At this point in the process, the waste liquid stream comprises manganese (Mn), nickel (Ni), cobalt (Co), and lithium (Li). The separating of manganese (Mn) comprises one or more of the following: (i) introducing a first oxidant to the waste liquid stream to react and form solid manganese dioxide ($MnO_2$), (ii) reacting the waste liquid stream with ozone ($O_3$) to form solid manganese dioxide ($MnO_2$), or both (i) and (ii). Where both (i) and (ii) are conducted, the (i) introducing the first oxidant to the waste liquid stream precipitates a first amount of manganese dioxide ($MnO_2$) and (ii) the reacting the waste liquid stream with ozone ($O_3$) precipitates a second amount manganese dioxide ($MnO_2$). By way of example, in certain aspects, the (i) introducing the first oxidant (e.g., sodium permanganate ($NaMnO_4$)) to the waste liquid stream precipitates about 95% of the manganese present in the waste liquid stream as a first amount of manganese dioxide ($MnO_2$) and (ii) the reacting the waste liquid stream with ozone ($O_3$) precipitates the remaining amount (e.g., about 5%) of manganese present in the waste liquid stream as the second amount manganese dioxide ($MnO_2$).

The manganese (Mn) recovery unit 120 includes a reactor 170 with agitator 102, a source of an oxidant 172. It should be noted that while the manganese (Mn) recovery unit 120 is shown in FIGS. 1 and 2 as having a single reactor 170, in alternative variations, it is contemplated that multiple reactors (vessels or tanks) may be used to conduct the (i) introducing a first oxidant to the waste liquid stream to form solid manganese dioxide ($MnO_2$) and/or (ii) reacting the waste liquid stream with ozone ($O_3$) to form solid manganese dioxide ($MnO_2$). The oxidant 172 may be a permanganate, for example, selected from the group consisting of: potassium permanganate ($KMnO_4$), sodium permanganate ($NaMnO_4$), and combinations thereof. A suitable oxidant, such as permanganate, is added to waste liquid stream to form precipitates (conversion of manganese sulfates into their oxide form) that can be easily removed via filtration and collected as the retentate. By way of non-limiting example, the chemical equation is listed below where the permanganate is sodium permanganate:

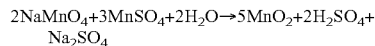

In certain variations, the permanganate is added to the waste liquid stream but does not exceed 95% of the stoichiometric requirements per the equations above to prevent introducing additional dosage of manganese which is already present in the system.

The manganese (Mn) recovery unit 120 also includes a source of ozone ($O_3$) 174. After manganese has been extracted as manganese oxide in the reactor 170, the liquid stream may be further reacted in the reactor 170 (or transferred to an additional reactor) where ozonation takes place.

Manganese oxide ($MnO_2$) is obtained as a solid cake after filtration. The following describes the processes of extracting excess manganese from the waste liquid stream via ozonation. Soluble manganese Mn (II) can be easily oxidized by ozone ($O_3$) to form solid manganese oxide ($MnO_2$), as represented by the chemical equation below:

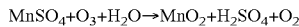

The process depletes 0.9 g of ozone per gram of manganese. Notably, any excess ozone does not cause any concerns with respect to over-oxidation of manganese, because it forms soluble permanganate ($MnO_4^-$), which reduces back to manganese oxide ($MnO_2$) in a span of approximately 30 minutes.

A third filter 176 (also identified as F-03) is disposed downstream of the reactor 170 to separate solid manganese products ($MnO_2$) from the waste liquid stream. The reactor 170 has a plurality of inlets 178 receiving the first oxidant from the source of oxidant 172, the ozone ($O_3$) from the source of ozone 174, and the waste liquid stream from the impurity removal reactor 152 in the impurity removal unit or stage 112. The reactor 170 has an outlet 179 through which the waste liquid stream exits to enter the third filter 176 for separation into a filtrate liquid stream (the waste liquid stream that will be further processed) and a first retentate comprising manganese dioxide ($MnO_2$) that is one of the independent product streams formed in accordance with the present disclosure.

During the extraction of manganese oxide, careful addition of either an inorganic base, like sodium hydroxide (NaOH) from a source of a base 173, or an inorganic acid, like sulfuric acid ($H_2SO_4$), from an acid source 175 is added to the waste liquid stream to control the pH to be greater than or equal to about 1.5 to less than or equal to about 3. One of skill in the art will appreciate that sulfuric acid is a by-product of the precipitation of manganese oxide, and the solution pH ensures precipitation of solid manganese oxide ($MnO_2$). The adjustments to quantities and concentration of the sodium hydroxide may be also adjusted based on the reactor size, residence time in the reactor 170, and total production of sulfuric acid.

After filtration, the reactor 170 may be washed with an internal spray ball to remove acid residue in the vessel and to send all reaction products downstream. Additionally, any chemical residue in the filter cake may be rinsed to reduce operator exposure during cake collection. At the end of this batch cycle (e.g., manganese recovery 120), the retentate/manganese hydroxides cake may be collected for further processing as a first product stream from the process.

Next, the waste liquid stream (filtrate liquid stream from the third filter 176) passes into the optional coprecipitation unit 122 that includes a coprecipitation reactor 180 (also identified as V-05) for co-precipitating oxides of nickel (Ni) and cobalt (Co) and generating a stream comprising lithium (Li). It should be noted that this coprecipitation unit 122 is optional depending on whether lithium (Li) is present in the waste stream at this point in the system 100, because the processes that occur in coprecipitation unit 122 serve to separate lithium (Li) from the nickel (Ni) and cobalt (Co). If there is no lithium in the waste stream at this point in the system, for example, because it was removed in an upstream process, the waste liquid stream may instead bypass the co-precipitation unit and be directed into downstream separation unit 124 described below. For example, the process that occurs in a coprecipitation reactor 180 may involve a first step toward separating nickel (Ni) and cobalt (Co) from the waste liquid stream. First, pH of the waste liquid stream may be increased in the coprecipitation reactor 180 to greater than or equal to about 9, which causes co-precipitating of nickel hydroxide (Ni(OH)$_2$) and cobalt hydroxide (Co(OH)$_2$). For example, to precipitate compounds comprising nickel (Ni) and cobalt (Co), a pH of the liquid in the coprecipitation reactor 180 may be adjusted to be greater than or equal to about 9 to less than or equal to about 11, for example, greater than or equal to about 9 to less than or equal to about 10. In other variations, the co-precipitation process may comprise increasing the pH of the purified filtrate stream to greater than or equal to about 11. In certain variations, the coprecipitation process may optionally occur in an inert environment (e.g., nitrogen blanket).

The equations below represent reactions that occur in basic conditions in the coprecipitation reactor 180 to form hydrates of nickel hydroxide (Ni(OH)$_2$) and cobalt hydroxide (Co(OH)$_2$):

$$NiSO_4(aq) + 2NaOH + \rightarrow Ni(OH)_2 + Na_2SO_4$$

$$CoSO_4(aq) + 2NaOH + \rightarrow Co(OH)_2 + Na_2SO_4$$

Notably, in certain variations, as will be appreciated by those of skill in the art, metal hydroxides or hydrates of metal hydroxides, such as nickel hydroxide (e.g., Ni(OH)$_2$·6H$_2$O) or cobalt hydroxide (e.g., Co(OH)$_2$·7H$_2$O), may be formed in the aqueous stream.

The coprecipitation unit 122 includes a source of a base 182 that supplies an inorganic base (e.g., NaOH) to the coprecipitation reactor 180, as well as a fourth filter 186 (also identified as F-04) downstream of the coprecipitation reactor 180. Next, the coprecipitation reactor 180 contents may be pumped via pump 106 through the fourth filter 186 that like the previously described filters, may be a pneumatic filter, a pressure filter, a hydraulic filter, a gravity filter or another suitable type of filter. After the waste liquid stream exits the coprecipitation reactor 180 it may be passed through the fourth filter 186 for filtering to generate a retentate comprising nickel hydroxide (Ni(OH)$_2$) and cobalt hydroxide (Co(OH)$_2$) (that may then be processing the downstream separation unit 124 followed by processing in either the cobalt (Co) recovery unit 126 or the nickel (Ni) recovery unit 128) and a filtrate that may then be processed in the downstream lithium (Li) recovery unit 130. As discussed above, the coprecipitation unit is present to assist with separating lithium (Li) from the nickel (Ni) and cobalt (Co) remaining in the waste stream, so that lithium (Li) may be further treated and recovered. After filtration, a separate water stream may be lined up with the pump(s) 106, for example, having a temperature of greater than or equal to about 40° C. and less than or equal to about 70° C. upstream of the fourth filter 186 for washing and to remove residual filtrate and retentate. The retentate cake (e.g., in the container on the fourth filter 186, etc.) comprising nickel hydroxide (Ni(OH)$_2$) and cobalt hydroxide (Co(OH)$_2$) may be collected for further processing.

The coprecipitation reactor 180, like the other reactors, includes agitator 102 for stirring the contents in the vessel. The coprecipitation reactor 180 also has a plurality of inlets 183 receiving the base from the source of base 182 and the waste liquid stream from the reactor 170 of the manganese (Mn) recovery unit 120. The coprecipitation reactor 180 also includes an outlet 184 that passes the liquid stream to the fourth filter 186. To maintain the oxidative integrity of the hydroxides formed in the coprecipitation reactor 180, an inert environment may be provided via, for example, the use of a nitrogen blanket.

The retentate comprising nickel hydroxide (Ni(OH)$_2$) and cobalt hydroxide (Co(OH)$_2$) is then transported into the separation unit 124 that includes a separation reactor 190 (also identified as V-06) for generating a first stream predominantly comprising cobalt (Co) and a second stream predominantly comprising (Ni). As discussed above, in certain variations where lithium (Li) is not present and thus does not need to be separated at this point in the process, the waste stream may be directed into the separation unit 124 and thus bypassing the coprecipitation unit 122. he separation unit 124 further includes a source of an acid 192, such as an inorganic acid, like sulfuric acid (H$_2$SO$_4$), a source of an oxidant 194, such as those described above, like hydrogen peroxide (H$_2$O$_2$), a source of a base, such as an inorganic base 196, like sodium hydroxide (NaOH), and a source of sodium hypochlorite (NaClO) 198. The separation unit 124 further includes a fifth filter 200 (also identified as F-05) downstream of the separation reactor 190.

The separation reactor 190, like the other reactors, includes agitator 102 for stirring the contents in the vessel. The separation reactor 190 has a plurality of inlets 202 that receive the retentate stream from the coprecipitation reactor unit 180, the sulfuric acid (H$_2$SO$_4$) from the source of acid 192, the hydrogen peroxide (H$_2$O$_2$) oxidant from the source of the oxidant 194, the sodium hydroxide (NaOH) base from the source of the base 196, and the sodium hypochlorite (NaClO) from its source 198. The separation reactor 190 also optionally receives a recycle stream 204 that may comprise sulfuric acid (H$_2$SO$_4$) and nickel (Ni) that originates from the cobalt (Co) recovery unit 126, as will be described further below. The separation reactor 190 also includes an outlet 206 through which contents from the separation reactor 190 pass into the fifth filter 200.

The process that occurs in the separation reactor 190 includes adding sulfuric acid (H$_2$SO$_4$) and the oxidant (e.g., peroxide (H$_2$O$_2$)) to the retentate comprising the nickel hydroxide (Ni(OH)$_2$) and cobalt hydroxide (Co(OH)$_2$). By way of example, the precipitated Ni and Co materials can be digested using H$_2$SO$_4$ (with a concentration of about 5 to about 15% by mass and H$_2$O$_2$ (with a concentration of about 5 to about 20% by mass at approximately 50° C., with the pH then being adjusted to greater than or equal to about 4, for example, about 4.5, using NaOH (25%). After adjusting pH to greater than or equal to about 4, sodium hypochlorite (NaClO) is added to form cobalt oxyhydroxide (COOH). Sodium hypochlorite (NaClO at approximately 10% concentration by mass was then added dropwise over 15-20 minutes. After the addition, the solution was stirred for 90 minutes at greater than or equal to about 50 to less than or equal to about 60° C., where the following reaction occurs:

$$2Co^{2+} + ClO^- + 3H_2O \rightarrow 2CoOOH + Cl + 4H^+$$

Subsequently, the solution was filtered in the fifth filter 200 to isolate nickel (nickel) in the filtrate and separate it from the retentate. After filtration, the retentate or filter cake comprising cobalt oxyhydroxide (COOH) is optionally washed with DI water, for example, at a temperature of greater than or equal to about 50 to less than or equal to about 75° C., to remove residue of nickel (Ni) in the filter cake.

Next, the retentate comprising cobalt oxyhydroxide (COOH) passes into the cobalt (Co) recovery unit 126. The cobalt (Co) recovery unit 126 includes one or more sources of an acid, such as a first source of at least an acid 210, such as an inorganic acid like sulfuric acid (H$_2$SO$_4$) and a second source of at an acid 212, such as an inorganic acid like sulfuric acid (H$_2$SO$_4$) that are shown in FIGS. 1 and 2, and a source of an oxidant 214, such as hydrogen peroxide (H$_2$O$_2$). The cobalt (Co) recovery unit 126 also includes a first cobalt (Co) recovery reactor 220 and a second cobalt recovery reactor 222 both of which have agitators 102. The cobalt (Co) recovery unit 126 also comprises sixth filter 224 (also identified as F-06).

First, the retentate comprising cobalt oxyhydroxide (COOH) from the separation reactor 190 passes into the first cobalt (Co) recovery reactor 220 where a plurality of inlets 234 receive the retentate, the first acid from the first source of the acid 210, and an optional stream of air 236 to provide aeration to the reactor. The retentate stream is purified in the first cobalt (Co) recovery reactor 220 where additional nickel is removed and separated from cobalt precipitate (e.g., cobalt oxyhydroxide (COOH)) during the washing. First, the precipitate material is washed with the first acid (e.g., sulfuric acid) from the first acid source 210, for example, where the sulfuric acid is about 3 to about 15% by mass with a dosage of 100 g/L for about 20 to about 30 minutes. Next, the contents of the first cobalt (Co) recovery reactor 220 are passed through an outlet 238 and pumped via pump 106 to the sixth filter 224 to generate a liquid filtrate stream comprising nickel (Ni) and a purified retentate comprising cobalt (Co) and more specifically, the purified cobalt oxyhydroxide (COOH).

The retentate is then transferred to the second cobalt recovery reactor 222. The second cobalt recovery reactor 222 has a plurality of inlets 240 that receive the purified retentate comprising cobalt, the second acid from the second source of the acid 212, the oxidant from the source of oxidant 214. Notably, the liquid filtrate stream exiting the sixth filter 224 contains an acid solution that may be pumped back into separation reactor 190 as the recycle stream to further assist with the leaching (e.g., digestion and processing) of Co-containing and Ni-containing precipitates. In the second cobalt recovery reactor 222, the purified retentate comprising cobalt (e.g., cobalt oxyhydroxide (COOH)) is mixed and digested with sulfuric acid ($H_2SO_4$), for example, having a concentration of greater than or equal to about 15 to about 25% by mass and the oxidant (hydrogen peroxide ($H_2O_2$) having a concentration of greater than or equal to about 5 to about 15% by mass). In this manner, the cobalt compounds from the retentate form cobalt sulphate ($CoSO_4$) in the second cobalt recovery reactor 222 that are passed via outlet 242 to downstream units that can form a desired stream of cobalt product(s).

As will be described further below, in alternative variations, the first or second cobalt recovery reactors 220, 222 may be replaced by one or more packed bed chromatographic columns.

The cobalt (Co) recovery unit 126 also includes two optional systems downstream of the cobalt purification reactors (first cobalt (Co) recovery reactor 220 and second cobalt recovery reactor 222): a first evaporator or crystallizer 230 to form cobalt sulfate ($CoSO_4$) and/or a cobalt precipitator 232 to form a cobalt hydroxide product, such as cobalt hydroxide ($Co(OH)_2$) and/or or cobalt oxyhydroxide (COOH). Notably, the cobalt recovery system 126 may have only one of the first evaporator or crystallizer 230 and the cobalt precipitator 232, depending on whether the desired cobalt-containing product will comprise cobalt sulfate ($CoSO_4$) (or a cobalt sulfate hydrate (e.g., $CoSO_4 \cdot 6H_2O$)) or cobalt hydroxide product (e.g., $Co(OH)_2$ or COOH). In the first evaporator or crystallizer 230, the liquid (e.g., water) from the retentate stream entering is removed so as to leave cobalt sulfate ($CoSO_4$) in a solid form. The evaporator separates the liquids from the cobalt sulphate ($CoSO_4$) in the retentate, which may be achieved by changing pressure, heating, and the like. In such examples, greater than or equal to about 90% to less than or equal to about 98% of the liquids, including water, in the stream may be evaporated or removed to form a concentrated cobalt sulfate ($CoSO_4$) product that may be collected.

Alternatively, the retentate stream comprising cobalt sulfate ($CoSO_4$) may be transferred into the cobalt precipitator 232, where pH may be adjusted to basic conditions, for example, to be greater than or equal to about 9 to precipitate a cobalt hydroxide product, such as cobalt hydroxide ($Co(OH)_2$) and/or cobalt oxyhydroxide (COOH) in a similar manner to the reactions that occur in the impurity removal reactor 152. The pH adjustment may include adding an inorganic base as described above to increase the pH to the basic levels advantageous to precipitating cobalt hydroxide. For example, the pH may be adjusted to be greater than or equal to about 9 to less than or equal to about 11, for example, greater than or equal to about 9 to less than or equal to about 10. While not shown, the cobalt precipitator 232 may include another filter to separate the cobalt hydroxide product from the liquids after the stream exits the cobalt precipitator 232.

With renewed reference to the filtrate stream exiting the fifth filter 200 in the separation unit 124, this filtrate comprises nickel and is next passed into the nickel (Ni) recovery unit 128. The nickel (Ni) recovery unit 128 includes two optional systems: a second evaporator or crystallizer 250 to form nickel sulfate ($NiSO_4$) (or a nickel sulfate hydrate (e.g., $NiSO_4 \cdot 7H_2O$)) and/or a nickel precipitator 252 to form nickel hydroxide ($Ni(OH)_2$). Notably, the nickel (Ni) recovery unit 128 may have only one of the second evaporator or crystallizer 250 and the nickel precipitator 252, depending on whether the desired cobalt-containing product will comprise nickel sulfate ($NiSO_4$) or nickel hydroxide ($Ni(OH)_2$). In the second evaporator or crystallizer 250, the liquid (e.g., water) from the filtrate stream entering is removed so as to leave nickel sulfate ($NiSO_4$) in a solid form. The evaporator separates the liquids from the nickel sulphate ($NiSO_4$) in the retentate, which may be achieved by changing pressure, heating, and the like. In such examples, greater than or equal to about 90% to less than or equal to about 98% of the liquids, including water, in the stream may be evaporated or removed to form a concentrated nickel sulfate ($NiSO_4$) product that may be collected.

Alternatively, the filtrate stream comprising nickel sulfate ($NiSO_4$) may be transferred into the nickel precipitator 252, where pH may be adjusted to basic conditions, for example, to be greater than or equal to about 9 to precipitate nickel hydroxide ($Ni(OH)_2$) in a similar manner to the reactions that occur in the impurity removal reactor 152. The pH adjustment may include adding an inorganic base as described above to increase the pH to the basic levels advantageous to precipitating nickel hydroxide. For example, the pH may be adjusted to be greater than or equal to about 9 to less than or equal to about 11, for example, greater than or equal to about 9 to less than or equal to about 10. While not shown, the nickel precipitator 252 may include another filter to separate the nickel hydroxide ($Ni(OH)_2$) product from the liquids after the stream exits the nickel precipitator 252.

In this manner, the system 100 for removing impurities and independently recovering various precious metals from one or more spent lithium-ion batteries provides a first product stream comprising recovered manganese (Mn) as a retentate from third filter 176 after processing in the reactor 170 of the manganese (Mn) recovery unit 120, a second product stream comprising recovered cobalt (Co) generated by either first evaporator or crystallizer 230 or cobalt precipitator 232, and finally a third product stream comprising recovered nickel (Ni) generated by either second evaporator or crystallizer 250 or nickel precipitator 252. The purity levels may be those specified above.

The system 100 may further comprise the lithium recovery unit 130 where a product stream comprising recovered lithium (Li) from the lithium-ion battery waste stream is produced. The lithium recovery unit 130 may receive the liquid filtrate that is generated by the fourth filter 186 after exiting the coprecipitation reactor 180 that comprises lithium (Li). In certain variations, the lithium recovery unit 130 may be any of those described in co-owned U.S. patent application Ser. No. 18/112,676 filed on Feb. 22, 2023 entitled "Processes and Systems for Purifying and Recycling Lithium-Ion Battery Waste Streams" to Akhondi, et al. discussed previously above or in U.S. patent application Ser. No. 18/135,560 filed on Apr. 17, 2023 entitled "Process and System for Recovering Lithium from Lithium-Ion Batteries," to Katal et al., the contents of which are expressly incorporated herein by reference.

In certain aspects, the present disclosure relates to a process for recovering lithium from the filtrate stream. In certain aspects, the process comprises solidifying sodium sulfate ($Na_2SO_4$) from a liquid filtrate stream comprising lithium sulfate ($Li_2SO_4$), sodium sulfate ($Na_2SO_4$), and water ($H_2O$). In one variation, the solidifying sodium sulfate ($Na_2SO_4$) comprises evaporating a portion of water in the liquid stream comprising lithium sulfate ($Li_2SO_4$), sodium sulfate ($Na_2SO_4$), and water ($H_2O$) to generate water vapor and an effluent stream. The process also comprises cooling the effluent stream and solidifying sodium sulfate ($Na_2SO_4$) from the effluent stream, for example, in a crystallizer vessel, to generate a second effluent stream. In an alternative variation, the solidifying sodium sulfate ($Na_2SO_4$) comprises cooling the liquid stream and solidifying sodium sulfate ($Na_2SO_4$) from the liquid stream, for example, in a crystallizer vessel, to generate a third effluent stream and evaporating a portion of water in the third effluent stream to generate water vapor and a fourth effluent stream. Then, the process comprises removing the sodium sulfate ($Na_2SO_4$) solids from the second effluent stream or the third effluent stream, followed by heating the second effluent stream or the fourth effluent stream and introducing sodium carbonate ($Na_2CO_3$) to the second effluent stream or the fourth effluent stream to produce a lithium carbonate ($Li_2CO_3$) product stream. Finally, the process comprises separating lithium carbonate ($Li_2CO_3$) from the lithium carbonate ($Li_2CO_3$) product stream.

Thus, in some embodiments, at least some water in the contents passing through the fourth filter 186 after exiting the coprecipitation reactor 180 (e.g., the liquid filtrate) may be removed. This may be accomplished through heating and distillation/evaporation processes. In various embodiments, the process to remove water from the liquid filtrate may be considered to be a water removal stage. For example, the lithium recovery unit 130 may include an evaporator that separates the liquid filtrate stream into a concentrate stream and a distillate stream. In such examples, about 50% of the water in the filtrate may be evaporated and form the distillate stream and the resulting concentrate steam, which may optionally be collected in a storage tank. In some cases, the collected distillate stream may be used in upstream processes if desired. The remaining contents (e.g., a concentrate stream) may then be pumped to a reactor. In this manner, in certain variations, the lithium concentration is increased for the next process step, for example only, after being processed in the evaporator a concentration of lithium (Li) may be greater than or equal to about 12 g/L in the stream. The filtrate stream and/or concentrated stream may include sodium sulfate and lithium sulfate.

After at least a portion of the water from the liquid filtrate stream is evaporated in the evaporator to generate an effluent stream that may be directed to a crystallizer unit downstream of the evaporator that receives and cools the effluent stream to form solid sodium sulfate ($Na_2SO_4$). The crystallizer vessels may receive the effluent stream from the evaporator, a byproduct comprising the solid sodium sulfate ($Na_2SO_4$) and a second effluent stream is removed from the crystallizer vessel. In an alternative variation, the crystallizer unit directly receives and cools the liquid filtrate stream from the fourth filter 186 to form solid sodium sulfate ($Na_2SO_4$) and an effluent stream comprising lithium sulfate ($Li_2SO_4$) and optionally water ($H_2O$). Downstream of the crystallizer unit and/or the evaporator, the lithium recovery unit 130 comprises: (i) a reactor that receives the effluent stream comprising lithium sulfate ($Li_2SO_4$), an inlet that receives sodium carbonate ($Na_2CO_3$), an outlet, an agitator, a heat source in thermal communication with the reactor, and a solid-liquid separator (e.g., filter) in fluid communication with the outlet of the reactor and through which a product stream passes and is separated into a retentate comprising lithium carbonate ($Li_2CO_3$) product and a waste stream. The lithium recovery unit 130 further includes a fluid conduit for establishing fluid communication between the evaporator, the crystallizer unit, and the lithium recovery unit, and at least one pump for circulating fluids within the fluid conduit.

The methods of the present disclosure also contemplate introducing the filtrate/concentrated stream into a lithium precipitation reactor to precipitate at least one compound comprising lithium (Li). Next, sodium carbonate ($Na_2CO_3$) may be added along with inorganic base (e.g., NaOH) to the lithium precipitation reactor. The liquid stream may have a temperature of greater than or equal to about 80° C. to less than or equal to about 90° C. for greater than or equal to about 90 minutes while in the lithium precipitation reactor to generate lithium carbonate ($Li_2CO_3$) precipitate.

In the precipitation stage, sodium carbonate ($Na_2CO_3$) is optionally fed into a lithium precipitation reactor to convert lithium sulfate ($Li_2SO_4$) into lithium carbonate ($Li_2CO_3$). During this time (or before), the temperature of the contents (e.g., the concentrate stream, the third filtrate, etc.) in the reactor may be adjusted to a desired temperature (e.g., about 80° C. to about 90° C.) by circulating a heating/cooling medium through a jacket on the lithium precipitation reactor that serves as a heat exchanger. In one variation, the sodium carbonate ($Na_2CO_3$) solution may be added to the liquid stream comprising lithium in the lithium precipitation reactor at a feed rate of 20 L/minute.

Next, sodium hydroxide (NaOH) is optionally fed into the lithium precipitation reactor to increase the pH level. For example, 19.125M of NaOH may be added to increase the pH to approximately 13. During this time, the solution in the reactor may be agitated by an agitator for a defined period of time (e.g., about 30 minutes, 1 hour, 1.5 hours, etc.), and the temperature may be maintained at the desired temperature. After the agitation period is complete, the lithium sulfate will precipitate as lithium carbonate $Li_2CO_3$, shown in the example reactions below:

$$Li_2SO_4(aq) + Na_2CO_3 \rightarrow Li_2CO_3(s) + Na_2SO_4(aq)$$

$$Li_2SO_4 + 2NaOH \rightarrow 2LiOH + Na_2SO_4 \text{ (during co-precipitation)}$$

$$2LiOH + Na_2CO_3 \rightarrow Li_2CO_3 + 2NaOH$$

The vessel contents in the lithium precipitation reactor may be pumped via a pump through a filter. In some embodiments, nearly all the lithium carbonate product may be captured in a filter. After filtration, the reactor may be washed with an internal spray ball to remove any process fluid residue in the reactor. At the end of this batch cycle, the product $Li_2CO_3$ retentate/cake may be collected for further drying and packaging as a product stream. In various embodiments, the effluent or filtrate passing through the filter may be sent to wastewater treatment and/or recycled back into the system 100 at other points to facilitate dilution of acid or enhance lithium concentration in other processes conducted in system 100.

In alternative embodiments, the contents from the lithium precipitation reactor may be provided to another suitable module instead of or in addition to the evaporator before collecting in the reactor. For example, in some cases, where volumetric applications of 10 m³ and above are processed, the evaporator may provide limited capacities. As such, in some embodiments, the contents may pass through a thermal shock module coupled with electrode ionization to facilitate thermal shocking by lowering temperatures. In certain variations, a temperature after the thermal shock process may be less than or equal to about 30° C., optionally less than or equal to about 25° C., and in certain aspects, greater than or equal to about 0° C. to less than or equal to about 30° C., optionally greater than or equal to about 0° C. to less than or equal to about 25° C. In such examples, a thermal shocking process may be less costly, less energy intensive and less time consuming as compared to an evaporation process.

In one variation, the thermal shock module is advantageous where the liquid filtrate stream comprises lithium sulfate ($Li_2SO_4$) and sodium sulfate ($Na_2SO_4$). Prior to introducing the stream into the lithium precipitation reactor, the intermediate liquid stream is subjected to a thermal shock process followed by ionization in an electrode ionization unit to facilitate precipitation of sodium sulfate ($Na_2SO_4$) from the liquid stream. Sodium sulfate has lower solubility than lithium sulfate, thus desirably removing the sodium sulfate from solution. This may be followed by adding sodium carbonate ($Na_2CO_3$) into the lithium precipitation reactor to generate lithium carbonate ($Li_2CO_3$) precipitate.

Thus, the filtrate from the fourth filter 186 may be passed to the thermal shock module (e.g., a freeze crystallizer module) to precipitate sodium sulfate from the lithium sulfate/sodium sulfate in the filtrate stream. In the module, lithium sulfate may be extracted from the solution containing sodium cations and sulfate anions. For example, monovalent cationic precipitation may be difficult in heating and distillation/evaporation processes due to their high solubility product and solubility in waters. However, in the module, the lithium sulfate/sodium sulfate solution undergoes a thermal shock to lower the temperature of both precipitates. Since sodium sulfate has a lower solubility product than lithium sulfate, more sodium sulfate may be removed as precipitate after the thermal shock.

Next, the remaining solution may be pumped to an electrode ionization module to remove water from the solution and generate a precipitate/sludge including lithium sulfate. The precipitate comprising lithium (Li) and its sludge may be collected as a main product. The main product (e.g., the precipitate and its sludge) including lithium sulfate may then be pumped to a reactor where sodium carbonate ($Na_2CO_3$) is added to react with the lithium sulfate and precipitate as lithium carbonate as explained above.

In other aspects, the present disclosure contemplates a process that uses a chromatographic separation process rather than or in addition to a reaction and precipitation process. The method may include passing the retentate stream comprising cobalt (Co), and optionally nickel (Ni), in a first direction in a chromatographic column or packed-bed column/reactor comprising a chelating resin to conduct a chromatographic separation process. In this manner, any remaining nickel (Ni) residue is removed to form a highly pure cobalt (Co) containing stream. A stationary phase of a polymeric adsorbent with high selectivity for cobalt to remove cobalt is provided in the packed bed column/reactor. For example, one suitable polymeric absorbent stationary phase, for example, having a functional group of bis-picolylamine on styrene-divinylbenzene polymer was used in a packed-bed column. The solution containing cobalt was then passed through this column, resulting in the isolation of highly pure cobalt (Co). In certain variations, the pH in the column may be less than or equal to about 4.5. After passing through the chromatographic column or packed-bed column/reactor, a raffinate stream comprising at least one nickel (Ni)-containing species exits the chromatographic column, while at least one cobalt (Co)-containing species, more specifically, cobalt (Co) ions, are retained on the chelating resin/stationary phase in the chromatographic column or packed-bed column/reactor.

The method may include regenerating the chromatographic column or packed-bed column/reactor by passing a regeneration liquid through the chromatographic column. The regeneration liquid can be passed in a counter-current or a concurrent-current direction in the chromatographic column or packed-bed column/reactor. For example, in certain aspects, the generating may be counter-current regeneration, where the regeneration liquid is passed in the chromatographic column or packed-bed column/reactor to form an extract stream comprising the at least one cobalt (Co)-containing species (e.g., cobalt (Co) ions). The regeneration liquid may have a pH of less than or equal to about 1.5. In certain aspects, the regeneration liquid may comprise an acid, such as sulfuric acid ($H_2SO_4$) that generates cobalt sulfate ($CoSO_4$). The collected extract stream may then be passed into either an evaporator or crystallizer to form cobalt sulfate ($CoSO_4$) and/or a cobalt precipitator to form a cobalt hydroxide product, such as cobalt hydroxide ($Co(OH)_2$) or cobalt oxyhydroxide (CoOOH) and processed in the same manner as described in the embodiment shown in FIGS. 1 and 2.

Figure 3:
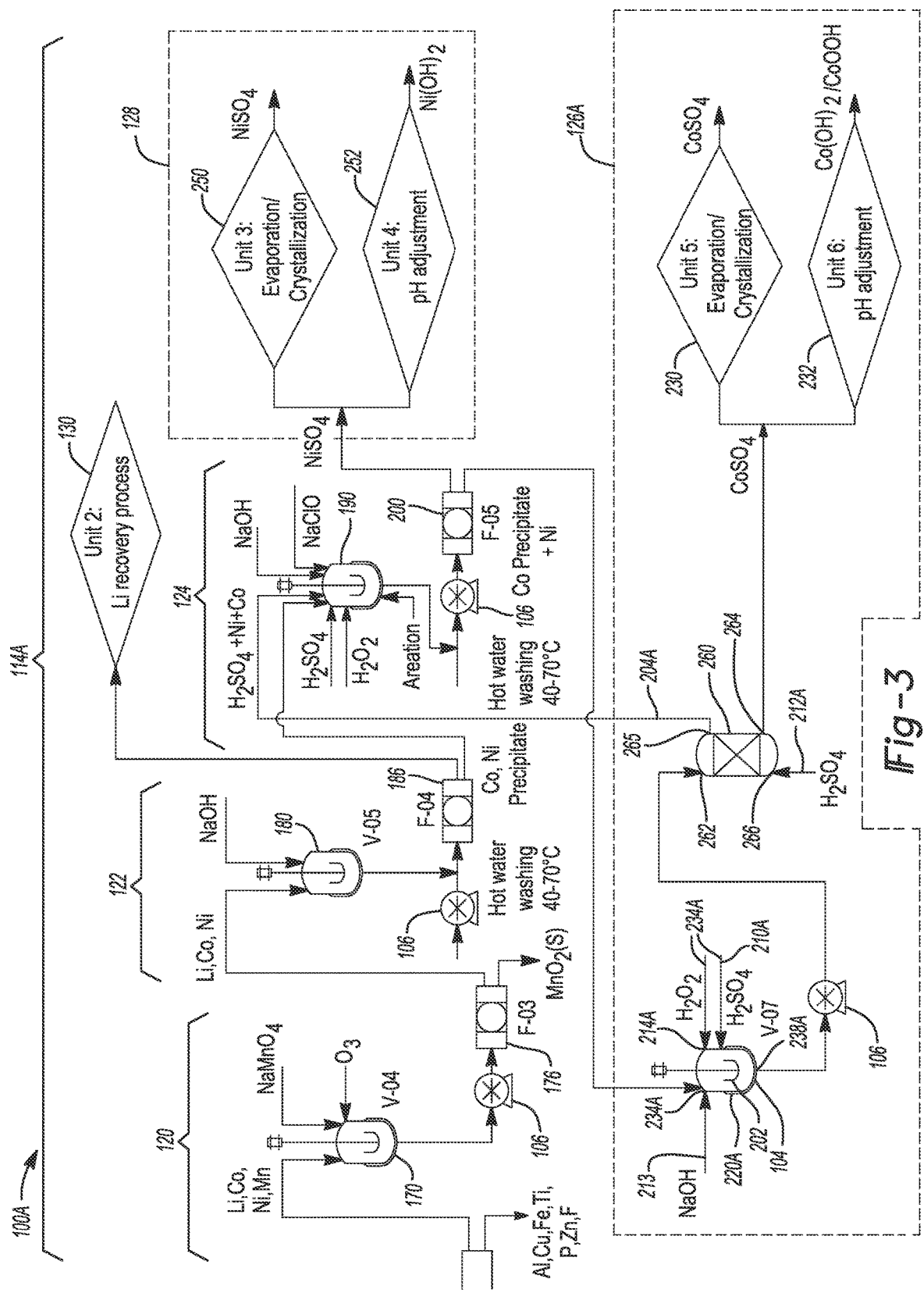
FIG. 3 is a process flow diagram of an alternative metal recovery unit or stage including a cobalt recovery unit or stage having a chromatographic separation process implemented with one chromatographic column or packed-bed column/reactor including a chelating resin stationary phase, according to another example embodiment.

In one variation, an alternative system 100A for recovering metal including manganese (Mn), cobalt (Co), and nickel (Ni) from a lithium-ion waste battery stream is shown in FIG. 3. To the extent that system 100A is similar to system 100 shown in FIGS. 1 and 2, for brevity, it will not be discussed again. For example, leaching unit or stage 110 and impurity removal unit or stage 112 are the same as those described in FIGS. 1 and 2 and are not shown or discussed in the context of FIG. 3. In alternative system 100A, the metal recovery unit or stage 114A includes the same manganese (Mn) recovery unit 120, coprecipitation unit 122, separation unit 124, nickel (Ni) recovery unit 128, and lithium (Li) recovery unit 130 as in the embodiment shown in FIGS. 1 and 2. However, the cobalt (Co) recovery unit 126A differs in that it uses a chromatographic separation process as part of the cobalt (Co) recovery process as described herein.

Thus, retentate comprising cobalt oxyhydroxide (COOH) generated by the fifth filter 200 is processed in the separation unit 124 and passes into the cobalt (Co) recovery unit 126A. The cobalt (Co) recovery unit 126A includes one or more sources of an acid, such as a first source of at least one acid 210A, such as an inorganic acid like sulfuric acid ($H_2SO_4$), a second source of at least one second acid 212A, such as an inorganic acid like sulfuric acid ($H_2SO_4$), a source of at least one base 213, like sodium hydroxide (NaOH), and a source of an oxidant 214A, such as hydrogen peroxide ($H_2O_2$). The cobalt (Co) recovery unit 126A also includes a first cobalt (Co) recovery reactor 220A having agitator 102 and heat exchange jacket 104.

First, the retentate comprising cobalt oxyhydroxide (COOH) from the separation reactor 190 passes into the first cobalt (Co) recovery reactor 220A where a plurality of inlets 234A receive the retentate, the first acid from the first source of the acid 210A, the base from the source of at least one base 213, and the oxidant from the source of oxidant 214A. The retentate stream is leached in the first cobalt (Co) recovery reactor 220A where additional nickel is removed and separated from cobalt precipitate (e.g., cobalt oxyhydroxide (COOH)) during the washing. First, the precipitate material is treated or leached with a solution of acid, such as sulfuric acid ($H_2SO_4$) having a mass concentration of about 5% to less than or equal to about 15% received from the first source of the acid 210A via inlet 234A. Then, pH is adjusted to be less than or equal to about 2.5, for example, greater than or equal to about 1.5 to less than or equal to about 2.5, by adding an appropriate amount of base, such as sodium hydroxide (NaOH) having a mass concentration of about 25% received from the source of at least one base 213 via inlet 234A.

Next, the contents of the first cobalt (Co) recovery reactor 220A are passed through an outlet 238A and pumped via pump 106 into a first inlet 262 of a chromatographic column or packed-bed column/reactor 260 comprising a chelating resin to conduct a chromatographic separation process to form a highly pure cobalt (Co) containing stream. Thus, after passing through the chromatographic column or packed-bed column/reactor, a raffinate stream comprising at least one nickel (Ni)-containing species exits the chromatographic column via second outlet 265, while at least one cobalt (Co)-containing species, more specifically, cobalt (Co) ions, is retained on the chelating resin/stationary phase in the chromatographic column or packed-bed column/reactor 260. After exiting the second outlet 265, the raffinate stream comprising the at least one nickel (Ni)-containing species may be circulated back to separation reactor 190 via a recycle stream 204A for further processing.

When the packed-bed column/reactor 260 is regenerated by a stripping process, this occurs by passing a regeneration liquid, for example, fed into the chromatographic column 260 at a second inlet 266. The second inlet 266 receives the acid, for example, sulfuric acid ($H_2SO_4$) from the second source of at least one second acid 212A. For example, the stationary phase resin may be subsequently subjected to a stripping process utilizing $H_2SO_4$ (for example, having a mass concentration of about 15%). The regeneration liquid can be passed in a counter-current or a concurrent-current direction in the packed-bed column/reactor 260 (thus flowing in a direction from a bottom of the column/reactor 260 where second inlet 266 is shown towards first inlet 262 at a top of the column/reactor 260). For example, in certain aspects, the generating may be counter-current regeneration, where the regeneration liquid is passed in the chromatographic column or packed-bed column/reactor 260 to form an extract stream comprising the at least one cobalt (Co)-containing species (e.g., cobalt (Co) ions) that exits the packed-bed column/reactor 260 at first outlet 264. The regeneration liquid may have a pH of less than or equal to about 1.5. In certain aspects, the regeneration liquid may comprise an acid, such as sulfuric acid ($H_2SO_4$), that generates cobalt sulfate ($CoSO_4$). The use of the the first cobalt (Co) recovery reactor 220A followed by the chromatographic column or packed-bed column/reactor 260 results in the isolation of highly pure cobalt. For example, in one variation, an elemental composition analysis conducted via inductively coupled plasma (ICP) demonstrated the successful attainment of pure cobalt with a concentration of greater than or equal to about 99% by mass.

The collected extract stream comprising pure cobalt (Co) may then be passed into either a first evaporator or crystallizer 230 to form cobalt sulfate ($CoSO_4$) and/or a cobalt precipitator 232 to form a cobalt hydroxide product, such as cobalt hydroxide ($Co(OH)_2$) or cobalt oxyhydroxide (CoOOH) and processed in the same manner as described in the embodiment shown in FIGS. 1 and 2. For example, the extract stream may be subjected to a precipitation reaction in the cobalt precipitator 232 to precipitate a cobalt hydroxide product, such as cobalt hydroxide ($Co(OH)_2$) or cobalt oxyhydroxide (COOH), from the extract. Alternatively, liquids may be removed from the extract stream in the first evaporator or crystallizer 230 to form cobalt sulfate ($CoSO_4$).

In certain aspects, the system may include one or more analyzer units that can sample any of the streams, including the purified and recovered manganese (Mn), cobalt (Co), nickel (Ni), lithium (Li) product streams. The analyzer units may determine a content of nickel (Ni), manganese (Mn), cobalt (Co), and/or lithium (Li) in one or more streams in the system. Alternatively, the analyzer units may monitor pH or other properties, like pressure, temperature, oxygen level, and the like, of various streams or contents in reactors or vessels. In various embodiments, any of the systems for recycling lithium-ion battery waste streams may use an automated process implemented by a controller such as a programmable logic controller (PLC). Such a controller (e.g., implementing proportional-integral-derivative (PID) control) may control various equipment in the system, including pumps, including metering pumps, valves associated with inlets and outlets, heaters, agitators, and the like. For example, a real time control system may be implemented by using one or more inductively coupled plasma (ICP) analyzers disposed throughout the system with one or more algorithms implemented in the PLC to control various equipment. Moreover, while not shown in FIGS. 1-3, the systems may have various conventional equipment, including emission abatement equipment, such as scrubbers and the like. In various embodiments, a scrubber may include a tower, one or more blowers, one or more pumps, and an exhaust, as recognized by those of skill in the art. For example, gases may be passed through the tower with the pump(s) and exhausted from the tower through the exhaust and blower(s).

In yet further variations, the present disclosure contemplates an alternative variation of a system and a corresponding process for recovering metals from a lithium-ion battery waste stream that provides enhanced flexibility in the product recovered. As shown in FIG. 4, an example of such a system 100B may include both a first metal recovery unit 114B for recovering a co-precipitated product 300 comprising two or more metals: manganese (Mn), nickel (Ni), and cobalt (Co). The system 100B further includes a second metal recovery unit 114C for recovering a first product 302 comprising manganese (Mn), a second product comprising nickel (Ni) (304A or 304B), and a third product comprising (Co) (306A or 306B). It will be appreciated that any of the features or components shown in previous embodiments shown in FIGS. 1-3 may be incorporated or substituted into the system 100B.

As with previous embodiments, an optional upstream processing system 310 may be disposed upstream of the first and second metal recovery units 114B, 114C to conduct upstream processing on a lithium-ion battery waste stream, for example, conducting an optional leaching process on black mass and impurity removal. Alternatively, the waste stream may be received pre-processed, as described previously above. When present, the upstream processing unit 310 may be like the leaching unit or stage 110 and impurity removal unit or stage 112 previously described in the context of FIG. 1 or may include the variation described herein. For example, the upstream processing unit 310 in FIG. 4 includes a first impurity removal (or alkaline leaching) unit or stage 312, an acidic leaching unit or stage 110B, and a second impurity removal unit or stage 112B. After the waste stream has been processed in the upstream processing system 310, it may be directed to either the first metal recovery unit 114B or alternatively the second metal recovery unit 114C depending on the desired product from the metal recovery processes.

In a first operational mode, the system 100B may be configured (e.g., by an operator and/or control system) to direct the liquid waste stream into the first metal recovery unit 114B that includes a co-precipitation reactor 320 that forms the co-precipitated product 300. As will be appreciated, while not shown, the system may include various components including valves, actuators, flow regulators, and the like for controlling flow into either the first metal recovery unit 114B or alternatively into the second metal recovery unit 114C. A separated stream comprising lithium (Li) is separated as part of the co-precipitation stage or unit and is directed to a lithium (Li) recovery unit 130B to form a lithium (Li) containing product 308 as described above in previous embodiments (for example, with respect to lithium (Li) recovery unit 130 in FIGS. 1 and 2).

Alternatively, in a second operational mode, the system 100B may be configured to direct the liquid waste stream into the second metal recovery unit 114C that includes a manganese (Mn) recovery unit 120B, a separation unit 124B (which may further include a coprecipitation reactor 180B, as described further below), a cobalt (Co) recovery unit 126B that generates the third product comprising (Co) (either 306A or 306B), a nickel (Ni) recovery unit 128B that generates the second product comprising nickel (Ni) (either 304A or 304B). In the respective units or stages 310, 312, 110B, 112B, 320, 130B, 120B, 124B, 126B, and 128B, contents are collected and processed in various reactors or vessels (by way of example, in reactors, as described above and to be described in further detail below). Like the variations above, each reactor may have the various components and reactor designs described above, for example, being a jacketed, agitated tank with an agitator, heater/heat exchangers, internally coated with a corrosion-resistant lining to withstand hot acidic conditions that may occur in the system 100B, and the like. Further, the system 100B may further have pipes or other conduits, valves, and pumps (like pumps 106 in FIG. 1) that move the liquid streams between reactors or vessels.

FIGS. 5 and 6 show the system 100B, which is an alternative variation for recovering metal including manganese (Mn), cobalt (Co), nickel (Ni), and optionally lithium (Li) from a lithium-ion waste battery stream as described in the context of FIG. 4. To the extent that system 100B is similar to system 100 shown in FIGS. 1 and 2 or system 100A in FIG. 3, for brevity, it will not be discussed again. Further, as noted above, any of the features or components shown in previous embodiments may be incorporated or substituted into the system 100B.

The optional upstream processing system 310 as best seen in FIG. 5 differs from earlier variations and may include the first impurity removal (or alkaline leaching) unit or stage 312, the leaching (or acid) unit or stage 110B, and a modified the second impurity removal unit or stage 112B. As will be appreciated, one or more of these units/subunits or stages may be bypassed, depending on the black mass/lithium-ion battery waste stream being processed.

The process in the system 100B thus begins at the first impurity removal unit or stage 312, which may include a black mass source 132B, a water source 133B, and one or more reactors. In the example of FIG. 5, there are two distinct reactors 134B, 330, which are also identified as V-00 and V-01. The first reactor 134B has two inlets 138B that respectively receive the black mass from the black mass source 132B and water from a water source 133B, where they are combined in the first reactor 134B to form a waste liquid stream that includes the black mass in water.

Various components, including the waste liquid stream comprising the black mass, are fed into the second reactor 330 via inlets 332. A base 334, such as sodium hydroxide (NaOH), may also be introduced via one of the inlets 332 into second reactor 330. As such, an alkaline leaching process may be conducted in the second reactor 330, where at least a portion of aluminum present in the waste stream is removed, for example, by solidifying or precipitating. Thus, during the alkaline leaching stage 312, an inorganic base from the source or container 334 is fed into the second reactor 330 during a first phase. In one variation, the alkaline leaching process may comprise using a 10-20% NaOH solution to leach aluminum (Al) out of the black mass/waste stream. During this time, an agitator 102B may be activated to stir the acid solution in the second reactor 330 and may provide continual agitation of the contents. The mixing may occur for at least about 1 hour. The black mass/waste stream solution may have a temperature in the second reactor 330 of greater than or equal to about 60° C. to less than or equal to about 90° C. After this alkaline leaching process to remove at least a portion of aluminum (Al) present in the waste liquid stream, the waste liquid stream may pass through a first filter 336 (also identified as F-00, which like other filters described in the context of FIGS. 5 and 6, may be like any of the previously described filters above) that generates a filtrate waste liquid stream and a first retentate comprising aluminum (e.g., aluminum-containing impurity compounds).

Next, the waste liquid stream may pass into a leaching reactor 136B (e.g., a leaching reactor—V-02) via inlets 148B. In the leaching reactor 136B, the waste liquid stream may be subjected to an acidic leaching process that comprises mixing an inorganic acid from an inorganic acid source 140B with the waste liquid stream having the black mass to form an acidic admixture; then mixing an oxidant from a source of an oxidant 142B with the acidic admixture; and adding water (e.g., deionized water) from a source of water 144B to the acidic admixture. After this process, the waste liquid stream becomes an acidic leachate stream generated in the leaching reactor 136B that may then pass through a second filter 146B (also identified as F-01) to generate a filtrate waste liquid stream comprising one or more metal sulfates and a first retentate comprising graphite. Notably, while not shown, the first impurity removal 312 and/or acidic leaching stage 110B may instead only include a single reactor or tank, which may instead be used to mix the black mass and form the alkaline and then acidic leachate in one reactor/vessel.

Thus, during the acidic leaching stage 110B, an inorganic acid from the source or container 140B is fed into the leaching reactor 136B during a second phase. The inorganic acid may be sulfuric acid ($H_2SO_4$), as shown, or another suitable inorganic acid. In certain aspects, sulfuric acid ($H_2SO_4$) is a particularly suitable lixiviant. In one variation, the sulfuric acid ($H_2SO_4$) has a concentration of greater than or equal to about 96% to less than or equal to about 98%. While hydrochloric acid (HCl) may be avoided because chlorine can cause contamination in electrochemical cells if the recycled material contains high levels of chlorine, in certain alternative variations, the inorganic acid may optionally be hydrochloric acid (HCl) subject to adjustments to quantities of the reagents, as appreciated by those of skill in the art. In some examples, the inorganic acid may contain about 4M sulfuric acid ($H_2SO_4$). During this time, agitator 102B may be activated to stir the acid solution in the leaching reactor 136B and may provide continual agitation of the contents. The mixing may occur for at least about 2 hours. In one aspect, the mixing of the inorganic acid and the mixing of the oxidant are conducted at a temperature of less than or equal to about 80° C., optionally less than or equal to about 75° C., and in certain aspects, less than or equal to about 70° C. In certain aspects, a temperature of the leachate in the leaching reactor 136B may be maintained to be greater than or equal to about 50° C. to less than or equal to about 80° C.

The oxidant 142B may be hydrogen peroxide ($H_2O_2$), ozone ($O_3$), sodium hypochlorite (NaClO), or combinations thereof. In certain variations, the oxidant is hydrogen peroxide ($H_2O_2$). Notably, because the addition of black mass and dilution with sulfuric acid are exothermic processes, the temperature may be monitored to ensure that it does not exceed the boiling point of water, for example, by introducing cool water or via heat exchangers. During the second phase, the waste liquid stream comprising black mass from the upstream second reactor 330 may be gradually added to the agitated acid solution in the leaching reactor 136B.

In one variation, the inorganic acid comprises sulfuric acid ($H_2SO_4$), the oxidant comprises hydrogen peroxide ($H_2O_2$), and a pH of the acidic admixture in the leaching reactor 136B is less than or equal to about 2.5. The hydrogen peroxide ($H_2O_2$) may be added at a concentration of greater than or equal to about 4 by volume to less than or equal to about 20% by volume of total liquid contents, optionally greater than or equal to about 4% by volume to less than or equal to about 15% by volume, and optionally greater than or equal to about 6% by volume to less than or equal to about 15% by volume. In one further variation, the mixing of the inorganic acid comprises adding black mass to the sulfuric acid ($H_2SO_4$) having a molarity of greater than or equal to about 2M to less than or equal to about 4M, the mixing the oxidant adds about 30% by mass hydrogen peroxide ($H_2O_2$) to the acidic admixture so that the acidic mixture has a solid/liquid ratio of about 100 g/L to about 150 g/L, followed by mixing in the leaching second reactor 136 for greater than or equal to about 2 hours, and then the adding of the water from the water source 144 dilutes the sulfuric acid ($H_2SO_4$) to a molarity of about 2M, followed by mixing for greater than or equal to about 30 minutes.

After the waste liquid stream comprising black mass is introduced into the leaching reactor 136B, the acid solution begins reacting with metals in the black mass so that the metals react and form their respective sulfates. In some examples, fluorine (F) in the black mass may be converted to hydrogen fluoride (HF). Some of the HF may stay in the solution contained in the leaching reactor 136B, while the remainder may be released as a gas and vented to a scrubber (not shown).

During the second phase, an oxidant may be fed to the leaching reactor 136B from the oxidant source or container 142B. The oxidant may be hydrogen peroxide ($H_2O_2$), as shown in FIG. 5, or another suitable oxidant. In some examples, the oxidant may be 30% hydrogen peroxide ($H_2O_2$). The oxidant may be fed into the leaching reactor 136B before, the same time as, or after the inorganic acid and/or the waste liquid stream comprising black mass from the second reactor 330 are added. The mixture of the acid solution, the oxidant, and the waste stream/black mass may be agitated for a defined period of time (e.g., 1 hour, 2 hours, 3 hours, etc.).

In some examples, it may be desired for a temperature of the liquid in the leaching reactor 136B to remain at a defined level, as noted above, desirably below 100° C. For example, the defined temperature level may range from about 60° C. (140° F.) to about 80° C. (176° F.). In some embodiments, the minimum required temperature level may be about 60° C. (140° F.), and a desired temperature level may be about 80° C. (176° F.). In some cases, however, the temperature of the liquid may increase above the desired level and/or fall below the minimum required temperature level. For example, as noted above, heat from the reaction between the acid solution and the metals in the black mass may increase the temperature of the liquid in the leaching reactor 136B above the desired temperature (e.g., 80° C.). In other examples, the liquid temperature may not rise to the required level (e.g., 60° C.). In such examples, the liquid temperature may be controlled through different manners. For example, the liquid temperature may be reduced by adjusting the rate of black mass addition to the acid solution. In other cases, the liquid temperature may be reduced or increased by circulating a heating/cooling medium (e.g., steam, etc.) through a jacket 104B surrounding the leaching reactor 136B.

Once the agitation period is complete, water from the source or container 144B is added to the leaching reactor 136B in a second phase. For example, demineralized, deionized (DI) water may be added to dilute the sulfuric acid. For instance, adding the water may reduce molarity of the liquid in the leaching reactor 136B. Additionally, the water may cool the contents in the leaching reactor 136B so that the temperature does not exceed about 90 to 100° C., because as noted above, the addition of the black mass and dilution of the sulfuric acid are exothermic processes. In some examples, the temperature may be cooled to about 60° C. (140° F.). After the demineralized water is added, the mixture in the leaching reactor 136B is agitated for a defined period of time (e.g., about 30 minutes, etc.). At this point, the pH of the solution may be acidic, for example, greater than or equal to about 0.1 to less than or equal to about 1. In certain variation, the pH may be about 0.1. The leachate stream may comprise a variety of metal sulfates, for example, manganese sulfate ($MnSO_4$), cobalt sulfate ($CoSO_4$), nickel sulfate ($NiSO_4$), and the like.

Next, the vessel contents in the leaching reactor 136B are pumped via pump 106 through the second filter 146B. After passing the leachate stream through the second filter 146B, a filtrate waste liquid stream comprising one or more metal sulfates is pumped to the second impurity removal unit or stage 112B for further processing, while a second retentate comprising solids, such as carbon (graphite) particles are formed and removed from the system 100B, like the variations described above. After filtration, the first reactor 134B, second reactor 330, and the leaching reactor 136B may each be washed with an internal spray ball to remove alkaline and acid residue and to send all leaching reaction products to the downstream second impurity removal unit 112B.

More specifically, the waste liquid stream is directed to a first solvent extraction unit or stage 150B in the second impurity removal unit 112B. In the second impurity removal unit or stage 112B, removal of various impurities occurs in multiple stages. For example, multiple solvent-extraction stages may be followed by impurity precipitation as shown in FIG. 5. Further, an optional later deep impurity removal may be used. Generally, impurity removal in the second impurity removal unit or stage 112B may occur concurrently and multifacetedly in a collective batch process, and with individual steps to remove specific impurities performed sequentially. In the second impurity removal stage 112B, impurities (e.g., certain metals or other elements, like fluorine (F) and phosphorus (P)) in the leachate or waste liquid stream produced from leaching stage 110B may be removed, for example, separated via solvent extraction, converted to their hydroxide or other forms and precipitated, followed by optional deep impurity removal by solvent extraction, and the like. In some embodiments, there may be a minimal compromission of precious metals concentration of not more than 5% while removing impurities. Notably, in certain alternative aspects, the second impurity removal unit or stage 112B is not limited to the variation shown and described in the context of FIG. 5 (or FIG. 1). Other variations of impurity removal are contemplated, including those described in the context of co-owned U.S. patent application Ser. No. 18/112,676 filed on Feb. 22, 2023 entitled "Processes and Systems for Purifying and Recycling Lithium-Ion Battery Waste Streams" to Akhondi, et al., the relevant portions of which are incorporated herein by reference.

The methods of the present disclosure may include purifying the lithium-ion battery waste liquid stream by first introducing it to a solvent extraction unit 150B that may include one or more vessels or tanks (not shown in detail). This solvent extraction unit 150B may serve to remove one or more of copper (Cu), iron (Fe), zinc (Zn), and combinations thereof. Use of a process involving the solvent extraction unit 150B is particularly suitable where the black mass is relatively rich in copper (Cu) and/or iron (Fe), for example, having greater than or equal to about 2% to 3% by weight of copper and/or iron. First, a pH of the waste liquid stream may be adjusted to be less than or equal to about 2, for example, in a range of greater than or equal to about 1.7 to less than or equal to about 2. The waste liquid stream containing copper (Cu) to be removed can be contacted (e.g., mixed) with an extractant and an organic phase in a vessel or reactor of the solvent extraction unit 150B. In such a process, the extractant can form a complex with the target impurity, here copper (Cu) and optionally iron (Fe) and transfer the complex from the liquid aqueous phase in the waste stream to the organic phase. In this manner, the extractant/organic phase forms a raffinate that may be further separated by gravity or centrifugation separation processes, which although not shown may be part of the solvent extraction unit 150B as appreciated by those of skill in the art. In certain variations, the solvent-extraction process for removing copper (Cu) may also concurrently and advantageously remove impurities comprising iron (Fe) when the waste liquid stream is mixed with extractant and organic phase.

In certain variations, in a first phase or stage of the solvent extraction process, a first suitable extractant for removing copper and optionally iron comprises an oxime such as 5-nonyl-salicylaldoxime also known as 2-hydroxy-5-nonyl-benzaldehyde oxime (NSAO, commercially available as ACORGA™ P50 oxime solvent extraction reagent). A suitable organic phase for use in the solvent-extraction of copper may be a liquid hydrocarbon, such as kerosene or hexane, by way of example. In certain variations, the kerosene may be a sulfonated kerosene. An aqueous-organic ratio (A/O ratio) may be set 1 to 1. In one variation, a pH may be about 1 to maximize copper (Cu) extraction while minimizing precious metals co-extraction. A concentration of the first extractant (e.g., 5-nonyl-salicylaldoxime) may be greater than 0 to less than or equal to about 20 volume % of the total organic phase volume. After the copper is transferred to the organic phase, it is removed and the solvent extraction process proceeds to the second phase or stage.

For the removal of iron (Fe), zinc (Zn), and other impurities, a suitable second extractant comprises bis-(2-ethylhexyl)phosphoric acid, also known as di-(2-ethylhexyl) phosphoric acid (DEHPA or HDEHP) that is then added to the stream that remains after the first solvent extraction phase or stage. A suitable organic phase for use in the solvent-extraction of the impurity metals may be a liquid hydrocarbon, such as kerosene or hexane. In certain variations, the kerosene may be a sulfonated kerosene. An aqueous-organic ratio (A/O ratio) may be set 2 to 1. In one variation, a pH may be greater than or equal to about 2 to less than or equal to about 2.5. A concentration of the second extractant (e.g., bis-(2-ethylhexyl)phosphoric acid) may be greater than or equal to 0 to less than or equal to about 15 volume %, for example, in one variation, about 10 volume % and in another variation about 15 volume % of the total organic phase volume, while the hydrocarbon (e.g., kerosene) may be present at greater than or equal to 85 to less than or equal to about 100 volume %, for example, about 90 volume % or alternatively about 85 volume % of the total organic phase volume. A duration of the zinc (Zn), iron (Fe), and other impurities removal solvent-extraction process may be about 20 minutes, by way of example.

Thus, each extractant and organic phase/hydrocarbon may be mixed with the process stream solution in the solvent extraction tank/reactor of the solvent extraction unit 150B, so that a cumulative level of all metal impurities (e.g., a total amount of copper (Cu), iron (Fe), and zinc (Zn)) of interest decreases to less than or equal to about 20 ppm. For example, the solution entering the solvent extraction unit 150B may have impurity levels of 100 to 200 ppm, which may then be reduced to less than or equal to about 20 ppm in the purified waste liquid stream exiting the solvent extraction tank in the solvent extraction unit 150B.

In certain variations, solvent extraction may be conducted in a tank or reactor in the solvent extraction unit 150B with three separate stages, which appears to provide an efficacy that far exceeds the separation of a single stage column/reactor. While additional stages may be used, it appears that a fourth or greater stage solvent extraction results in only a negligible increase in copper (Cu) and/or iron (Fe) extraction efficiency.

After conducting the solvent-extraction process in the first solvent extraction unit 150B, in certain variations, greater than or equal to about 98%, optionally greater than or equal to about 99%, optionally greater than or equal to about 99.5%, and optionally greater than or equal to about 99.9% of the initial copper (Cu) present in the waste liquid stream, greater than or equal to about 98%, optionally greater than or equal to about 99%, optionally greater than or equal to about 99.5%, and optionally greater than or equal to about 99.9% of the initial iron (Fe) present in the waste liquid stream may be removed from the waste liquid stream, and greater than or equal to about 98% optionally greater than or equal to about 99%, optionally greater than or equal to about 99.5%, and optionally greater than or equal to about 99.9% of the initial zinc (Zn) present in the waste liquid stream may be removed from the waste liquid stream.

Downstream of the first solvent extraction unit 150B, the impurity removal unit or stage 112B further includes an impurity removal reactor 152B for removing fluorine (F), phosphorus (P), and one or more impurity metals selected from the group consisting of: aluminum (Al) (if remaining), titanium (Ti), iron (Fe) (if remaining), copper (Cu) (if remaining), and zinc (Zn) (if remaining). Initially, the contents from the solvent extraction unit 150B are provided to the impurity removal reactor 152B, which is also identified as V-03 in FIG. 5. The purifying may include fluorine (F) removal in the impurity removal reactor 152B, as described above in the context of the impurity removal reactor 152 in FIG. 1. The fluorine removal process may further include adding a source of calcium 154B, for example, calcium oxide, and optionally an oxidant from a source of oxidant 156B to generate calcium fluoride ($CaF_2$) that precipitates out of the liquid waste stream. The oxidant from the source of oxidant 156B and lime component (source of calcium oxide) from the source of calcium 154B are fed into the impurity removal reactor 152B to initiate the removal of further impurities such as fluorides from the waste liquid stream. The source of calcium 154B may be selected from the group consisting of: lime or calcium oxide (CaO), calcium hydroxide ($Ca(OH)_2$), and combinations thereof and the oxidant may be selected from the group consisting of: hydrogen peroxide ($H_2O_2$), ozone ($O_3$), sodium hypochlorite (NaClO), and combinations thereof. In certain aspects, the oxidant 156B is hydrogen peroxide ($H_2O_2$). While not shown, as appreciated by those of skill in the art, the source of calcium 154B may be an upstream slake tank or reactor, where a solid material comprising calcium is combined with water to form a liquid reagent that comprises calcium (Ca) to form calcium hydroxide ($Ca(OH)_2$) that may then be introduced to and/or mixed with the waste liquid stream in the impurity removal reactor 152B to remove fluorine (F). In certain variations, a pH during the fluoride (F) removal may be greater than or equal to about 1 to less than or equal to about 2. A temperature during the fluorine (F) removal may be about 40° C. in certain variations.

Like in FIG. 1, while not shown, an alternative fluorine removal process may be a selective adsorption process where the liquid stream may be processed in one or more columns (e.g., chromatographic columns or packed-bed columns/reactors) with a resin process using a stationary phase of a polymeric adsorbent with high selectivity for fluorine to remove fluorine upstream of the impurity removal reactor 152B.

In certain aspects, after removal of fluoride, the liquid waste stream may be adjusted to have a pH of greater than or equal to about 4.5 to less than or equal to about 5, for example, by adding an inorganic base, like sodium hydroxide (NaOH) from a source of a base 158B. The transition in the pH will assist with removal of remaining impurities downstream, including one or more of aluminum (Al) (should any aluminum (Al) remain after the alkaline leaching stage 312), iron (Fe), copper (Cu), zinc (Zn) (should any of iron (Fe), copper (Cu), or zinc (Zn) remain after the solvent extraction unit 150B), titanium (Ti), phosphorus (P), and combinations thereof. A temperature in the impurity removal reactor 152B during this process may be about 60° C. and mixing may be conducted for about 60 minutes in certain variations.

Thus, the purifying of the remaining impurities includes increasing pH of the liquid waste stream to generate one or more metal precipitate compounds comprising a metal selected from the group consisting of: aluminum (Al), titanium (Ti), copper (Cu), iron (Fe), zinc (Zn), and combinations thereof. Such metal precipitate compounds may comprise hydroxides, oxides, phosphates, and/or hydrates of these compounds. More specifically, in certain variations, one or more metal hydroxide precipitate compounds are generated selected from the group consisting of: aluminum hydroxide ($Al(OH)_3$), titanium hydroxide ($Ti(OH)_4$), copper hydroxide ($Cu(OH)_2$), iron phosphate ($FePO_4$), iron hydroxide(s) (e.g., $Fe(OH)_3$), zinc hydroxide ($Zn(OH)_2$), zirconium hydroxide ($Zr(OH)_4$), and combinations thereof. In certain variations, the inorganic base (e.g., NaOH) 158B may be added until a pH of the admixture is optionally greater than or equal to about 10.2, optionally greater than or equal to about 10.3, optionally greater than or equal to about 10.4, and in certain aspects, optionally greater than or equal to about 10.5. In certain further variations, the inorganic base may be added until the pH of the admixture is greater than or equal to about 10.5 to less than or equal to about 11.5, optionally greater than or equal to about 10.5 to less than or equal to about 11, which may depend on the stoichiometry of the metals in the final product to be formed.

The addition of sulfuric acid upstream during leaching of the metals facilitates the presence of sulfate ions ($SO_4^{2-}$). An oxidant, like $H_2O_2$ may be added into the impurity removal reactor 152B from the source of oxidant 156B (or have been added upstream in leaching reactor 136B). The oxidant can oxidize certain metals, such as ferrous $Fe^{2+}$ ions to ferric $Fe^{3+}$ ions, so that iron will exist in the liquid waste stream as $Fe_2(SO_4)_3$. Thus, during the impurity removal process in the impurity removal reactor 152B, iron and phosphorus can be precipitated as iron phosphate ($FePO_4$). Likewise, the oxidant (e.g., $H_2O_2$) modifies the oxidative states of titanium (II) and aluminum (III) metals respectively, and therefore, titanium and aluminum hydroxides may be precipitated out (e.g., as $Ti(OH)_2$ or $Ti(OH)_4$ and $Al(OH)_3$).

The second inorganic base, like NaOH, from the source of base 158B that is used to adjust the pH, may also further facilitate precipitation of any excess copper (Cu) and iron (Fe) during this impurity removal process so that residual copper (Cu) and iron (Fe) are removed as impurities.

After processing in the impurity removal reactor 152B, the liquid waste stream exits reactor 152B and enters through a third filter 160B (also identified as F-02) to generate a purified filtrate liquid stream (e.g., the waste liquid stream for further processing downstream) and a second retentate comprising the one or more metal precipitate or solid compounds, for example, precipitated hydroxides, oxides and/or phosphates of aluminum (Al), titanium (Ti), iron (Fe), copper (Cu), zinc (Zn), and calcium fluoride ($CaF_2$), and the like that can be further processed in the system as will be described below. In some embodiments, nearly all impurities (e.g., metallic hydroxides) that precipitated in the reactor 152B are captured in the filter 160B. Thus, the vessel contents in the impurity removal reactor 152B are pumped via another pump 106B (e.g., a centrifugal pump, etc.) through the third filter 160B.

The second impurity removal unit 112B also includes an optional deep impurity unit or stage 314. In certain variations, further processing for deep removal of the impurities may be advantageous. For additional removal of impurities, for example, those impurities comprising a metal selected from the group consisting of: iron (Fe), copper (Cu), zinc (Zn), aluminum (Al), and combinations thereof from the waste liquid solution, a one-stage solvent extraction process may be used in the second impurity removal unit 112B. After adjusting pH of the solution, for example, to be greater than or equal to about 2 to less than or equal to about 2.5, which may involve adding acid (e.g., $H_2SO_4$) or additional base (e.g., NaOH) to the waste stream in the upstream impurity removal reactor 152B and liquid-solid separation/filtration for the removal of precipitated impurities the third filter 160B. The waste liquid stream solution may then be sent to a deep impurity unit or stage 314 that may be in the form of a solvent extraction tank. While a one-stage, single-reactor extraction process is advantageous in certain embodiments, it is further contemplated that more than one solvent extraction tank and/or more than one solvent extraction step may be conducted.

The deep impurity unit or stage 314 may serve to further remove one or more of copper (Cu), iron (Fe), zinc (Zn), aluminum (Al), and combinations thereof from the waste stream. While optional, use of a process involving the deep impurity unit or stage 314 is particularly suitable where a product, such as a precursor for a cathode active material, has cumulative impurities of less than or equal to 20 ppm. First, a pH of the waste liquid stream may be adjusted to be less than or equal to about 2.5, for example, in a range of greater than or equal to about 2 to less than or equal to about 2.5. The waste liquid stream containing copper (Cu), iron (Fe), zinc (Zn), aluminum (Al), and combinations thereof to be removed can be contacted (e.g., mixed) with an extractant and an organic phase in a tank or vessel of the deep impurity unit 314. In such a process, the extractant can form a complex with the target impurity, here copper (Cu), iron (Fe), zinc (Zn), and/or aluminum (Al), and transfer the complex from the liquid aqueous phase in the waste stream to the organic phase. In this manner, the extractant/organic phase forms a raffinate that may be further separated by gravity or centrifugation separation processes, which although not shown may be part of the deep impurity unit or stage 314 as appreciated by those of skill in the art. In certain variations, the solvent-extraction process may concurrently and advantageously remove impurities comprising copper (Cu), iron (Fe), zinc (Zn), aluminum (Al), and combinations thereof, when the waste liquid stream is mixed with extractant and organic phase.

For the removal of iron (Fe), zinc (Zn), and other impurities, a suitable extractant comprises bis-(2-ethylhexyl) phosphoric acid, also known as di-(2-ethylhexyl)phosphoric acid (DEHPA or HDEHP) that is then added to the stream. A suitable organic phase for use in the solvent-extraction of the impurity metals may be a liquid hydrocarbon, such as kerosene or hexane. In certain variations, the kerosene may be a sulfonated kerosene. An aqueous-organic ratio (A/O ratio) may be set 2 to 1. In one variation, a pH may be greater than or equal to about 2 to less than or equal to about 2.5. A concentration of the second extractant (e.g., bis-(2-ethylhexyl)phosphoric acid) may be greater than or equal to 0 to less than or equal to about 15 volume %, for example, in one variation, about 10 volume % and in another variation about 15 volume % of the total organic phase volume, while the hydrocarbon (e.g., kerosene) may be present at greater than or equal to 85 to less than or equal to about 100 volume %, for example, about 90 volume % or alternatively about 85 volume % of the total organic phase volume. A duration of the zinc (Zn), iron (Fe), and other impurities removal solvent-extraction process may be about 20 minutes, by way of example.

Thus, each extractant and organic phase/hydrocarbon may be mixed with the process stream solution in the solvent extraction tank/reactor of the deep impurity unit 314, so that a cumulative level of all metal impurities (e.g., a total amount of copper (Cu), iron (Fe), and zinc (Zn)) of interest decreases to less than or equal to about 20 ppm. For example, the solution entering the deep impurity unit 314 may have impurity levels of 100 to 200 ppm, which may then be reduced to less than or equal to about 20 ppm in the purified waste liquid stream exiting the solvent extraction tank in deep impurity unit or stage 314. In certain variations, solvent extraction may be conducted in a tank or reactor in the deep impurity unit 314 with a single stage.

After conducting the solvent-extraction process in the deep impurity unit or stage 314, in certain variations, greater than or equal to about 98%, optionally greater than or equal to about 99%, optionally greater than or equal to about 99.5%, optionally greater than or equal to about 99.9%, and optionally greater than or equal to about 99.99% of the initial aluminum (Al) present in the waste liquid stream, optionally greater than or equal to about 98%, optionally greater than or equal to about 99%, optionally greater than or equal to about 99.5%, optionally greater than or equal to about 99.9%, and optionally greater than or equal to about 99.99% of the initial copper (Cu) present in the waste liquid stream, greater than or equal to about 98%, optionally greater than or equal to about 99%, optionally greater than or equal to about 99.5%, optionally greater than or equal to about 99.9%, and optionally greater than or equal to about 99.99% of the initial iron (Fe) present in the waste liquid stream may be removed from the waste liquid stream, and greater than or equal to about 98% optionally greater than or equal to about 99%, optionally greater than or equal to about 99.5%, optionally greater than or equal to about 99.9%, and optionally greater than or equal to about 99.99% of the initial zinc (Zn) present in the waste liquid stream may be removed from the waste liquid stream.

The purified filtrate stream now enters either first metal recovery unit 114B in the first operational mode or second metal recovery unit 114C in the second operational mode. The first metal recovery unit 114B may include a co-precipitation reactor 320 into which the waste liquid stream may be pumped where a co-precipitation process may be conducted by increasing pH. While not shown, the co-precipitation reactor 320 and associated components may have a design like the co-precipitation reactor(s) described in U.S. Publication No. 2023/0304128 to Akhondi et al., entitled "Processes and Systems for Purifying and Recycling Lithium-Ion Battery Waste Streams," the relevant portions of which are incorporated herein by reference. In the reactor, one or more recovered co-precipitated products comprising one or more of nickel (Ni), manganese (Mn), and cobalt (Co) are generated. In certain variations, a liquid stream comprising lithium (Li) may also be generated, when lithium is present. In alternative variations, lithium may be removed upstream and may not be present. The one or more recovered products may be an electroactive material precursor, more specifically a positive electrode/cathode active material precursor, for example, being a lithium nickel manganese cobalt oxide (NMC) precursor, which may have a stoichiometry of $Ni_xMn_yCo_{1-x-y}(OH)_2$, where x is <1 and y is <1. In certain variations, the co-precipitated product 300 may be hydroxides of nickel manganese cobalt (NMC—$Ni_xMn_yCo_z$) with varying stoichiometries. For example, the co-precipitated product 300 may comprise various hydroxides (or hydrates of hydroxides) that have difference stoichiometries, for example, where x is 0.33, y is 0.33 and z is 0.33 (that can form $Ni_{0.33}Mn_{0.33}Co_{0.33}(OH)_2$ that after treatment forms a cathode active material $LiNi_{0.33}Mn_{0.33}Co_{0.33}O_2$, also referred to as NMC111). However, various other stoichiometries are also contemplated, for example, NMC622 (where x is 0.6, y is 0.2, and z is 0.2), NMC811 (where x is 0.8, y is 0.1, and z is 1), and NMC532 (where x is 0.5, y is 0.3, and z is 0.2), by way of non-limiting example. To convert this precursor material to an electroactive material (in oxide form), it can be mixed with other reagents, like lithium carbonate for lithiation. The mixture can be subjected to a thermal treatment, like calcination, to convert the electroactive material hydroxide precursor to the electroactive material lacking hydroxides.

In certain aspects, after leaching of metals and removal of impurities have been conducted as described above, the co-precipitated recovered product comprising two or more of nickel (Ni), manganese (Mn), and cobalt (Co) are extracted from the waste liquid stream. In certain variations, a reaction between stoichiometric quantities of transition-metal salts, such as nickel sulfate hydrate ($NiSO_4 \cdot 6H_2O$), manganese sulfate hydrate ($MnSO_4 \cdot H_2O$), and cobalt sulfate hydrate ($CoSO_4 \cdot 7H_2O$) occurs.

In one optional variation, a complexing agent (chelating agent) and a base may be used in the process. For example, ammonia ($NH_3$) may be used as a complexing or chelating agent and may be added first to provide a sufficient concentration gradient to promote the formation of $[M(NH_3)]^{2+}$ complexes (where M is a transition metal like nickel (Ni), manganese (Mn), or cobalt (Co)) prior to particle precipitation. Sodium hydroxide or potassium hydroxide may be selected as the base to maintain a high pH and supply hydroxide ions for metal product precipitation. In such a variation, the reactions that occur are shown below, where "n" represents a number of coordinating ammonia molecules and M represents nickel (Ni), manganese (Mn), or cobalt (Co), which is less than or equal to 6. Reaction (1) shows the metal complexation/chelating into complexes.

Reaction (2) shows the addition of a base, like NaOH, that forms metal hydroxides.

$$M^{2+} + nNH_3 \rightarrow [M(NH_3)n]^{2+} \quad (1)$$

$$[M(NH_3)n]^{2+} + 2OH^- \rightarrow M(OH)_2 + nNH_3 \quad (2)$$

In this manner, as will be described further, below, additional processing of the liquid waste stream can separate and recover nickel (Ni), manganese (Mn), and cobalt (Co) hydroxides.

Thus, an NMC electroactive material precursor may be extracted from the system 100B at the co-precipitation reactor 320 in the co-precipitation stage as co-precipitated product 300. The waste liquid stream is processed in co-precipitation reactor 320 to separate and recover nickel (Ni), manganese (Mn), and cobalt (Co). The purified waste liquid stream may be received directly from the upstream processing system 310 or may be either pretreated as described above with a complexing or chelating agent, like ammonia, or may simply be processed as described herein in co-precipitation reactor 320 to facilitate co-precipitation.

Thus, the purified waste liquid stream comprises nickel sulfate ($NiSO_4$), manganese sulfate ($MnSO_4$), and cobalt sulfate ($CoSO_4$) and the method according to certain aspects of the present disclosure may include separating nickel (Ni), manganese (Mn), and cobalt (Co) from the purified waste liquid stream by entering the co-precipitation reactor 320 for conducting the co-precipitation process.

The co-precipitation process may comprise increasing the pH of the purified waste liquid stream to greater than or equal to about 11, optionally in an inert environment (e.g., nitrogen blanket), to form hydroxides or hydrates, such as nickel hydroxide ($Ni(OH)_2$), manganese hydroxide ($Mn(OH)_2$), and cobalt hydroxide ($Co(OH)_2$) that concurrently precipitate from the purified filtrate stream to generate the one or more recovered co-precipitated products 300.

In the co-precipitation process, an inorganic base, such as sodium hydroxide (NaOH) may be fed into the co-precipitation reactor 320 to increase the pH level. For example, 19.125M NaOH may be added to increase the pH to greater than or equal to about 10.5 or about 11, and the like. During this time, the solution in the r co-precipitation reactor 320 may be agitated with an agitator (not shown) for a defined period of time (e.g., about 30 minutes, etc.), and the temperature may be maintained at about 80° C. (176° F.) by circulating a heating/cooling medium through a jacket (not shown) surrounding the co-precipitation reactor 320. After the agitation period is complete, $NiMnCo(OH)_6$ co-precipitate, sodium sulfate, and lithium sulfate are generated as further explained below.

For example, after NaOH is added to the reactor 320, the metal sulfates $NiSO_4$, $MnSO_4$, and $CoSO_4$ are converted into their hydroxides, forming nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$), respectively. Alternatively, in a process where the purified liquid stream is pretreated with a complexing or chelating agent (e.g., ammonia), the adding NaOH to the reactor 320 to the pH levels at the conditions described above serves to form the same metal hydroxides or metal hydroxide hydrates, namely nickel hydroxide ($Ni(OH)_2$), manganese hydroxide ($Mn(OH)_2$), and cobalt hydroxide ($Co(OH)_2$).

As noted above, to maintain the oxidative integrity of the hydroxides, an inert environment may be provided via, for example, the use of a nitrogen blanket.

$$NiSO_4(aq) + 2NaOH \rightarrow Ni(OH)_2 + Na_2SO_4$$

$$MnSO_4(aq) + 2NaOH \rightarrow Mn(OH)_2 + Na_2SO_4$$

$$CoSO_4(aq) + 2NaOH \rightarrow Co(OH)_2 + Na_2SO_4$$

In some embodiments, a nitrogen purge system may be used with the reactor 320 to generate the nitrogen blanket. For example, nitrogen (e.g., a nitrogen source providing $N_2$ gas) may be connected to a push-pull (e.g., a pad-depad) valve to keep the reactor 320 oxygen free during pump-in and pump-out steps. Additionally, the reactor 320 may be designed for 45 PSIG and equipped with a valve (e.g., a pressure relief valve) set at 45 PSIG for potential future high-pressure operation.

In some embodiments, with all the liquid from upstream processing system 310 collected in the reactor 320, a concentration of the one or more recovered components, such as NMC components is analyzed and adjusted accordingly. For example, because each of the hydroxide's precipitates share similar crystals and micro spherical structures, they may behave similarly in mechanism and can appear as mixed salts instead of three separate phases, irrespective of their Ni/Mn/Co ratios.

The method may further comprise determining a first ratio of metals, namely Ni:Mn:Co, in the purified waste liquid stream prior to the co-precipitation process. The method may include comparing this first ratio of metals to a target stoichiometric ratio of metals (Ni:Mn:Co) for the one or more recovered products. The method may then include adding one or more compounds comprising nickel, sulfate, and cobalt, such as nickel sulfate ($NiSO_4$), manganese sulfate ($MnSO_4$), and cobalt sulfate ($CoSO_4$) to the purified waste liquid stream to adjust an amount of nickel sulfate ($NiSO_4$), manganese sulfate ($MnSO_4$), and cobalt sulfate ($CoSO_4$) prior to adjusting the pH. In this manner, the one or more recovered products has a second ratio of metals (Ni:Mn:Co) corresponding to the target stoichiometric ratio.

Thus, where the Ni:Mn:Co values may not suffice for an intended recycled electroactive material precursor, or should the desired product be of different NMC permutation/stoichiometry, one or more metals (e.g., Ni, Mn, and/or Co in the form of metal sulfates) may be added as necessary to the reactor 320. This may achieve, for example, molar equivalence between nickel, manganese, and cobalt in the reactor 320. Below is one such example formulation of adding NMC sulfates. In certain aspects, the system may include an analyzer unit that can sample the purified liquid stream and determine a content of nickel (Ni), manganese (Mn), and cobalt (Co) upstream of the reactor. The co-precipitation unit may also comprise a controller and one or more metering pumps to regulate flow of a nickel sulfate ($NiSO_4$), manganese sulfate ($MnSO_4$), and cobalt sulfate ($CoSO_4$) into the plurality of inlets of the co-precipitation reactor 320. The controller receives input from the analyzer and controls the one or more metering pumps to adjust the amount of respective sulfates fed to the stream or into the reactor 320.

In various embodiments, NMC sulfates may be dosed accordingly via the use of automated process implementing a controller such as a programmable logic controller (PLC). For example, nickel, manganese, and cobalt sulfates may be added to the reactor 320 using a PLC. A real time control system governing the balance of Ni—Mn—Co molar ratios for the customization of $N-M-C(OH)_2$ products may be implemented by using an inductively coupled plasma (ICP) analyzer with algorithm implemented in the PLC. Concentrations of nickel, manganese and cobalt in the solution entering the reactor 320 may be measured using the ICP analyzer. The measurements may then be relayed to the PLC for further computation. For example, the algorithm stored in the PLC may determine the volume of nickel sulfate ($NiSO_4$), manganese sulfate ($MnSO_4$), and cobalt sulfate ($CoSO_4$) needed to dose for the coprecipitation of the final $NiMnCo(OH)_2$ product based on metal concentration data (e.g., represented in one or more feedback signals) from the ICP analyzer. In some examples, the algorithm can take in any form of desired $NiMnCo(OH)_2$ output and compute the desired dosage volume by balancing the molar ratio to the setpoint. Once the desired dosage volume is determined, the PLC may provide control signals to metering pumps (not shown) for precise dosages of $NiSO_4$, $MnSO_4$, $CoSO_4$. After the desired levels of NMC sulfates are achieved, the pH of the solution may be increased by adding NaOH as explained above. A controller (e.g., implementing proportional-integral-derivative (PID) control) may control a metering pump to add the desired amount of NaOH based on a pH sensor mounted at the reactor 320.

Thus, instead of precipitating, for example, $NiMnCo(OH)_6$ hydroxide (e.g., NMC111) manually, the entire process may be automated. This provides convenience for the entire end user and management by dosing the appropriate nickel sulfate ($NiSO_4$), manganese sulfate ($MnSO_4$), and cobalt sulfate ($CoSO_4$) to supplement the necessary concentrations of Ni, Mn, and Co in the solution to produce the appropriate NMC hydroxide permutation (and/or for other permutations, such as NMC622, NMC811, NMC532, by way of non-limiting example).

After adding the appropriate amount of NaOH and the appropriate amounts of NMC sulfates (for adjustment of metal ratios), the co-precipitation reactor 320 contains all of the N-M-C product as precipitate, as well as sodium sulfate and lithium sulfate that are dissolved under process conditions, as explained above. In some embodiments, residual HF in the solution contained in the reactor 320 may be released as a gas and vented to a scrubber (not shown). While not shown, the contents in the co-precipitation reactor 320 may be pumped and separated, for example, by passing through a filter so that a filtrate (e.g., including sodium sulfate and lithium sulfate) and a retentate including the one or more co-precipitated products comprising nickel (Ni), manganese (Mn), and cobalt (Co) are generated. In some embodiments, nearly all of the one or more recovered products (e.g., NMC product 300) that precipitated in the co-precipitation reactor 320 are captured as retentate after filtration.

After filtration, the co-precipitation reactor 320 may be washed with an internal spray ball to remove any process fluid residue. At the end of such a batch cycle, the co-precipitated NMC product 300 retentate/filter cake may be collected for further drying, processing, and/or packaging. The filtrate liquid comprising the lithium (Li) may then be directed towards the lithium recovery unit 130B, which operates in the same manner and conducts the same processes as lithium recovery unit 130 described in the context of FIGS. 1 and 2 and which generates a lithium (Li) containing product 308, such as lithium carbonate ($Li_2CO_3$).

In the alternative second operational mode, the purified filtrate stream instead enters the second metal recovery unit 114C. The second metal recovery system 114C includes the manganese (Mn) recovery unit 120B, the separation unit 124B (which may include an optional coprecipitation unit), followed by the cobalt (Co) recovery unit 126B and the nickel (Ni) recovery unit 128B. The second metal recovery system 114C can also be in communication with the lithium (Li) recovery unit 130B. In the manganese (Mn) recovery unit 120B, manganese (Mn) is separated from the waste liquid stream received from the upstream impurity removal unit or stage 112B. At this point in the process, the waste liquid stream comprises manganese (Mn), nickel (Ni), cobalt (Co), and optionally lithium (Li). The separating of manganese (Mn) comprises one or more of the following: (i) introducing a first oxidant to the waste liquid stream to react and form solid manganese dioxide ($MnO_2$), (ii) reacting the waste liquid stream with ozone ($O_3$) to form solid manganese dioxide ($MnO_2$), or both (i) and (ii). Where both (i) and (ii) are conducted, the (i) introducing the first oxidant to the waste liquid stream forms a first amount of solid manganese dioxide ($MnO_2$) and (ii) the reacting the waste liquid stream with ozone ($O_3$) forms a second amount manganese dioxide ($MnO_2$). By way of example, in certain aspects, the (i) introducing the first oxidant (e.g., sodium permanganate ($NaMnO_4$)) to the waste liquid stream solidifies about 95% of the manganese present in the waste liquid stream as a first amount of manganese dioxide ($MnO_2$) and (ii) the reacting the waste liquid stream with ozone ($O_3$) solidifies the remaining amount (e.g., about 5%) of manganese present in the waste liquid stream as the second amount manganese dioxide ($MnO_2$).

The manganese (Mn) recovery unit 120B includes a reactor 170B with agitator 102B and a source of an oxidant 172B. It should be noted that while the manganese (Mn) recovery unit 120B is shown in FIG. 5 as having a single reactor 170B, in alternative variations, it is contemplated that multiple reactors (vessels or tanks) may be used to conduct the (i) introducing a first oxidant to the waste liquid stream to react and form a solid manganese dioxide ($MnO_2$) (as described in detail above in the context of FIGS. 1 and 2) and/or (ii) reacting the waste liquid stream with ozone ($O_3$) to form solid manganese dioxide ($MnO_2$) (as described in detail above in the context of FIGS. 1 and 2). The oxidant 172B may be a permanganate, for example, selected from the group consisting of: potassium permanganate ($KMnO_4$), sodium permanganate ($NaMnO_4$), and combinations thereof. A suitable oxidant, such as permanganate, is added to waste liquid stream to form precipitates (conversion of manganese sulfates into their oxide form) that can be easily removed via filtration and collected as the retentate. In certain variations, potassium permanganate is added to the waste liquid stream, but does not exceed 95% the stoichiometric requirements per the equations above to prevent introducing additional dosage of manganese which is already present in the system.

The manganese (Mn) recovery unit 120B also includes a source of ozone ($O_3$) 174B. After manganese has been extracted as solid manganese oxide from the liquid contents in the reactor 170B, the liquid stream may be further reacted in the reactor 170B (or transferred to an additional reactor) where ozonation takes place.

Manganese oxide ($MnO_2$) is obtained as first product 302 that is a solid cake after filtration. A fourth filter 176B (also identified as F-03) is disposed downstream of the reactor 170B to separate solid manganese products ($MnO_2$) from the waste liquid stream. The reactor 170B has a plurality of inlets 178B receiving the first oxidant from the source of oxidant 172B, the ozone ($O_3$) from the source of ozone 174B, and the waste liquid stream from the upstream processing system 310. The reactor 170B has an outlet 179B through which the waste liquid stream exits to enter the third filter 176B for separation into a filtrate liquid stream (the waste liquid stream that will be further processed) and a first retentate comprising manganese dioxide ($MnO_2$) that is one of the independent product streams (first product 302 comprising manganese (Mn)) formed in accordance with certain aspects of the present disclosure.

During the extraction of manganese oxide, careful addition of either an inorganic base, like sodium hydroxide (NaOH) from a source of a base (not shown in FIG. 5), or an inorganic acid, like sulfuric acid ($H_2SO_4$), from an acid source (not shown in FIG. 5) is added to the waste liquid stream to control the pH to be greater than or equal to about 1.5 to less than or equal to about 3. One of skill in the art will appreciate that sulfuric acid is a by-product of the precipitation of manganese oxide, and the solution pH ensures solidification of solid manganese oxide ($MnO_2$). The adjustments to quantities and concentration of the sodium hydroxide may be also adjusted based on the reactor size, residence time in the reactor 170B, and total production of sulfuric acid.

After filtration, the reactor 170B may be washed with an internal spray ball to remove acid residue in the vessel and to send all reaction products downstream. Additionally, any chemical residue in the filter cake may be rinsed to reduce operator exposure during cake collection. At the end of this batch cycle (e.g., manganese recovery 120B), the retentate/manganese hydroxides cake may be collected for further processing as a first product 302 stream from the process.

Next, the waste liquid stream (filtrate liquid stream from the third filter 176B) passes into the optional coprecipitation unit 122B that includes a coprecipitation reactor 180B (also identified as V-05) that is part of the separation unit 124B. It should be noted that this coprecipitation unit 122B is optional depending on whether lithium (Li) is present in the waste stream at this point in the system 100B, because the processes that occur in coprecipitation unit 122B serve to process the waste stream to separate lithium (Li) from the nickel (Ni) and cobalt (Co). If there is no lithium (Li) in the waste stream at this point in the system, for example, because it was removed in an upstream process, the waste liquid stream may instead bypass the co-precipitation unit 122B and be directed into downstream separation reactor 190B of separation unit 124B further described below. Stated in another way, the coprecipitation unit 122B is present to assist with separating lithium (Li) from the nickel (Ni) and cobalt (Co) remaining in the waste stream, so that lithium (Li) may be further treated and recovered.

The co-precipitation unit 122B includes co-precipitation reactor 180B that receives the liquid waste stream from the manganese recovery unit 120B. First, pH of the waste liquid stream may be increased in the coprecipitation reactor 180B to greater than or equal to about 9, which causes co-precipitating of nickel hydroxide ($Ni(OH)_2$) and a cobalt hydroxide (e.g., $Co(OH)_2$). For example, to precipitate compounds comprising nickel (Ni) and cobalt (Co), a pH of the liquid in the coprecipitation reactor 180B may be adjusted to be greater than or equal to about 9 to less than or equal to about 11, for example, greater than or equal to about 9 to less than or equal to about 10. In other variations, the co-precipitation process may comprise increasing the pH of the purified filtrate stream to greater than or equal to about 11. In certain variations, the coprecipitation process may optionally occur in an inert environment (e.g., nitrogen blanket). The reactions that occur in the co-precipitation reactor 180B to form nickel hydroxide ($Ni(OH)_2$) and a cobalt hydroxide product (e.g., $Co(OH)_2$) were previously discussed above.

The coprecipitation unit 122B includes a source of a base 182B that supplies an inorganic base (e.g., NaOH) to the coprecipitation reactor 180B, as well as a fifth filter 186B (also identified as F-04) downstream of the coprecipitation reactor 180B. Next, the coprecipitation reactor 180B contents may be pumped via pump 106B through the fifth filter 186B. After the waste liquid stream exits the coprecipitation reactor 180B it may be passed through the fifth filter 186B for filtering to generate a retentate comprising nickel hydroxide ($Ni(OH)_2$) and cobalt hydroxide ($Co(OH)_2$) (that may then be processed in the downstream separation unit 124B followed by processing in either the cobalt (Co) recovery unit 126B or the nickel (Ni) recovery unit 128B) and a filtrate (that may then be processed in the downstream lithium (Li) recovery unit 130B). After filtration, a separate water stream may be lined up with the pump(s) 106, for example, having a temperature of greater than or equal to about 40° C. and less than or equal to about 70° C. upstream of the fifth filter 186B for washing and to remove residual filtrate and retentate. The retentate cake (e.g., in the container on the fifth filter 186B, etc.) comprising nickel hydroxide ($Ni(OH)_2$) and cobalt hydroxide ($Co(OH)_2$) may be collected for further processing.

The coprecipitation reactor 180B, like the other reactors, includes agitator 102B for stirring the contents in the vessel. The coprecipitation reactor 180B also has a plurality of inlets 183B receiving the base from the source of base 182B and the waste liquid stream from the reactor 170B of the manganese (Mn) recovery unit 120B. The coprecipitation reactor 180B also includes an outlet 184B that passes the liquid stream to the fifth filter 186B. To maintain the oxidative integrity of the hydroxides formed in the coprecipitation reactor 180B, an inert environment may be provided via, for example, the use of a nitrogen blanket.

The retentate comprising nickel hydroxide ($Ni(OH)_2$) and cobalt hydroxide ($Co(OH)_2$) is then transported into a separation reactor 190B (also identified as V-06) of the separation unit 124B for generating a first stream predominantly comprising cobalt (Co) and a second stream predominantly comprising (Ni). The separation unit 124B further includes a source of an acid 192B, such as an inorganic acid, like sulfuric acid ($H_2SO_4$), a source of an oxidant 194B, such as those described above, like hydrogen peroxide ($H_2O_2$), a source of a base, such as an inorganic base 196B, like sodium hydroxide (NaOH), and a source of sodium hypochlorite (NaClO) 198B. The separation unit 124B further includes a sixth filter 200B (also identified as F-05) downstream of the separation reactor 190B.

The separation reactor 190B, like the other reactors, includes agitator 102B for stirring the contents in the vessel. The separation reactor 190B has a plurality of inlets 202B that receive the retentate stream from upstream (e.g., the coprecipitation reactor unit 180B), the sulfuric acid ($H_2SO_4$) from the source of acid 192B, the hydrogen peroxide ($H_2O_2$) oxidant from the source of the oxidant 194B, the sodium hydroxide (NaOH) base from the source of the base 196B, and the sodium hypochlorite (NaClO) from its source 198B. The separation reactor 190B also includes an outlet 206B through which contents from the separation reactor 190B pass into the sixth filter 200B.

The process that occurs in the separation reactor 190B includes adding sulfuric acid ($H_2SO_4$) and the oxidant (e.g., peroxide ($H_2O_2$)) to the retentate comprising the nickel hydroxide ($Ni(OH)_2$) and cobalt hydroxide ($Co(OH)_2$). By way of example, the precipitated Ni and Co materials can be digested using $H_2SO_4$ (with a concentration of about 5 to about 15% by mass) and $H_2O_2$ (with a concentration of about 5 to about 20% by mass) at approximately 50° C., with the pH then being adjusted to greater than or equal to about 4, for example, about 4.5, using NaOH (25%). After adjusting pH to greater than or equal to about 4, sodium hypochlorite (NaClO) is added to form cobalt oxyhydroxide (COOH), so that the same reactions occur as described above in the context of separation reactor 190 in FIGS. 1 and 2.

Subsequently, the solution is filtered in the sixth filter 200B to separate nickel (nickel) present in the liquid filtrate and separate it from the retentate. After filtration, the retentate or filter cake comprising cobalt oxyhydroxide (COOH) is optionally washed with DI water, for example, at a temperature of greater than or equal to about 50 to less than or equal to about 75° C., to remove residue of nickel (Ni) in the filter cake.

Next, the retentate comprising cobalt oxyhydroxide (COOH) passes into the cobalt (Co) recovery unit 126B. As shown, the cobalt (Co) recovery unit 126B includes multiple reactors, including a first cobalt (Co) recovery reactor 220B (also identified as V-10) and a second cobalt recovery reactor 222B (also identified as V-11), both of which have agitators 102B and jackets 104B. First cobalt (Co) recovery reactor 220B has a source of an acid 210B, such as an inorganic acid like sulfuric acid ($H_2SO_4$) and a source of an oxidant 214B, such as hydrogen peroxide ($H_2O_2$). First cobalt (Co) recovery reactor 220B also has a source of a base 322, such as sodium hydroxide (NaOH) and a source of sodium hypochlorite (NaClO) 324. The first cobalt (Co) recovery reactor 220B has a plurality of inlets 234B that receive the retentate from the sixth filter 200B comprising cobalt oxyhydroxide (COOH), the acid from the source of the acid 210B, the sodium hydroxide from the source of the base 322 and the sodium hypochlorite (NaClO) from the source 324.

To purify the retentate that comprises cobalt precipitate (e.g., a cobalt hydroxide product like cobalt oxyhydroxide (COOH)) and to remove any remaining nickel in the first cobalt (Co) recovery reactor 220B, the precipitate is digested by adding sulfuric acid (e.g., $H_2SO_4$ at 5% concentration) and oxidant (e.g., $H_2O_2$ at 5% concentration). This step may be conducted at about 50° C. for 30 minutes, in certain variations. After the digestion process, sodium hypochlorite (NaClO at approximately 10% concentration) is then added dropwise into the first cobalt (Co) recovery reactor 220B for about 15 to about 20 minutes. After adding the sodium hypochlorite (NaClO), the solution in the reactor is stirred, for example, for about 90 minutes at greater than or equal to about 50 to less than or equal to about 60° C. Further, the first cobalt (Co) recovery reactor 220B contents may be adjusted to have a pH of greater than or equal to about 2.5 to less than or equal to about 4, for example, by adding an inorganic base, like sodium hydroxide (NaOH) from the source of a base 322. The cobalt (Co) recovery unit 126B also comprises seventh filter 224B (also identified as F-08) disposed between the first cobalt (Co) recovery reactor 220B and the second cobalt (Co) recovery reactor 222B. After filtration of the contents of the first cobalt (Co) recovery reactor 220B, a liquid filtrate stream 328 comprising nickel is directed to the nickel recovery unit 128B, while the retentate comprises cobalt precipitate (e.g., cobalt oxyhydroxide (COOH)), the purity of the cobalt increased to greater than or equal to about 98%. To produce cobalt with an even greater/higher purity, for example greater than or equal to about 99.5%, the cobalt precipitate may optionally be further processed a second reactor (not shown), which adds another stage of digestion and precipitation with NaClO into the cobalt (Co) recovery unit 126B of system 100B.

The retentate comprising cobalt (e.g., cobalt oxyhydroxide (COOH)) may then be transferred to second cobalt (Co) recovery reactor 222B. Second cobalt (Co) recovery reactor 222B has a source of an acid 212B, such as an inorganic acid like sulfuric acid ($H_2SO_4$), and a source of an oxidant 330, such as hydrogen peroxide ($H_2O_2$). The second cobalt recovery reactor 222B has a plurality of inlets 240B that receive the purified retentate comprising cobalt, the second acid from the first source of the acid 212B, the oxidant from the source of oxidant 330. Notably, the liquid filtrate stream 328 exiting the seventh filter 224B contains an acid solution with nickel that may be pumped back into the nickel recovery system 128B. In the second cobalt recovery reactor 222B, the purified retentate comprising cobalt (e.g., cobalt oxyhydroxide (COOH)) is mixed and digested with sulfuric acid ($H_2SO_4$), for example, having a concentration of greater than or equal to about 5 to about 15% by mass and the oxidant (hydrogen peroxide ($H_2O_2$) having a concentration of greater than or equal to about 5 to about 15% by mass). In this manner, the cobalt compounds from the retentate form cobalt sulphate ($CoSO_4$) in the second cobalt recovery reactor 222B that are passed via outlet 242B to downstream units that can form a desired stream of cobalt product(s), either third cobalt (Co) product 306A comprising cobalt sulphate ($CoSO_4$) or third cobalt (Co) product 306B.

The cobalt (Co) recovery unit 126B thus also includes two optional units downstream of the cobalt purification reactors (first cobalt (Co) recovery reactor 220B and second cobalt recovery reactor 222B): a first evaporator or crystallizer 230B (identified as Unit 6) to form cobalt sulfate ($CoSO_4$) and/or a cobalt precipitator 232B (identified as Unit 7) where pH may be adjusted (for example, by increasing pH to greater than or equal to about 9 by adding a base, like sodium hydroxide (NaOH)) to form cobalt hydroxide (Co$(OH)_2$). Notably, the cobalt recovery system 126B may have only one of the first evaporator or crystallizer 230B and the cobalt precipitator 232B, depending on whether the desired cobalt-containing product will comprise cobalt sulfate ($CoSO_4$) (or a cobalt sulfate hydrate (e.g., $CoSO_4 \cdot 7H_2O$)) or cobalt hydroxide (Co$(OH)_2$). In the first evaporator or crystallizer 230B, the liquid (e.g., water) from the retentate stream entering is removed so as to leave cobalt sulfate ($CoSO_4$) in a solid form. The evaporator separates the liquids from the cobalt sulphate ($CoSO_4$) in the retentate, which may be achieved by changing pressure, heating, and the like. In such examples, greater than or equal to about 90% to less than or equal to about 98% of the liquids, including water, in the stream may be evaporated or removed to form a concentrated cobalt sulfate ($CoSO_4$) product that may be collected.

Alternatively, the retentate stream comprising cobalt sulfate ($CoSO_4$) may be transferred into the cobalt precipitator 232B, where pH may be adjusted to basic conditions, for example, to be greater than or equal to about 9 to precipitate a cobalt hydroxide product, such as cobalt hydroxide (Co$(OH)_2$) or cobalt oxyhydroxide (COOH) in a similar manner to the reactions that occur in the impurity removal reactor 152. The pH adjustment may include adding an inorganic base, like sodium hydroxide (NaOH) as described above to increase the pH to the basic levels advantageous to precipitating the cobalt hydroxide product. For example, the pH may be adjusted to be greater than or equal to about 9 to less than or equal to about 11, for example, greater than or equal to about 9 to less than or equal to about 10. While not shown, the cobalt precipitator 232B may include another filter to separate the cobalt hydroxide product from the liquids after the stream exits the cobalt precipitator 232B.

With renewed reference to the filtrate stream exiting the fifth filter 200 in the separation unit 124, this filtrate comprises nickel and is next passed into the nickel (Ni) recovery unit 128. The nickel (Ni) recovery unit 128 includes two optional systems: a second evaporator or crystallizer 250 to form nickel sulfate ($NiSO_4$) (or a nickel sulfate hydrate (e.g., $NiSO_4 \cdot 6H_2O$)) and/or a nickel precipitator 252 to form nickel hydroxide (Ni$(OH)_2$). Notably, the nickel (Ni) recovery unit 128 may have only one of the second evaporator or crystallizer 250 and the nickel precipitator 252, depending on whether the desired cobalt-containing product will comprise nickel sulfate ($NiSO_4$) or nickel hydroxide (Ni$(OH)_2$). In the second evaporator or crystallizer 250, the liquid (e.g., water) from the filtrate stream entering is removed so as to leave nickel sulfate ($NiSO_4$) in a solid form. The evaporator separates the liquids from the nickel sulphate ($NiSO_4$) in the retentate, which may be achieved by changing pressure, heating, and the like. In such examples, greater than or equal to about 90% to less than or equal to about 98% of the liquids, including water, in the stream may be evaporated or removed to form a concentrated nickel sulfate ($NiSO_4$) product that may be collected.

Alternatively, the filtrate stream comprising nickel sulfate ($NiSO_4$) may be transferred into the nickel precipitator 252, where pH may be adjusted to basic conditions, for example, to be greater than or equal to about 9, optionally greater than or equal to about 9.5 to less than or equal to about 10.5, to precipitate nickel hydroxide (Ni$(OH)_2$) in a similar manner to the reactions that occur in the impurity removal reactor 152. The pH adjustment may include adding an inorganic base as described above to increase the pH to the basic levels advantageous to precipitating nickel hydroxide. For example, the pH may be adjusted to be greater than or equal to about 9 to less than or equal to about 11. While not shown, the nickel precipitator 252 may include another filter to separate the nickel hydroxide (Ni$(OH)_2$) product from the liquids after the stream exits the nickel precipitator 252.

With renewed reference to the filtrate stream exiting the sixth filter 200B in the separation unit 124B, this filtrate comprises nickel and is next passed into the nickel (Ni) recovery unit 128B. The nickel (Ni) recovery unit 128 includes a first nickel precipitation reactor 340 that like previous reactors may include agitator 102B and jacket 104B. First nickel precipitation reactor 340 has a source of a base 342, such as an inorganic base like sodium hydroxide (NaOH). The first nickel precipitation reactor 340 has a plurality of inlets 344 that receive the liquid filtrate stream from the sixth filter 200B comprising nickel and the sodium hydroxide (NaOH) from the source of the base 342.

In this first nickel precipitation reactor 340, by adjusting the pH by adding base like sodium hydroxide (NaOH), nickel (Ni) is precipitated as Ni$(OH)_2$. The reaction is as follows:

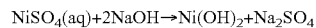
$$NiSO_4(aq) + 2NaOH \rightarrow Ni(OH)_2 + Na_2SO_4$$

For example, the pH may be adjusted to be greater than or equal to about 9 to less than or equal to about 11, for example, greater than or equal to about 9.5 to less than or equal to about 10.5, and in certain variations to be about 10. This nickel hydroxide Ni$(OH)_2$ may form the second product 304A comprising (Ni). The purity of the second (Ni) product 304A in this stage may be greater than or equal to about 99%. While not shown, the first nickel precipitation reactor 340 may include another filter to separate the nickel hydroxide (Ni$(OH)_2$) product from the liquids after the stream exits first nickel precipitation reactor 340.

If nickel sulfate (such as nickel sulfate hydrate ($NiSO_4 \cdot 6H_2O$)) is the desired second product 304B comprising nickel (Ni), the produced Ni$(OH)_2$ from first nickel precipitation reactor 340 is passed into an optional second nickel reactor 350 and then into an evaporator or crystallizer 250B. The second nickel reactor 350 is like previous reactors and may include agitator 102B and jacket 104B. Second nickel reactor 350 has a source of an acid 352, such as an inorganic base acid like sulfuric acid ($H_2SO_4$). The second nickel reactor 350 has a plurality of inlets 356 that receive the nickel hydroxide Ni$(OH)_2$ from the first nickel precipitation reactor 340.

For production of the nickel sulfate/nickel sulfate hydrate ($NiSO_4 \cdot 6H_2O$), first nickel hydroxide (Ni$(OH)_2$) digestion is performed in the second nickel reactor 350. In the second nickel reactor 350, the purified nickel hydroxide (Ni$(OH)_2$) is mixed and digested with sulfuric acid ($H_2SO_4$), for example, having a concentration of greater than or equal to about 10 to about 20% by mass and the oxidant 354 (hydrogen peroxide ($H_2O_2$) having a concentration of greater than or equal to about 5 to about 10% by mass). In this manner, the nickel hydroxide forms nickel sulphate ($NiSO_4$) in the second nickel reactor 350, which is then passed via outlet 358 to downstream evaporator or crystallizer 250B that can form a desired stream of nickel (Ni) product 304B comprising nickel sulphate ($NiSO_4$). In the second evaporator or crystallizer 250B, the liquid (e.g., water) from the stream entering is removed and crystallization may further occur so as to leave nickel sulfate ($NiSO_4$) or nickel sulfate hydrate (($NiSO_4.6H_2O$) in a solid (e.g., crystalline) form. The evaporator separates the liquids from the nickel sulphate ($NiSO_4$) in the stream, which may be achieved by changing pressure, heating, and the like. In such examples, greater than or equal to about 90% to less than or equal to about 98% of the liquids, including water, in the stream may be evaporated or removed to form a concentrated nickel sulfate ($NiSO_4$) product that may be collected. More specifically, second nickel (Ni) product 304B may comprise nickel sulfate hydrate ($NiSO_4.6H_2O$) crystals, which may be further processed, including drying.

In this manner, when the system 100B is operated in the second operational mode to process the waste liquid stream in the second metal recovery unit 114C, various precious metals are independently recovered from one or more spent lithium-ion batteries at high purity levels to provides a first product stream 302 comprising recovered manganese (Mn) after processing in the manganese (Mn) recovery unit 120B, a second product stream comprising recovered cobalt (Co), where the second product stream comprises a cobalt hydroxide product, such as cobalt hydroxide ($Co(OH)_2$) or cobalt oxyhydroxide (COOH) 304A or cobalt sulfate ($CoSO_4$) 304B, and finally a third product stream comprising recovered nickel (Ni), where the third product stream comprises nickel hydroxide ($Ni(OH)_2$) 306A or nickel sulfate ($NiSO_4$) 306B. The purity levels may be those specified above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A process for independently recovering manganese (Mn), cobalt (Co), and nickel (Ni) from a lithium-ion battery waste stream, the process comprising:
    separating manganese (Mn) from a waste liquid stream originating from the lithium-ion battery waste stream comprising manganese (Mn), nickel (Ni), and cobalt (Co), the separating of manganese (Mn) comprising:
        (i) introducing a first oxidant to the waste liquid stream to form solid manganese dioxide ($MnO_2$);
        (ii) reacting the waste liquid stream with ozone ($O_3$) to form solid manganese dioxide ($MnO_2$); or
        (iii) both (i) and (ii); and
            removing the solid manganese dioxide ($MnO_2$) from the waste liquid stream; and
    separating nickel (Ni) and cobalt (Co) from the waste liquid stream by:
        (iv) adding sulfuric acid ($H_2SO_4$) and a second oxidant to the waste liquid stream, followed by adjusting pH to greater than or equal to about 4, adding sodium hypochlorite (NaClO) to form cobalt oxyhydroxide (COOH), passing the waste liquid stream through a filter to form a retentate comprising cobalt oxyhydroxide (COOH) and a filtrate comprising nickel (Ni) and liquid;
        (v) recovering cobalt (Co) from the retentate by purifying the cobalt oxyhydroxide (COOH) in the retentate and adding sulfuric acid ($H_2SO_4$) and a third oxidant to the retentate followed by one or more of the following processes:
            a. separating nickel (Ni) from cobalt (Co) by adjusting the pH of the retentate to be less than or equal to about 2.5 and passing the retentate into one or more chromatographic columns so that cobalt (Co) is retained within the one or more chromatographic columns, followed by a stripping process to recover cobalt (Co) from the one or more chromatographic columns;
            b. removing liquid from the retentate to recover cobalt sulfate ($CoSO_4$); and/or
            c. adjusting pH of the retentate to greater than or equal to about 9 to precipitate a cobalt hydroxide product comprising one or more of cobalt hydroxide ($Co(OH)_2$) or cobalt oxyhydroxide (COOH);
        (vi) recovering nickel (Ni) from the filtrate by one of the following processes:
            a. removing liquid from the filtrate to recover nickel sulfate ($NiSO_4$); and/or
            b. adjusting pH of the filtrate to greater than or equal to about 9 to precipitate nickel hydroxide ($Ni(OH)_2$).

2. The process of claim 1, wherein the waste liquid stream further comprises lithium (Li) and the filtrate is a first filtrate, and the retentate is a first retentate, wherein prior to (iv) adding sulfuric acid ($H_2SO_4$) and a second oxidant to the waste liquid stream, co-precipitating nickel (Ni) and cobalt (Co) by increasing pH of the waste liquid stream to greater than or equal to about 9 to precipitate nickel hydroxide ($Ni(OH)_2$) and cobalt hydroxide ($Co(OH)_2$), passing the waste liquid stream through a second filter to generate a second retentate comprising nickel hydroxide ($Ni(OH)_2$) and cobalt hydroxide/oxyhydroxide that is processed during (iv) and a second filtrate comprising lithium (Li).

3. The process of claim 1, wherein the first oxidant is selected from the group consisting of: potassium permanganate ($KMnO_4$), sodium permanganate ($NaMnO_4$), and combinations thereof.

4. The process of claim 3, wherein the first oxidant comprises sodium permanganate ($NaMnO_4$) and is selected to be less than or equal to about 95% of a stoichiometric amount in a reaction between the sodium permanganate ($NaMnO_4$) and manganese sulfate ($MnSO_4$).

5. The process of claim 1, wherein the second oxidant comprises hydrogen peroxide ($H_2O_2$).

6. The process of claim 1, wherein the separating of manganese (Mn) comprises (iii) both (i) the introducing the first oxidant to the waste liquid stream to form a first amount of manganese dioxide ($MnO_2$) and (ii) the reacting the waste liquid stream with ozone ($O_3$) to form a second amount of manganese dioxide ($MnO_2$).

7. The process of claim 6, wherein about 95% of manganese is removed from the waste liquid stream during (i) and about 5% of manganese is removed from the waste liquid stream during (ii).

8. The process of claim 1, wherein the filter is a first filter and the separating of manganese (Mn) further comprises passing the waste liquid stream through a second filter to separate and recover manganese dioxide ($MnO_2$).

9. The process of claim 1, wherein (i) the introducing the first oxidant to the waste liquid stream further comprises adjusting a pH of the waste liquid stream to greater than or equal to about 1.5 to less than or equal to about 3.

10. The process of claim 1, wherein the (iv) adding sulfuric acid ($H_2SO_4$) and the second oxidant to the waste liquid stream, followed by adjusting pH to greater than or equal to about 4, further comprises adding sodium hydroxide (NaOH) to the waste liquid stream followed by the adding the sodium hypochlorite (NaClO) and stirring for greater than or equal to about 1 hour, where the waste liquid stream has a temperature of greater than or equal to about 50° C. to less than or equal to about 60° C.

11. The process of claim 10, wherein after the passing through the filter to form the retentate, conducting at least one of: washing the retentate with water at a temperature of greater than or equal to about 50° C. to less than or equal to about 75° C. to remove residual nickel (Ni) from the cobalt oxyhydroxide (COOH); or washing the retentate with a sulfuric acid wash for greater than or equal to about 30 minutes to remove any residual nickel (Ni) from the cobalt oxyhydroxide (COOH).

12. The process of claim 1, wherein the separating manganese (Mn) from the waste liquid stream results in a first product stream comprising manganese (Mn) at a purity level of greater than or equal to about 98%, the (vi) recovering cobalt (Co) from the retentate results in a second product stream comprising cobalt (Co) at a purity level of greater than or equal to about 98%, and the (vii) recovering nickel (Ni) from the filtrate results in a third product stream comprising nickel (Ni) at a purity level of greater than or equal to about 99%.

13. A process for independently recovering manganese (Mn), cobalt (Co), and nickel (Ni) from a lithium-ion battery waste stream, the process comprising:
  purifying a lithium-ion battery waste liquid stream comprising sulfuric acid ($H_2SO_4$), manganese (Mn), cobalt (Co), and nickel (Ni) to remove fluorine (F), phosphorus (P), and one or more impurity metals selected from the group consisting of: copper (Cu), iron (Fe), zinc (Zn), aluminum (Al), and titanium (Ti), wherein the purifying includes:
    (i) removing copper (Cu), iron (Fe), and zinc (Zn) from the waste liquid stream by a solvent extraction process;
    (ii) adding a source of calcium oxide and a first oxidant to the waste liquid stream to remove fluorine (F) by precipitating calcium fluoride ($CaF_2$); and
    (iii) adjusting pH of the waste liquid stream to greater than or equal to about 3 to less than or equal to about 5 for a first duration and further adjusting pH of the waste liquid stream to greater than or equal to about 4.8 to less than or equal to about 7.2 to remove one or more impurity compounds comprising an element selected from the group consisting of: copper (Cu), iron (Fe), zinc (Zn), aluminum (Al), and titanium (Ti), phosphorus (P), lead (Pb), and combinations thereof;
  separating manganese (Mn) from the waste liquid stream by:
    (iv) introducing a second oxidant to the waste liquid stream to form solid manganese dioxide ($MnO_2$);
    (v) reacting the waste liquid stream with ozone ($O_3$) to form solid manganese dioxide ($MnO_2$); or
    (vi) both (iv) and (v);
  removing the solid manganese dioxide ($MnO_2$) from the waste liquid stream; and
  separating nickel (Ni) and cobalt (Co) from the waste liquid stream by:
    (vii) adding sulfuric acid ($H_2SO_4$) and a third oxidant to the waste liquid stream, followed by adjusting pH to greater than or equal to about 4, adding sodium hypochlorite (NaClO) to form cobalt oxyhydroxide (COOH), passing the waste liquid stream through a filter to form a retentate comprising cobalt oxyhydroxide (COOH) and a filtrate comprising nickel (Ni) and liquid;
    (viii) recovering cobalt (Co) from the retentate by purifying the cobalt oxyhydroxide (COOH) in the retentate and adding sulfuric acid ($H_2SO_4$) and a fourth oxidant to the retentate followed by one or more of the following processes:
      a. separating nickel (Ni) from cobalt (Co) by adjusting the pH of the retentate to be less than or equal to about 2.5 and passing the retentate into one or more chromatographic columns so that cobalt (Co) is retained within the one or more chromatographic columns, followed by a stripping process to recover cobalt (Co) from the one or more chromatographic columns;
      b. removing liquid from the retentate to recover cobalt sulfate ($CoSO_4$); and/or
      c. adjusting pH of the retentate to greater than or equal to about 9 to precipitate a cobalt hydroxide product comprising one or more of cobalt hydroxide (Co$(OH)_2$) or cobalt oxyhydroxide (COOH);
    (ix) recovering nickel (Ni) from the filtrate by one of the following processes:
      a. removing liquid from the filtrate to recover nickel sulfate ($NiSO_4$); and/or
      b. adjusting pH of the filtrate to greater than or equal to about 9 to precipitate nickel hydroxide (Ni$(OH)_2$).

14. The process of claim 13, wherein the second oxidant is selected from the group consisting of: potassium permanganate ($KMnO_4$), sodium permanganate ($NaMnO_4$), and combinations thereof.

15. The process of claim 13, wherein the first oxidant, the third oxidant, and the fourth oxidant are independently selected from the group consisting of: hydrogen peroxide ($H_2O_2$), ozone ($O_3$), sodium hypochlorite (NaClO), and combinations thereof.

16. The process of claim 13, wherein during the introducing the second oxidant to the waste liquid stream, a pH of the waste liquid stream is adjusted to be greater than or equal to about 1.5 to less than or equal to about 3.

17. The process of claim 13, wherein the filter is a first filter and the separating manganese (Mn) from the waste liquid stream further comprises passing the waste liquid stream through a second filter to separate and recover the solid manganese dioxide ($MnO_2$).

18. The process of claim 13, wherein the waste liquid stream further comprises lithium (Li) and the filter is a first filter, the filtrate is a first filtrate, and the retentate is a first retentate, wherein prior to (vii) adding sulfuric acid ($H_2SO_4$) and a second oxidant to the waste liquid stream, co-precipitating nickel (Ni) and cobalt (Co) by increasing pH of the waste liquid stream to greater than or equal to about 9 to precipitate nickel hydroxide (Ni$(OH)_2$) and cobalt hydroxide (Co$(OH)_2$), passing the waste liquid stream through a second filter to generate a second retentate comprising nickel hydroxide (Ni$(OH)_2$) and cobalt hydroxide (Co$(OH)_2$) that is processed during (vii) and a second filtrate comprising lithium (Li).

19. The process of claim 18, wherein the co-precipitating nickel (Ni) and cobalt (Co) occurs in an inert atmosphere.

20. The process of claim 18, further comprising recovering lithium (Li) by further processing the filtrate to form at least one compound comprising lithium (Li) by concentrating lithium (Li) and adding sodium carbonate ($Na_2CO_3$) to precipitate lithium carbonate ($Li_2CO_3$).

21. The process of claim 20, wherein the concentrating lithium (Li) comprises evaporating water and the adding sodium carbonate ($Na_2CO_3$) further comprises adding an inorganic base to increase a pH of the first filtrate to greater than or equal to about 12, wherein the filtrate has a temperature of greater than or equal to about 70° C. to less than or equal to about 95° C. to form lithium carbonate ($Li_2CO_3$).

22. The process of claim 13, wherein the (vii) adding sulfuric acid ($H_2SO_4$) and the third oxidant to the waste liquid stream, followed by the adjusting pH to greater than or equal to about 4, further comprises adding sodium hydroxide (NaOH) followed by adding the sodium hypochlorite (NaClO) and stirring for greater than or equal to about 1 hour where the retentate has a temperature of greater than or equal to about 50° C. to less than or equal to about 60° C.

23. The process of claim 22, wherein after the passing the waste liquid stream through the filter to form the retentate comprising cobalt oxyhydroxide (COOH), conducting at least one of: washing the retentate with water to remove residual nickel (Ni) at a temperature of greater than or equal to about 50° C. to less than or equal to about 75° C.; or washing the retentate with a sulfuric acid wash for greater than or equal to about 30 minutes to remove any residual nickel (Ni).

24. The process of claim 13, wherein the solvent extraction process further comprises first mixing the waste liquid stream with a first extractant and a first organic phase to remove copper (Cu) and then mixing the waste liquid stream with a second extractant and a second organic phase to remove at least iron (Fe) and zinc (Zn).

25. The process of claim 24, wherein the first extractant comprises 2-hydroxy-5-nonylbenzaldehyde oxime, the second extractant comprises bis-(2-ethylhexyl)phosphoric acid and the first organic phase and the second organic phase are independently selected from the group consisting of: kerosene, sulfonated kerosene, hexane, and combinations thereof.

26. The process of claim 13, wherein the separating manganese (Mn) from the waste liquid stream results in a first product stream comprising manganese (Mn) at a purity level of greater than or equal to about 98%, the recovering cobalt (Co) from the retentate results in a second product stream comprising cobalt (Co) at a purity level of greater than or equal to about 98%, and the recovering nickel (Ni) from the filtrate results in a third product stream comprising nickel (Ni) at a purity level of greater than or equal to about 99%.

27. The process of claim 13, wherein a separation efficiency for each of copper (Cu), iron (Fe), and zinc (Zn) is respectively greater than or equal to about 98% and a separation efficiency for fluorine is greater than or equal to about 99%.

* * * * *